US011071309B2

(12) United States Patent
Abu-Hardan et al.

(10) Patent No.: US 11,071,309 B2
(45) Date of Patent: Jul. 27, 2021

(54) CONFECTIONERY COMPOSITION COMPRISING BRAN-LIKE MATERIAL

(71) Applicant: NESTEC S.A., Vevey (CH)

(72) Inventors: Madian Othman Abu-Hardan, York (GB); Gijsbert Adriaan Bonarius, New South Wales (AU); Patrick Clement, Le Paquier-Montbarry (CH); Sophie Marion, York (GB); Benedict Timothy Clark, Wigton (GB); Stuart David Hamer Jones, Burnley (GB)

(73) Assignee: Societe des Produits Nestle S.A., Vevey (CH)

(*) Notice: Subject to any disclaimer, the term of this patent is extended or adjusted under 35 U.S.C. 154(b) by 303 days.

(21) Appl. No.: 16/089,482

(22) PCT Filed: Mar. 31, 2017

(86) PCT No.: PCT/EP2017/057696
§ 371 (c)(1),
(2) Date: Sep. 28, 2018

(87) PCT Pub. No.: WO2017/167966
PCT Pub. Date: Oct. 5, 2017

(65) Prior Publication Data
US 2019/0174792 A1    Jun. 13, 2019

(30) Foreign Application Priority Data
Apr. 1, 2016 (EP) .................................. 16163531

(51) Int. Cl.
*A23G 3/34* (2006.01)
*A23G 3/48* (2006.01)
*A23L 7/10* (2016.01)
*A23P 20/10* (2016.01)
*A23P 20/20* (2016.01)
*A21D 13/02* (2006.01)
*A23G 3/40* (2006.01)

(52) U.S. Cl.
CPC ............ *A23G 3/343* (2013.01); *A21D 13/02* (2013.01); *A23G 3/34* (2013.01); *A23G 3/48* (2013.01); *A23L 7/115* (2016.08); *A23L 7/198* (2016.08); *A23L 7/1975* (2016.08); *A23P 20/105* (2016.08); *A23P 20/20* (2016.08); *A23G 2200/14* (2013.01); *A23V 2002/00* (2013.01); *A23V 2200/132* (2013.01); *A23V 2250/5106* (2013.01)

(58) Field of Classification Search
CPC . A23L 7/115; A23L 7/198; A23V 2250/5106; A23G 3/00; A23G 3/34; A23G 3/343; A23G 3/40; A23G 3/48
USPC ................................................ 426/103, 660
See application file for complete search history.

(56) References Cited

U.S. PATENT DOCUMENTS

| 4,435,430 A | 3/1984 | Fulger et al. |
| 4,759,942 A | 7/1988 | Von Fulger |
| 2002/0197357 A1 | 12/2002 | Pfeiffer |
| 2007/0269575 A1 | 11/2007 | Min et al. |
| 2007/0269577 A1 | 11/2007 | Pershad et al. |
| 2014/0079786 A1 | 3/2014 | Freers et al. |
| 2014/0308389 A1* | 10/2014 | Ames ................... A23L 33/30 426/2 |

(Continued)

FOREIGN PATENT DOCUMENTS

| CH | 663323 | 12/1987 |
| DE | 2345806 | 3/1975 |

(Continued)

OTHER PUBLICATIONS

Matin et al. "Various Physico-chemical Properties of Dietary Fiber Sources of Poultry Diets" International Journal of Agriculture and Crop Sciences, 2013, vol. 6, No. 18, pp. 1239-1245, XP002771066.
Japanese Office Action for Appl No. P2018-551314 dated Jul. 28, 2020.

* cited by examiner

*Primary Examiner* — Jyoti Chawla
(74) *Attorney, Agent, or Firm* — K&L Gates LLP

(57) ABSTRACT

There is described an confectionery composition comprising edible particulate material comprising from 80% to 100% by weight based on total weight of the material of a processable, microbially released, flavour acceptable bran-like material, characterized by the following parameters: (i) mean particle size by volume (Vol. MPS) of from 5 to 100 microns; (ii) volume particle size distribution (Vol. PSD) characterized by the parameters: $D_{90,3}$ less than or equal to 350 microns, and $D_{50,3}$ less than or equal to 50 microns, and optionally $D_{10,3}$ less than or equal to 15 microns, (iii) mean particle sphericity as measured by a $S_{mean}$ of greater than or equal to 0.75; (iv) where processable means has oil holding capacity (OHC) of from 0.7 to 1.5; (v) where microbially released means material has common microbes below given limits (preferably free of common microbes) (vi) where flavour acceptable denotes a lipase activity (LA) and a peroxidase activity (PA) both less than or equal to 2 U/g and optionally a low degree of roasted flavour notes as defined herein. The bran-like material used in the confectionery compositions may added as a bulk ingredient to replace sugar and/or to provide confectionery fillings and/or coatings having improved hiding ability when used as layers in multilayer confectionery products.

16 Claims, 8 Drawing Sheets

(56) References Cited

U.S. PATENT DOCUMENTS

2014/0356506 A1    12/2014   Hossen

FOREIGN PATENT DOCUMENTS

| DE | 2746479 | | 4/1979 |
|---|---|---|---|
| EP | 0117044 | | 8/1984 |
| EP | 1127495 | | 8/2001 |
| FR | 2452256 | | 10/1980 |
| JP | 2006035150 A | | 2/2006 |
| JP | 2007312694 A | * | 12/2007 |
| JP | 2009125010 A | | 6/2009 |
| JP | 2012254024 A | | 12/2012 |
| JP | 2013243984 A | | 12/2013 |
| JP | 2015023828 A | | 2/2015 |
| JP | 2016501556 A | | 1/2016 |
| WO | 2017167966 A1 | | 10/2017 |

VIRGIN BRAN (COMP N)

CELL MILLED BRAN (Ex 14)

(Comp O, Ex 15, Ex 16)

CONFECTIONERY COMPOSITION COMPRISING BRAN-LIKE MATERIAL

CROSS REFERENCE TO RELATED APPLICATIONS

The present application is a National Stage of International Application No. PCT/EP2017/057696, filed on Mar. 31, 2017, which claims priority to European Application No. 16163531.3, filed on Apr. 1, 2016, the entire contents of which are being incorporated herein by reference.

The present invention relates to the field of foodstuffs such as confectionery compositions that contain components derived from fibre and to methods of making such compositions.

The common grains, also referred to as cereals, are an important component of many foods. Common cereals are wheat, maize, oat, rice, barley, and rye. In the Western World, wheat and corn, and to a certain extent maize, are the most important cereals. Rice is the most important cereal in Asian countries. The grains are all members of the grass family, and from the grains several food products are manufactured, including pure starch, breakfast cereals, snacks/confectionery cereals, meal, and flour. From a nutritional perspective, most cereals are rich in carbohydrates, proteins, fibres, vitamins and minerals, and to some extent also fat. Whole grains consist of three parts: endosperm (mainly starches), germ and bran. Bran contains about 80-90% of the dietary fibres from whole grains. When grains are refined (e.g. to produce white flour), the bran and germ layers are generally removed, leaving only the endosperm. There are also other materials derived from plants (bran-like materials) as described herein that in the context of the present invention may also have similar properties to bran and so are referred to herein as bran-like materials.

However whilst cereal brans, especially wheat bran, are a cheap and abundant by-product from the flour industry, with a low caloric value due to its high fibre content, there are significant technical challenges to incorporate such brans in a fluid compositions that are used in foodstuffs (such as fat based fillings or coatings, e.g. chocolate). For example adding cereal bran to a such compositions increases the viscosity and yield value of the molten mass which makes the composition difficult and expensive to process on an industrial scale due to reduced throughput (increased time) and increased energy costs to incorporate the material.

Certain enzymes present in bran-like materials (examples of which are lipid esterase and peroxidase) have been found over time to generate certain highly undesired off flavours (such as rancid, sour milk and/or cheesy off flavours). Whilst these off-flavours are not generally present initially in fresh bran, the off flavours will develop the longer the bran is kept. Therefore bran is heated to denature and deactivate these enzymes. However heat treating the bran then generates other strong, roasted flavours creating a distinctive taste in heat treated bran which whilst generally less unacceptable compared to the enzyamtically generated off flavours is still undesirable in many products. In practise non heated fresh bran cannot be used sufficiently quickly before these off-flavours develop as bran must be kept for some time during use. So whether heat treated or untreated these flavour issues have deterred widespread use of bran as an additive in products.

Generally it is strongly preferred to heat treat the bran because of the additional need to ensure the bran is food safe as heat treatment is also used to remove any microbes. For these reasons commerically available bran that is used industrially has a distinct roasted flavour.

Therefore use of bran in products with delicate flavours or incorporating large amounts of bran in a product e.g. as a bulking agent to replace or reduce other less desirable ingredients such as sugar has not been possible in a manner which is acceptable to consumers due to the impact of bran on flavour (whether heat treated or not).

Thus whilst many attempts have been made to add bran to food products the combination of factors such as poor processability and thus high cost of manufacture and poor consumer acceptance due to undesired flavours have meant that bran particles are still not widely used as an ingredient for foodstuffs.

There are many documents describing prior art cereal brans and processes for making them some of which are listed below.

CH 663323 (Jacob Suchard) describes a food product comprising pellets of typical size from 3 to 5 mm having at least 50% by weight of crushed cellulosic fibres of size <30 microns combined with sugar and ovalbumin (OVA) the main protein found in egg white and sugar. These pellets may be dispersed within a chocolate mass. The object of this document is to provide non-assimilable cellulose fibers to aid digestion. The celluose fibres are used in pellets combined with sugar (presumably to disguise the bran off-flavour) so woud be unsuitable for use as a bulk replacer for sugar. Suchard describes the cellosuse as a fibre which is elongate and non-spherical. Nor does this document suggest how to solve the issue of processability of the cellulose within chocolate in a manner which is makes the use of cellulose material commerically viable. The dispersion of large (3 to 5 mm) cellulosic pellets within a chocolate mass is unlikely to be attractive to the end consumer and the ingredients are not homogenisely incorporated within the chocolate. So considered as a whole Suchard teaches directly away from the bran particles of the present invention.

CN 101906399 discloses ball-milling of bran in order to break cellular walls of brans and degrades enzymes. The document does not indicate the particle size of dietary fibres that are obtained after milling. The rotational speed of 350-500 rpm is low (although rpm depends on the size of the ball mill). This document requires using enzymes to degrade cellular walls during milling and at temperature is below 50° C.

DE 2345806 (Celcommeriz) describes use of finely ground bran (size <=50 microns) as low-calorie foodstuff extender to replace flour and other carbohydrates without spoiling taste of food by adding anti-oxidants such as octyl gallate, dodecyl gallate, butyl-hydroxy-anisole or butyl-hydroxy-toluene to prevent taste deterioration. It is stated that this bran does not give the sandy taste characterizing microcrystalline cellulose powder used previously to improve digestion. It is claimed that these properties are due to the combination of pentosan, lignin and cellulose contained in bran. This document does not address the issue of the processability of the bran and there is no teaching that the shape of the material may be an issue. Nor does it address the issue of the inherent taste of the bran which deters its use with certain foodstuffs or in large amounts. Rather Celcommeriz addresses an different issue that of deterioration of taste (change in flavour over time) of the bran and uses anti-oxidants to solve this. This may pose other problems for example if the food product to which the bran is to be added are to be clean label (e.g. labelled as free of additives).

DE 2746479 (Bayer) describes moulded confectionery which has a high content of roughage (such as bran, shredded carrot or vegetable fibres) of between 5 and 70%, preferably between 15 and 30%. Bayer teaches that the roughage can comprise a diverse size of grains as the grain size can substantially effect the chewing feeling. Bayer teaches that dried Carrot Shreds can be used as fine powder and also as a coarse-grained material. There is no suggestion from Bayer that bran is difficult to process or has an undesired taste or how such issues may be addressed.

EP 0117044 (General Foods) describes a bran material of particle size from 5 to 100 microns which is stated to have an improved functionality as defined by an increase in farinograph reading of from 50 to 500 Brabender Units compared to commercially available brans. The bran is prepared by micro-milling in an impact mill. A farinograph is a method of measuring shear and viscosity of a mixture of flour and water. As such it is desired to optimise properties of the flour (in this case bran particles) in an aqueous system. This is very different from the bran particles of the present invention which are designed for use in oil or fat based systems such as chocolate. Therefore any improvements of the bran particles described in this document will not be suitable for non-aqueous systems and the bran described in this document teaches away from bran of the invention with the properties described herein.

EP 1127495 (Ajinomoto) describes a method for classifying specific tissue of oilseeds or cereals and finely milled powders. The powders described in this document differ from those described in the present invention in several ways. The powders described have non-uniform structural properties and are formed from mixtures of different fractions where each fraction has a different non-uniform microscopic structure as well as being of different sizes. This is very different from particles of the present invention which have substantially the same shape.

EP2127525 (Altex) describes a process for preparing a whole grain flour by milling bran and then homogenising with refined (white) flour to reconsititute a flour that meets the definition set by the US FDA for whole grain flour and has similar organoleptic and taste properties to whole grain flour. The technical requirements of bran that will readily mix with refined flour will be very different from the bran particles of the present invention which are designed for a very different purpose to be incorporated easily in a composition with minimal adverse impact on flavour.

FR 2452256 (Guitard) describes a food product based on a mixture of bran and cocoa powder used to make chocolate or dissolvable powder. As these powders are designed to dissolve in water, they teach away from brans having properties that are suitable for mixing with oil of fat based systems.

U.S. Pat. No. 4,435,430 (General Foods) describes an process for producing an enzymetically modified product derived from whole grain. The process involving the steps of milling and then seperating the grain into bran, endopserm and germ fractions, where the bran fraction is milled to a particle size of from 5 to 100 microns and the endosperm is milled made into as slurry an enzymatic hydrolysed before the fractions are recombined to form a cereal dough which is used to make a breakfast cereal. The properties of the bran described in this document are very different from the bran of the invention (for example PSD and particle shape) and the bran described in General Foods is designed for very different end use.

U.S. Pat. No. 4,500,558 discloses extrusion of cereal bran (corn) in water with ratios 5.5:1 to 10:1 (optimum 7:1) followed by gridding (below 80 µm) where extrusion is used as a means to reduce particle size. Other technologies that are used to reduce particle size of a cereal are wet-ball milling and high pressure homogenization.

U.S. Pat. No. 4,759,942 (General Foods) describes a further process which uses milled wheat bran to make breakfast cereal and the bran particles are very different from those described herein.

U.S. Pat. No. 4,710,386 describes extrusion of cereal bran (corn) in water with ratios 5.5:1 to 10:1 (optimum 7:1) followed by gridding (below 80 µm) and then reconstituted with the other parts of the grain (themselves modified) prior to being processed as a ready to eat snack. Extrusion is also used to reduce particle size.

U.S. Pat. No. 7,419,694 (ConAgr Foods) describes a ultrafine wholemeal flour and coarse fraction.

U.S. Pat. No. 7,709,033 (Biovelop International) describes a process for producing an ultrafine-milled wholegrain wheat flour and products thereof.

U.S. Pat. No. 8,043,646 (Barilla) discloses a soft wheat flour and bran component obtained by abrasion. No heat stabilisation is required.

U.S. Pat. No. 8,053,010 (General Mills) describes a process for the fractionation of cereal brans.

U.S. Pat. No. 8,133,527 (Kraft) describes a stabilised bran and whole grain wheat flour and use in baked goods and U.S. Pat. No. 8,173,193 (Kraft) describes as similar bran but derived from other grains in addition to wheat.

U.S. Pat. No. 8,361,532 (General Mills) describes a recombined whole grain that has visually indistinguishable particulate matter and related baked products. U.S. Pat. No. 8,372,466 (General Mills) relates to a similar invention with more details on colour measurement and size ranges.

U.S. Pat. No. 8,404,298 (ConAgr Foods) describes a recombined whole grain wheat having visually indistinguishable particulate matter and related baked products US 2007-0269575 (Min et al) describes a method of pulverizing oat bran to an ultra fine size of 20 US mesh or less (equivalent to less than or equal to 841 microns) at low temperatures (preferably not exceeding 40° C.) to extract the pure beta-glucan component therefrom by methods such as jetting the pluzervised oat bran against a frozen wall. The oat bran is added to a beverage. Preferred oat bran is stated to have a final size smaller than a theoretical US mesh size of 500 (approx 25 microns), more preferably smaller than a theoretical US mesh size of 2500 (approx 5 microns). Such ultra fine particles have a very large surface area and thus would be difficult to process and incorporate into a food composition such as a confectionery composition. Min does not teach the use of bran particles of the present invention that have the very specific properties described herein. Min also teaches directly away from heat treating the oat bran as the object this patent is to provide a low temperature process to overcome the problem that at temperatures from 70 to 100° C. the desirable beta-glucanase active component of beta glucan will be deactivated.

US 2012-135128 (Rodriguez) discloses a process for the production of refined whole wheat flour with low coloration where the whole wheat flour, bran and germ are separated, treated and recombined.

US 2012-288598 (Leusner) describes a processed cereal piece with fibre coating

US 2014-0079786 (Grain Processing Corp.) disclose micro-spheres made from a fibre source optionally used as core for carrying other ingredients. The spheres are formed in centrifuges, tumblers, granulators and coating apparatus. The spheres formed into spherical shapes from a mixture of bran combined with a binder and are very different from particles of pure bran which are spherical.

US 2014-0356506 (Kellogg) describes a modified bran product for use in food, the bran being formed by cooking at 250 to 290° F. (121 to 143° C.) for from 30 seconds to 4 minutes to form a bran slurry which is then ground (optionally after drying) to have a mean particle size of 150 microns or less, preferably 65 microns or less. Kellogg requires that there is an first step of forming a slurry of bran which is then cooked (see FIG. 2 and paragraph [0011]). Cooking the bran slurry modifies the moisture content of the bran from initial water content of about 15% by weight to from 60 to 90% by weight to create a soft textured material. Thus Kellogg teaches directly away from milling dry bran nor does Kellogg describe anything about the shape of the bran particles. Even where Kellogg teaches embodiments where the slurry is later dried to form dry particles there is no suggestion that the slurry step is optional. For example paragraph [0010] col 1, lines 19 to 24 state that "In the past, bran has been subjected to milling to reduce the size of the bran with the hope that this would produce a palatable product. These attempts have not met with full success as the size-reduced bran particles still have a gritty and unacceptable texture and mouth feel to consumers." In paragraph [0011], col 1, lines 45 to 46 reinforces this by stating: "The cooking step allows for a paltable product and aids in the micro-grinding step" Thus Kellogg does not disclose the specific bran particles described in the present invention. There is no disclosure of shape in Kellogg. The particle size distribution (PSD) curve shown in FIG. 1 (where the abscissa representing particle size in microns is plotted on a logitharmic scale) shows a long tail for small particles in the range of about 1 to 10 microns. The PSD shown in FIG. 1, is different from and thus teaches away from preparing bran particles of the present invention having the size distributions described and characterised herein. A reader of Kellogg is actively deterred from preparing bran particles without a slurry step. Cooking the bran adds an expensive step to the process and cooking the bran by forming an aqeuous slurry is undesirable as it can destroy or reduce desirable components present in the bran.

WO 2005-074625 (Biorefining) describes the fractionation of whole seeds by smashing against a surface.

WO 2006-124440 (Pulsewave) discloses the non-impact processing of grain.

WO 2008-040705 relates to co-extruded products comprising a filling and an outer shell.

WO 2009-109703 (VTT) describes a beta glucan containing product from bran

WO 2010-000935 describes dry milling of bran (oat/BG), separation of the fractions and further milling—particle size between 70-100 μm. The moisture content in between 13 to 16% during milling. This patent related to dry grinding of bran and does not suggest wet-milling (excluding milling by extrusion).

WO 2011-107760 (Gloway) describes an apparatus to convert milling products into edible products, and products made therefrom.

WO 2011-124678 (Danisco) discloses a method for production of modified bran and use in cereal products.

WO 2012-142399 (Kraft) discloses production of stabilised wheat flour using lipase inhibition WO 2012-148543 (Kraft) describes a stabilized whole grain flour and method of making it.

The applicant's co-pending application WO 2016/091952 describes a process for preparing a wet-treated bran product having a small particle size and having improved expansion properties. Optionally micronized bran of the invention may include some of the bran fractions prepared as described in this document.

The applicant's co-pending application WO 2016/091955 describes a process for up preparing an extruded cereal product with an increased amount of whole grain and dietary fibres that does not compromise the mouthfeel or the expansion properties of the extruded cereal product.

Various scientific papers have also been published that discuss the properties of milled wheat or other bran, for example those articles listed below:

Journal of Cereal Science 57 (2013) 84-90 Rosa et al, discloses that ultra-fine grinding increases the antioxidant capacity of wheat bran.

Journal of Cereal Science 53 (2011) 1-8 Hemery et al, discusses the impact of ultra-fine grinding on dry fractions of wheat bran.

Food Research International 43 (2010) 943-948 Zhu et al, discusses the effect of ultrafine grinding on hydration and antioxidant properties of wheat bran dietary fibre.

Univ of Nebr—Lincoln—29 Nov. 2012 Thesis—New Technologies for Whole Wheat Processing Addressing Milling and Storage Issues—Doblado-Malonado; describes treatment of milled bran by various methods such as heat treatment, addition of metal ions, decrease of pH, ethanol vapour and, irradiation.

Food Chemistry 119 (2010) 1613-1618, Rose and Inglett describes producing feruloylated arabinoxylo-oligosaccharides from maize (*Zea mays*) bran by microwave-assisted autohydrolysis.

Enzyme treatment of bran is described in the following documents:

Al-Suaidy, M. A., Johnson, J. A., and Ward, A. B. 1973. Effects of certain biochemical treatments on milling and baking properties of hard red winter wheat. Cereal Sci. Today 18:174-179;

Petersson K., Nordlund E., Tomberg E., Eliasson A. C., and Buchert J., 2013, Impact of cell wall degrading enzymes on the water holding capacity and solubility of dietary fibre in rye and wheat bran, Journal of the Science of Food and Agriculture, vol 93 pages 881-889]

Peyron S, Chaurand M, Rouau X & Abecassis J. (2002a). Relationship between bran mechanical properties and milling behaviour of durum wheat (*Triticum durum* Desf.). Influence of tissue thickness and cell wall structure. Journal of Cereal Science 36, 377-386.

Peyron S, Surget A, Mabille F, Autran J C, Rouau X & Abecassis J. (2002b). Evaluation of tissue dissociation of durum wheat grain (*Triticum durum* Desf.) generated by the milling process. Journal of Cereal Science 36, 199-208.

Cereal Chem 2008 85(5) 642-647 Lamsal—Milling wheat after enzyme treatment Morph. wheat grain+genotype on flour yield—2010—S Cross Univ—Edwards However none of the prior art documents satisfactorily address the problems described herein. There remains a need for improved bran materials and food stuffs containing such materials.

Foodstuffs often contain added sugars as an economical bulking agent, and the amount of sugar added is not always necessary for the consumer to achieve a desired level of sweetness perception. Increasingly both consumers and governmental authorities are demanding strict targets for sugar reduction in many foodstuffs. Therefore the need for an affordable bulking ingredient to replace sugar has increased. It is an object of one embodiment of the invention to address this problem, especially in foodstuffs such as confectionery products that often comprise high amounts of added sugar, typically added to water and/or fat based fluids such as fillings, creams, jams and the like or even to the batter from which baked products such as wafers are produced.

When conventional wheat bran is used to replace the sugar in a fat based chocolate cream filling, the bran has a negative impact the rheology of the cream which cannot be pumped or handled using conventional production equipment. Thus conventional untreated cereal brans are not suitable as bulking agents or replacement for sugar in fluid compositions such as coatings or fillings.

It is preferred that filling and/or coating layers applied to a foodstuffs will be uniform, of consistent thickness, have a smooth surface, and/or lack visible blemishes or holes (especially for coatings visible to the consumer where a good aesthetic appearance is required). These properties can be summarised as the hiding power of a layer. Layers with good hiding power provide consistent organoleptic properties to the end consumer as well as allowing reliable manufacture of consistent product, for example where using moulds which require high degree of dimensional tolerance. To some extent thicker layers (i.e. a higher coat weight) can be used to level out any unevenness in the surface to overcome poor hiding power. However higher coat weights are disadvantageous because they may need to be applied in several layers and/or they increase the cost. In addition high coat weights increase the amount of fat and/or sugar in the product which is undesirable for health reasons as discussed herein.

It has been found that when bran is added to layers such as fillings and/or coatings the film forming and aesthetic appearance of the layer is reduced. Compositions that contain untreated bran have a poor hiding power, producing layers with significant amount of visible discontinuities or blemishes at normally acceptable coat weights. Given one of the reasons to use cereal bran is their health benefits, the need to use much higher coat weights than conventional, is a further reason a skilled person has been deterred from using bran in coatings or fillings.

For all these reasons despite its theoretical benefits bran has not been widely used in practise as an ingredient in products such as confectionery products on an industrial scale.

It would be desirable to find a cheap, widely available material, with the advantages of cereals that also addresses some or all of the problems identified herein. The applicant has identified unexpected properties of bran which allow bran to be inexpensively modified and/or selected from known brans (without complex or expensive treatments with special ingredients such as enzymes) so the resultant bran surprisingly can be incorporated in foodstuffs optionally in high amounts to address some or all of these problems.

One object of an aspect of the present invention is to solve some or all of the problems or disadvantages (such as identified herein) with the prior art.

None of the above documents suggest how a bran might be modified to more easily be incorporated in a fluid composition. Indeed a skilled person reading these documents would not aware that fluid compositions containing bran are difficult to process on an industrial scale and so would have no reason to incorporate bran in such compositions.

To date there has been no appreciation of the issues described herein or which properties of bran might be usefully controlled to address these problems. For example there is no suggestion in the prior art that brans modified or selected as described herein could replace sugar (in whole or in part) in confectionery products and/or improve the hiding power of fillings and/or coatings which contain bran.

Surprising the applicant has discovered that bran selected or modified to have certain particle properties as described herein (such bran referred to herein as micronized bran) has unexpectedly advantageous properties. Micronized bran of the invention can be usefully added to a fluid composition and be processed in an industrial process using conventional equipment. Micronized bran of the invention can be used a bulking agent and/or sugar replacer in fluid compositions and such bran containing fluid compositions form layers with improved hiding power compared to prior art layers that contain bran.

One preferred embodiment of this invention has resulted in a bulk ingredient obtained from cereals such as wheat bran which can replace or reduce sugar in fat based fillings.

A cost effective high capacity milling technology has been found which can micronize cereal bran such as wheat bran to a powder with D90 particle size below 100 microns. Analysis showed that bran powder of the invention with the particle size and other properties as described herein has optimal physical properties for use as a bulk ingredient in fat based system, as for example the fat absorption of such bran is minimal and the average sphericity of the bran particles is increased (more spherical like). Particles of the invention have improved process ability as for example they show less agglomeration behaviour which improves handling of the material during processing (e.g. reduces the impact on the static flow properties of the filling.).

Cereal bran such as wheat bran is naturally high in microbial contamination and therefore needs to be subjected to heat treatment to be able to meet food safety requirements. However the applicant has also found (e.g. in a keeping test with oven heated bran) that heating the bran could have a significant impact on the product quality due to off flavour formation due to intrinsic enzyme activity (such as lipases) present in the bran. Therefore, there is a need to balance heat treatment to eliminate microbial contamination without generating off flavours. In a preferred embodiment the bran of the invention is heat treated prior to micronization in the manner described herein optimized with a design of experiment which both deactivate microbes but does not generate off flavour to acceptable levels.

The applicant has performed many experiments to understand the impact of micronized and heat treated wheat bran on the sensory properties of confectionery. Consumer studies are used to identify if these sensorial changes are acceptable. For example 20% of micronized wheat bran was used to replace sugar in a confectionery filling to be added to confectionery products. This bran rich filling can be used to replace the standard filling (without bran) in the chocolate coated wafer bar available commercially from the applicant under the trademark KitKat® and the replacement had no adverse impact on the sensorial properties of the KitKat® product. The applicant has also found that introducing bran into fillings for wafer products which have a high content of filling (such as the confectionery product available commercially from the applicant under the trademark Blue Riband®) could, depending on the level of bran applied, introduce flavour notes related to the intrinsic flavour profile of cereal based ingredients, however such flavours were still deemed acceptable.

The applicant has also found that at a pilot plant scale if non-milled wheat bran is added to a filling then this created serious processing issues. For example the throughput through the roll-refiner was unacceptably low and incomplete layers of filling were formed on the wafer. These issues were completely eliminated when the micronized wheat bran of the invention was used. An experimental design has found that the bran powder of the invention can be used up to 25% by weight of filling without having a negative impact on the processability of the filling allowing bran to replace sugar as a bulk ingredient to a great extent. Thus for example when producing the confectionery bar available commercially from the applicant under the trademark Lion®, wheat bran of the invention was used to replace sugar as a bulk ingredient in the following amounts; in the filling 23% bran by weight based on total weight of filling; and in the enrobing caramel 5% bran by weight based on total weight of caramel. This reduced the weight of sugar in each Lion® bar by 7% based on total weight of sugar with no impact on the sensory profile.

The present invention provides a food safe and shelf stable bulk ingredient derived from wheat bran that can be added to fat based fillings at elevated levels (up to 25% by weight), without impacting the processability of the food product. This allows sugar to be reduced to significantly lower amounts in a cost-effective way than possible before and uses of a wholesome ingredient that is very familiar to consumers and compatible with a cereal-based products.

Therefore broadly in accordance with one aspect of the present invention there is provided a edible particulate material comprising from 80% to 100% by weight based on total weight of the material of a processable, microbially released, flavour acceptable bran-like material, characterized by the following parameters:

(i) the bran like material has a mean particle size by volume (Vol. MPS) of from 5 to 100 microns;

(ii) the bran like material has a volume particle size distribution (Vol. PSD) characterized by the parameters:
$D_{90,3}$ less than or equal to 350 microns, and
$D_{50,3}$ less than or equal to 50 microns, and
optionally $D_{10,3}$ less than or equal to 15 microns, (iii) the bran like material has a mean particle sphericity as measured by a $S_{mean}$ of greater than or equal to 0.75;

(iv) where processable preferably denotes the bran-like material has a holding capacity (more preferably an oil holding capacity OHC) of from 0.7 to 1.5; where (v) where microbially released denotes that the bran-like material satisfies the criteria that Samonella is not detected in a 25 g sample of the edible material; and (vi) where flavour acceptable preferably denotes that the bran-like material has:
a lipase activity (LA) of less than or equal to 2 U/g;
a peroxidase activity (PA) of less than or equal to 2 U/g and
optionally has a roasted flavour rated 2 or less in a taste test determined by a sensory panel as described herein, in a sniffing test as described herein and/or a total amount of purazine compounds as described herein.

The applicant has found that by pre-treating the bran-like material of and/or used in the invention in a simple manner which is neither too gentle nor too harsh (as described herein) the bran-like material can still be microbially released and does not have unacceptable enzymatically generated off flavours yet also does not exhibit unacceptable levels of other heated generated strong flavours such as roasted notes. The applicant has also found the bran-like material of and/or used in the invention where the particles have a shape, size and holding capacity as described herein is readily processed and handled when used in an industrial process, can be kept for longer without generating off flavour and for example the material can be added to fluids such that the fluid viscosity is in a range where the fluid can be pumped, deposited and/or readily forms layers.

The combination of these properties allow the bran-like material to be added to edible compositions and products in much higher amounts than known before. Such bran-rich compositions and products of the invention can be made economically on a large scale (e.g. due to cheapness of bran, simple pre-treatment, longer keeping and/or its improved handling) whilst still being acceptable to the consumer due to lack of strong flavour imparted by the added bran. Bran-rich compositions and products of the invention provide more of the benefits of the bran-like material by replacing other less desired ingredients (e.g. sugar used as a bulking agent) and/or due to the intrinsic properties of the bran-like material (e.g. high fibre content).

Usefully if the edible particulate material of the invention comprises any other bran-like material other than that bran-like material having all of the properties (i) to (iv) described herein; that other bran-like material may be present in no more than 20 parts; usefully no more than 15 parts; even more usefully no more than 10 parts; most usefully no more than 5 parts by weight based on the total amount of bran-like material being 100 parts by weight. It will be appreciated that in a preferred embodiment of the invention the particulate material of the invention does not contain any other bran-like material other than that bran-like material having all the properties (i) to (iv) as described herein which thus consists of all of the bran-like material by weight.

The edible particulate material of the invention may comprise other suitable ingredients such as flow aids, colourants and any other suitable and compatible ingredients known to those skilled in the art. However in a more preferred embodiment of the invention the particulate material comprises from 90% to 100% by weight, even more preferably 95% to 100% by weight, most preferably 98% to 100% by weight, for example consists only of (100% by weight) of the pre-treated, microbially released, processable particles of bran-like material having all the properties (i) to (iv) as described herein.

In another aspect of the invention there is provided a method of obtaining an edible particulate material of the invention (preferably a bran-like material of the present invention having all the properties (i) to (iv) as described herein) the method comprising the steps of:

(a) providing an edible particulate material (preferably a bran-like material) which has an unacceptable microbial load thereon and optionally is flavour unacceptable;

(b) treating the material from step (a) so that after treatment the resultant material is both microbially released and flavour acceptable;

to obtain microbially released, processable particles of material comprising bran-like material having all the properties (i) to (iv) as described herein.

Preferably the treatment step (b) comprises the step(s) of heating and/or microwaving the precursor material, more preferably heating the precursor material at a temperature from 95 to 160° C. for a temperature from 1 to 10 minutes and/or microwaving the precursor at a power from 100 W to 990 W for a period from 1 to 10 minutes.

Processability

As discussed above it is known that materials with a high content of dietary fibres, such as bran, increase the viscosity of the mass to which they are added especially when added to hydrophobic materials such as chocolate or fillings having oil based continuous phase. This phenomenon of a high viscosity increase has deterred widespread use of large amounts of bran in fat based edible compositions as the compositions are not easily processed and thus uneconomic to make.

To illustrate this effect the applicant has shown that a suspension of cellulose particles in oil exhibits a high viscosity at high shear rates compared to a similar suspension of sugar in oil. Without wishing to be bound by any mechanism it is believed that this viscosity difference may be caused by the irregular shape of the cellulose particles compared to sugar which produces a higher effective volume. It is also possible that the high percentage of small particles in the cellulose compared to sugar results in a higher particle surface to volume ratio. The applicant has also studied the structural characteristics of cocoa particles and found that the use of highly defatted cocoa powder in a fat based composition increases the viscosity of the composition compared to when conventional defatted cocoa powder or chocolate mass was used. Again without wishing to be bound by any mechanism, electron microscopy shows that the cocoa fat migrates into the voids of the highly defatted particles and therefore the increase in viscosity of highly defatted cocoa powder may be due to the consequent increase in the volume fraction of the cocoa particles.

Dietary fibres such as bran have the capacity to hold oil which can measured by their oil holding capacity (also denoted herein as OHC). Given the evidence above the applicant surprisingly has deduced that OHC can be used as an indicator of the degree to which a bran will increase viscosity of any oil based system to which it is added and thus be used as a predictive tool to select those brans that will of most readily processed when they are added to the fat based systems especially at high levels. Again without wishing to be bound by any mechanism it is believed that OHC can be modified by adjusting parameters such as fibres' surface area, the porosity of the material, its hydrophilic behaviour and/or its overall charge density. Thus the applicant believes that in one embodiment of the invention by selecting a sub-fraction of bran that has an optimum value of OHC and/or by modifying the method by which the bran is produced (for example by adjusting any of the preceding bran parameters) to achieve an OHC optimum value, one can arrive at brans of the invention which have the additional advantage that when they are added to a fat based system any viscosity increase that will occur is within manageable limits, i.e. such brans of the invention have improved processability. Thus the invention is in part the appreciation of which OHC values for bran can achieve this effect.

Particles of and/or used in the present invention may be characterised by additional parameters such as their ability to bind or hold liquids, for example using the parameters water holding capacity (WHC) and/or the oil holding capacity (OHC) useful for respectively aqueous based or fat based systems. WHC and OHC (and method for measuring them) are also described in the section herein on test methods, quoted as dimensionless units, WHC/OHC being measured as gram water or oil absorbed/held per gram of test material.

It is advantageous that bran particles of the present invention have a low WHC and/or OHC, as this makes it easier to incorporate these materials in a composition. A low OHC is especially advantageous as the particles absorb less fat and thus under given conditions the fat content of the composition can be reduced.

Preferred bran material of the invention has a WHC and/or OHC, (more preferably an OHC) of less than 2, even more preferably less than 1.8, most preferably less than 1.5. Usefully the WHC and/or OHC is more than 0.1.

Without wishing to be bound by any theory one can generally say that milling especially the preferred milling methods of the invention reduces the (oil or water) holding capacity of the bran, it is believed by breaking up the open porous structure of the fibre rich bran and thus reducing the bran's capacity, to incorporate fluid such as fat. Thus holding capacity provides information about the structure of particles in addition to that from measuring bulk properties such as surface area or average particle size.

Therefore in another aspect of the invention provides a method for selecting and/or modifying bran-like particles to have a WHC and/or OHC, preferably a OHC of from 0.7 to 1.5, usefully from 0.8 to 1.4, more usefully from 0.9 to 1.3, most usefully from 1.0 to 1.2, preferably the bran-like particles having one or more of those other properties as described herein.

A further aspect of the present invention provides use of bran-like particles having a WHC and/or OHC, preferably a OHC of from 0.7 to 1.5, usefully from 0.8 to 1.4, more usefully from 0.9 to 1.3, most usefully from 1.0 to 1.2, for the purpose of limiting the increase of the viscosity of a fat based edible composition to which the bran-like material is added, preferably to no more than an increase of 8 Pa·s, more preferably 6 Pa·s, even more preferably 4 Pa·s most preferably 2 Pa·s (the viscosity measured at a shear rate of 40 s−1, usefully under standard conditions); conveniently the bran-like particles having one or more other properties as described herein.

A yet further aspect of the present invention provides a fat based edible composition comprising:

from 10 to 60%, preferably from 20 to 50%, more preferably 25 to 45% by weight of bran-like material by total weight of composition;

the bran-like material having a WHC and/or OHC, preferably a OHC of from 0.7 to 1.5, usefully from 0.8 to 1.4, more usefully from 0.9 to 1.3, most usefully from 1.0 to 1.2, and the composition having a viscosity of from 2 to 12 Pa·s. preferably 4 to 11 Pa·s, even more preferably 5 to 10 Pa·s most preferably 6 to 8 Pa·s (the viscosity measured at a shear rate of 40 s−1, usefully under standard conditions); preferably the bran-like particles having one or more of those other properties as described herein.

Preferred aspects of the bran-like particles of and/or used in the present invention are those bran-like particles described herein that additionally also have an OHC from 0.7 to 1.5, usefully from 0.8 to 1.4, more usefully from 0.9 to 1.3, most usefully from 1.0 to 1.2.

Advantageously bran particles of the invention may have an OHC value from 0.7 to 1.5, usefully from 0.8 to 1.4, more usefully from 0.9 to 1.3, most usefully from 1.0 to 1.2, that is obtained by adjusting and/or selecting for one of more of the bran-like material parameters selected from: material surface area, porosity of the bran-like material, material hydrophilicity, and/or material overall charge density.

Flavour Acceptable

Wheat bran naturally contains enzymes. When adding wheat bran to a fat-based system, enzymes such as lipase and peroxidase may catalyse reactions with lipids. Lipase hydrolyses triglycerides resulting in free fatty acids. Peroxidase catalyses the oxidation of unsaturated fatty acids. These reactions produce off-flavours and undesired changes in functionality, especially when the bran is subject to higher temperatures.

Therefore in one aspect of the invention the precursor to the bran-like material of the invention is pre-treated e.g. by heat at a sufficiently high temperature (or equivalent conditions) to make the product microbially safe but is not heated to too high temperature (or equivalent conditions) that cause fat to react to generate off-flavours to an unacceptable extent due to the inherent presence of naturally occurring enzymes such as lipase or peroxidase. Avoidance of such off-flavours (as detected by a sensory panel and/or as defined by LA and/or PA values as described herein) is also referred to herein as flavour-acceptable. Flavour acceptability can be measured as an absolute and/or relatively as a change in a flavour comparing the flavour of a bran-like material before treatment (bran-like precursor) to the flavour of the bran-like material after treatment (bran-like material of the invention).

In another aspect of the present invention the bran contains a microbial load which is sufficiently low (or zero) to be safe to eat and also has a concentration of enzymes such as lipase and/or peroxidase which is sufficiently low (or zero) not to generate off-flavours to an unacceptable extent when the bran is added to fat (flavour acceptable).

A simple method to measure lipase activity in wheat and wheat bran as an estimation of storage quality has been described by Rose, D. J.; Pike, 0. A., Journal of the American Oil Chemists, 2006, 415-419 (=Rose & Pike 2006). Lipase activity (LA) may thus be measured using the method described in Rose and Pike 2006 in units of U/g, where 1 U is defined as the micro-equivalents of oleic acid liberated per hour. The lipase activity was correlated with the development of free fatty acid (FFA) during actual storage of heat-treated commercial bran. Lipase activity in conventional wheat bran was found to be typically in the range 2.17 to 9.42 U/g.

Inactivating lipase and retaining anti-oxidants has been found to enhance the stability of lipids in whole wheat flour, see Rose, D. J.; Ogden, L. V.; Dunn, M. L.; Pike, O. A., Cereal Chemistry, 2008, 218-223(=Rose et al 2008). To avoid lipid deterioration in the final product during shelf life, certain enzymes intrinsic to wheat bran were inactivated by heat treatment, microwave and steam heat treatments being found to be most efficient in decreasing lipase activity. However the bran heat treated in Rose et al 2008 ('Rose bran') is much coarser that the bran of the present invention. The Rose bran is stated to be 'virtually indistinguishable' from bran that was extracted from commercially ground wheat flour after passing through a no 50 sieve to have a size of 300 microns or less. Furthermore though particle shape of the Rose bran is unspecified as it is designed to match bran from commercial wheat flour as closely as possible. Therefore the Rose bran particles will not be spherical in shape. Thus a reader of Rose would have no reason to prepare the very differently shaped and sized bran particles of the present invention. Nor would a reader of Rose assume that the heat treatments stated to be optimal for Rose bran could be applied to the different bran of the invention.

In a preferred aspect of the invention the bran of the invention has an LA of less than or equal to 2 U/g, more preferably less than or equal to 1.5 U/g, even more preferably less than or equal to 1.0 U/g, and—most preferably less than or equal to 0.5 U/g, the LA measured using a copper soap assay as described in Rose and Pike 2006 at a temperature of 40° C. (conveniently at 35° C. more conveniently at 30° C., most conveniently under standard conditions) where the bran sample is incubated with 0.15 mL of water and 0.6 mL of olive oil at the designated temperature for 4 hours.

In a useful aspect of the invention the bran of the invention has an peroxidase activity (PA) of less than or equal to 2 U/g, more usefully less than or equal to 1.5 U/g, even more usefully less than or equal to 1.0 U/g, and—most usefully less than or equal to 0.5 U/g, for example approximately zero, the PA measured by a method analogous to the assay as described in Rose and Pike 2006 at a temperature of 40° C. (conveniently at 35° C. more conveniently at 30° C., most conveniently under standard conditions) where the bran sample is incubated with 0.15 mL of water and 0.6 mL of olive oil at the designated temperature for 4 hours.

In an alternative method to assess PA, equal quantities of guiacol (0.5% in aqueous solution) and hydrogen peroxide (1.5% in aqueous solution) may be added to the bran sample and a colour observed, where a clear colour indicates a negative result (no PA) and the presence of colour indicates a positive result (the presence of some active peroxidase). Conveniently bran of the invention has a negative result in this test of PA and thus is less likely to generate off flavours in the presence of fats.

In a preferred embodiment of the invention the bran has both a low PA value and a low LA value selected from any of the PA and LA values described above in any combinations thereof.

Advantageously the low PA of the bran (and/or optionally the low LA of the bran) may be obtained by treatment as described below.

A still yet further aspect of the present invention provides for use of microbially released bran-like particles of the present invention in a method to prepare a composition of the present invention, whilst substantially avoiding any off-flavours as tested by a sensory panel and/or as measured by the PA and LA values herein.

A still yet other aspect of the present invention provides for use of microbially released bran-like particles of the present invention as a bulking agent to replace some or all of the sugar in a fat based edible composition such that when the same amount of bran-like particles is used to replace the same amount sugar in the fat based composition, the composition with bran-like particles and composition with sugar substantially avoid any off-flavours as tested by a sensory panel and/or as measured by the PA and LA values herein.

To assess amount of undesired flavour development (such as roasting notes) that may be generated by too much heat treatment of in the wheat bran, a sensorial test may be used.

Sniffing Test for Roasted Notes

In the test, panelists assessed roasting notes on a scale from 0 to 4 (0=no perceptible taste, 1=taste just perceptible, 2=weak taste, 3=clear taste, 4=strong odour). To be acceptable herein bran-like material preferably has a low or no odour of the undesired heat generated roasted notes, i.e. is rated 2 or less, preferably rated 1 or less, most preferably rated 0 in the sniff test for roasting.

Roasted notes may be due to the presence of pyrazines generated at high temperatures from the well known Maillard reaction of amino acids in the presence of up fats and/or carbohydrates. Pyrazine compounds typical of those that generate roasted notes are selected from the group consisting of:

2-methylpyrazine; 2-ethylpyrazine; 2,3-dimethylpyrazine; 2,5-dimethylpyrazine; 2,6-dimethylpyrazine; 2,3,5-trimethylpyrazine; 2,3,5,6-tetramethylpyrazine; 2-ethyl-3-methylpyrazine; 2-ethyl-5-methylpyrazine; 2-ethyl-3,5-dimethylpyrazine; 2-ethyl-3,6-dimethylpyrazine; 2-isobutyl-3-methylpyrazine; 2-methoxypyrazine; 2-methoxy-3-methylpyrazine; 2-ethyl-3-methoxypyrazine; 2-Methoxy-3-isopropylpyrazine; and 2-isobutyl-3-methoxypyrazine; 2-secbutyl-3-methoxypyrazine. Unless the context indicates otherwise the term pyrazine compounds as used herein indicates the compounds in the preceding list.

Compounds that may be particularly characteristic of roasted flavour comprise pyrazines with cocoa, chocolate and nutty notes such as 2-ethyl-3,5-dimethylpyrazine and 2-ethyl-3,6-dimethylpyrazine.

In one embodiment of the present invention conveniently to be flavour acceptable after heat treatment herein 2-ethyl-3,5-dimethylpyrazine is present in the bran-like material in respective amounts in water from of from zero to less than 10, preferably <5, more preferably <3, even more preferably <2, most preferably <1.0 parts per billion (ppb), the last value being below the level of its odour detection (i.e. rated 0 in the sniffing test herein), for example this pyrazine is absent (i.e. not detectable by known analytical techniques).

In one embodiment of the present invention conveniently to be flavour acceptable after heat treatment herein 2-ethyl-3,6-dimethylpyrazine is present in the bran-like material in respective amounts in water from of from zero to less than 8, preferably <4, more preferably <2, even more preferably <1, most preferably <0.4 parts per billion (ppb), the last value being below the level of its odour detection (i.e. rated 0 in the sniffing test herein), for example this pyrazine is absent (i.e. not detectable by known analytical techniques).

Preferably the bran-like materials of the invention to be flavour acceptable have a total content of pyrazine compounds in water of less than 200 ppb, more preferably <100 ppb, even more preferably <50 ppb, most preferably <20 ppb, for example are free of any pyrazine compounds (i.e. are not detectable by known analytical techniques).

In another embodiment of the present invention usefully to be flavour acceptable after heat treatment the amount of pyrazines in the bran-like material has not increased to a significant amount, i.e. the pyrazine content has an increase of no more than 200 ppb ($\Delta$200 ppb), usefully no more than 100 ppb ($\Delta$100 ppb), more usefully no more than 50 ppb ($\Delta$50 ppb), even more usefully no more than 20 ppb ($\Delta$20 ppb), most usefully no more than 10 ppb ($\Delta$10 ppb), compared to the amount of total pyrazines present in the bran-like material before such treatment.

In another embodiment of the present invention usefully to be flavour acceptable after heat treatment the amount of 2-ethyl-3,5-dimethylpyrazine in the bran-like material has not increased to a significant amount, i.e. an increase of no more than 10 ppb ($\Delta$10 ppb), usefully no more than 5 ppb ($\Delta$5 ppb), more usefully no more than 3 ppb ($\Delta$3 ppb), even more usefully no more than 2 ppb ($\Delta$2 ppb), most usefully no more than 1 ppb ($\Delta$1 ppb), for example no more than 0.5 ($\Delta$0.5 ppb) compared to the amount of this pyrazine present in the bran-like material before such treatment.

In another embodiment of the present invention usefully to be flavour acceptable after up heat treatment the amount of 2-ethyl-3,6-dimethylpyrazine in the bran-like material has not increased to a significant amount, i.e. an increase of no more than 8 ppb ($\Delta$200 ppb), usefully no more than 4 ppb ($\Delta$4 ppb), more usefully no more than 2 ppb ($\Delta$2 ppb), even more usefully no more than 1 ppb ($\Delta$1 ppb), most usefully no more than 0.4 ppb ($\Delta$0.4 ppb), for example no more than 0.2 ppb ($\Delta$0.2 ppb) compared to the amount of this pyrazine present in the bran-like material before such treatment.

A still other aspect of the present invention provides for a method of heat treatment of the bran-like material used and/or of the present invention where the amount of pyrazine in the bran is monitored (in real time and/or by sampling) and the treatment is stopped before the total amount of pyrazine compounds and/or specific pyrazine compounds described herein (2-ethyl-3,5-dimethylpyrazine and 2-ethyl-3,6-dimethylpyrazine) that may be present in the bran reach any of the absolute or relative amounts that are given herein.

Enzymatic Activity

Enzymatic activities (lipase and peroxidase) were evaluated for various virgin wheat brans after different heat treatments using a sensorial sniffing test described below to confirm that the activity of these enzymes can be used as a proxy for the presence of off flavours.

To assess off-flavour development resulting from enzyme activity in the wheat bran, a sensorial sniffing test was used. In this test 50 g of completely melted milk fat, 25 g distilled water and 60 g of the wheat bran to be assessed were weighed in a 400 mL beaker and mixed to a homogeneous paste. The beaker, covered with a watch glass, was placed in an oven set at 30° C. Off-flavour development after 20 hours was assessed using a sniffing test (following a conventional method) by a trained sensory panel. In the sniffing test, panelists assessed the attributes; rancid, sour milk and cheesy (for example as shown plotted along the ordinate in FIGS. 15 and 16) on a scale from 0 to 4 (0=no perceptible odour, 1=odour just perceptible, 2=weak odour, 3=clear odour, 4=strong odour). To be acceptable herein bran-like material preferably has an odour for each one of these three off flavours (rancid, sour milk or cheesy) rated 2 or less, preferably rated 1 or less, most preferably rated 0.

Microbially Released

An edible material denotes a material which satisfies the legal or regulatory requirements that may be set for time to time in any jurisdiction for materials to be allowed to be sold for internal human consumption e.g. as a foodstuff, component and/or ingredient thereof. Such criteria may include any and/or all of the following: not injurious to health; fit for human consumption; unadulterated; of the nature or substance or quality demanded; and/or not be falsely or misleadingly presented or labelled.

As used herein a satisfactory micro-organism concentration (also referred to herein as satisfactory microbial load or food-safe or microbially-released) indicates that an edible material has a concentration of potentially harmful micro-organisms therein which is below (including zero) that concentration understood by a skilled person that would reasonably be expected generally to be safe for human consumption by an average typical healthy adult, i.e. so the edible material is immediately ready to eat without further treatment and can be released for human consumption.

Thus a satisfactory micro-organism concentration is also implied herein by use of up phrases such as 'food-safe' or 'microbially-released' and for example may be measured quantitatively as further described below. Preferably provision of microbially-releasable, food-safe, edible materials may be achieved by heat, microwave and/or other treatment of the edible material for example as described herein or by any similar or equivalent methods.

Thus a microbially released edible material of or used in the present invention satisfies the minimum criteria that:

(1) Samonella is not detected in a 25 g sample of the edible material by any suitable method(s) well known to those skilled in the art.

A treatment method (such as heat treatment) of or used in the present invention will satisfies the minimum criteria preferably such that the treatment can deliver a reduction of 5 log or greater in the amount of *Salmonella* (measured in cfu/g).

Usefully in the present invention microbially released edible material of or used in the present invention may satisfy one or more additional (preferably two, more preferably three, most preferably all) of the following criteria measured by any suitable method(s) well known to those skilled in the art:

(2) TVC less than $10^6$ cfu/g (optionally measured by PCA after incubation at 30° C. for 72 hours);

(3) Coliform less than 100 cfu/g (optionally measured by VRBGA after incubation at 37° C. for 24 hours);

(4) *E. Coli* less than 10 cfu/g (optionally measured chromogenically (TB×Agar))

(5) Yeasts less than $10^2$ cfu/g (optionally measured by RBCA Choramphenol); and (6) Moulds less than $10^3$ cfu/g (optionally measured on an agar base);

(7) Aerobic colony count (ACC) of less than 10000 colony-forming units per gram ($<10^4$ cfu/g);

The values given in the embodiments above are upper limits and ideally none of these micro-organisms listed in criteria (1) to (7) would be present at all in preferred edible materials (such as the preferred heat treated bran-like material of the invention) whether below the threshold of detection or not. So it will be appreciated that the limits above encompass zero, i.e. the complete absence of any of the specified organisms. Unless otherwise indicated all tests are carried out under standard conditions.

Aerobic colony count (ACC) is also known as the total viable count or standard plate count, and is the total number of bacteria able to grow in an aerobic environment at a moderate temperature (preferably 20° C., more preferably 30° C.). Generally ACC (criteria (7)) is used to measure quality and would be combined with criteria (1) and any one or more of other criteria (2) to (6), ideally all of these in a more effective measure to monitor food safety.

Thus as used herein the terms 'heat treated' or 'heat treatment' of a material (e.g. when referring to the bran particles of or used in the present invention) may in one embodiment of the invention denote any treatment comprising one or more of the step(s) of;

(a) the material is microwaved at a power of at least 100 W for at least 7 minutes;

(b) the material is exposed to a temperature in of at least 95° C. for at least 3 minutes (preferably in an oven, in an extruder and/or by exposure to steam); and/or (c) the material being treated (whether by heat, microwave or otherwise) to ensure the material is food safe and can be microbially released, optionally the treatment being up equivalent to inputting the same or greater total energy and/or power into the material as given in step(s) (a) and/or (b).

Microbial acceptability is typically measured as an absolute value (or required limit) but may also be measured relatively as a change in a microbial-load comparing a bran-like material before treatment (bran-like precursor) that has an unacceptable microbial load therein (e.g. a 'virgin' bran) to the bran-like material after treatment (bran-like material of the invention) which has a sufficiently low (or no) microbial load to be acceptable to be released for human consumption.

Moisture Content

The applicant has found that the moisture content of non-heat treated bran can be reduced to a greater degree by steam treatment compared to treatment by microwaving.

Without wishing to be bound by any theory it is believed that the lower the moisture content in a material (preferably the bran-like material, more preferably the bran) of and/or used in the present invention the more advantageous, as with less moisture therein the material has less an impact on viscosity when added to a fat based system (and thus be easier to process by pumping and layering) and/or with less water the material will be less susceptible to microbial contamination and/or growth and therefore the more food safe the material will be for use as an ingredient in foodstuffs.

Thus in one embodiment of the invention the material (preferably the bran-like material, more preferably the bran) of and/or used in the compositions of the invention (optionally after pre-treatment as described herein) and has a moisture content of less than or equal to 9.5%, usefully less than or equal to 8%, more usefully less than or equal to 7%, even more usefully ≤6%, most usefully ≤5%, by weight of the total amount of material.

Thus in another embodiment of the invention the treatment method of the material (preferably the bran-like material, more preferably the bran) of and/or used in the compositions of the invention as described herein reduces the moisture content of the material by at least 20%, conveniently at least 30%, more conveniently at least 30%, even more conveniently ≥40%, most conveniently ≥50% calculated by comparing the weight of moisture in the material before treatment to the moisture in the material immediately after treatment.

Treatment of Bran

The bran like material of the invention may be obtained and/or obtainable by pre-treating a precursor bran-like material such that the precursor bran like material is deemed microbially acceptable whilst also still having an acceptable flavour profile (preferably as defined by any of the PA and LA values described above in any combinations thereof). This requires balancing conflicting factors in parameters for the pre-treatment and preferred values for such pre-treatments that provide a food safe material without generating unacceptable off flavours are given herein.

Another aspect of the present invention provides for pre-treatment of bran-like material in a method to prepare a composition of the present invention to ensure the resultant bran-like materials is both microbially released whilst also substantially avoiding any off-flavours as tested by a sensory panel and/or as measured by the PA and LA values herein.

Advantageously the pre-treatment of the precursor for the bran-like materials of the present invention may be heat treatment and/or microwave treatment such as any of those treatments described herein. Preferred treatments are use of a microwave and/or thermal heating by use of an oven, extruder and/or steam.

In another embodiment of the present invention the bran like material of the invention may be obtained and/or obtainable by pre-treating a precursor bran-like material by heating at a temperature from 95 to 160° C., optionally using steam in an amount of from 5 to 15% by volume for up to 120 minutes, more advantageously at 110 to 160° C. using from 10% to 15% by steam volume for 1 to 100 minutes, even more advantageously at 120 to 160° C., with from 10% to 15% steam volume for 10 to 60 minutes, most advantageously at 140 to 160° C. with 12% to 15% steam volume for 15 to 60 minutes.

In a still further embodiment of the present invention the bran like material of the invention may be obtained and/or obtainable by pre-treating a precursor bran-like material by extruding the material in an extruder at a temperature from 95 to 160° C., optionally the material being fed through the extruder at a rate to achieve an material residence time in the extruder of from 2 to 10 minutes. advantageously at an extruder temperature of 110 to 160° C. with a residence time of from 2 to 8 minutes, more advantageously at 120 to 160°

C. with residence time of 3 to 7 minutes, most advantageously at 140 to 160° C. with residence time of 4 to 6 minutes.

In yet another embodiment of the present invention the bran like material of the invention may be obtained and/or obtainable by pre-treating a precursor bran-like material by heating at a temperature of at least 95° C. to 120° C., preferably from 100° C. to 115° C., more preferably from 105° C. to 110° C. Usefully in this embodiment the bran was heated for a period of from 2 to 10 minutes, more usefully from 3 minutes to 8 minutes and most usefully from 4 to 7 minutes.

In a still other embodiment of the present invention the bran like material of the invention may be obtained and/or obtainable by pre-treating a precursor bran-like material by microwaving at a power of from 100 to 990 W, preferably from 200 to 800 W, more preferably from 300 to 700 W. Conveniently in this embodiment the bran was microwaved for a period of from 1 to 9 minutes, more conveniently from 2 to 7 minutes, most conveniently from 3 to 6 minutes.

In a further embodiment of the present invention the bran like material of the invention may be obtained and/or obtainable by pre-treating a precursor bran-like material by microwaving at a power and for such a period that the total energy imparted to the product is from 42 kJ to 55 kJ (e.g. achieved at any of the following settings: for 7 mins (420 sec) at 100 W or 46⅔ sec at 900 W or 42.42 sec at 990 W to 9 mins 50 sec (550 sec) at 100 W, 62.11 sec at 900 W or 55.56 sec at 990 W).

In a yet further embodiment of the present invention the bran has been treated other than by forming a slurry with an aqueous carrier.

Heat Treated Bran

In one embodiment of the present invention the bran is heat treated. Preferred methods for heat treatment of the bran are other than a conventional oven. More preferred methods are selected from microwaving, extruding and/or heating together with use of steam. This is because conventional ovens alone have been found less effective at sterilisation. This is shown below by testing various heat treated brans for peroxidase activity (which is an indicator for micro-biological activity as well as off flavour). Virgin bran treated with the non-convective oven shows peroxidase enzyme activity the other heat treatments do not.

| Material | Heat treatment method | Peroxidase activity |
|---|---|---|
| Virgin bran | Conventional oven | Positive |
| Virgin bran | Microwave | Negative |
| Virgin bran | Conventional heating plus steam | Negative |

In one embodiment of the invention usefully heat treatment can be achieved by microwaving the bran, optionally at a power of at least 100 W, for at least 7 minutes. Advantageously the heat treatment may expose the bran to a temperature of at least 95° C., more advantageously at least 100° C., for example at least 102° C. The bran may conveniently be held at elevated temperatures in the microwave for a residence time of at least 1 minute, preferably at least 2 minutes and more preferably at least 3 minutes.

In another embodiment of the invention conveniently heat treatment can be achieved by heating the bran in a tube comprising steam in an amount of at least 10% by weight, more conveniently at least 12% by weight, most preferably at least 15% by weight, the temperature of the tube being held at a temperature preferably of at least 120° C. (with steam at 15% or more by weight), more preferably of at least 140° C. (with steam at 10%, even more preferably at least 15% by weight), most preferably at least 160° C. with steam at 10% or more for example at least 15% by weight), and with a bran residence time of usefully from 2 to 10 minutes, more usefully from 4 to 6 minutes, for example approximately 6 minutes.

The heat treatment may occur at any time, in one useful embodiment of the invention before the bran is milled.

Preferred brans of the invention are heat treated (for example as described above) to deactivate microbes and also to reduce the enzyme activity of the bran as far as possible to minimise the impact on quality and shelf life of the final product, especially where the bran is added to a composition to act as a sugar replacer (where for example it may be added in large amounts).

Usefully heat treated brans of the invention have a moisture content of no more than 10%, more preferably no more than 5% by weight of the total weight of bran after the heat treatment.

The applicant has not found any adverse effects on the sensory profile of the bran using either of the heat treatments as described herein.

Micronised Bran

Particles having the properties (i) to (iii) described herein are also referred to as 'micronised' particles, i.e. particles that have the properties of Vol MPS, Vol. PSD and $S_{50}$ as described herein as respective elements (i) to (iii) above.

The term 'micronised bran' as used herein denotes bran (or bran-like material) which has been treated (e.g. by mechanical treatment such as milling) so the bran particles have the properties of Vol. MPS, Vol. PSD & $S_{50}$ as described herein as respective elements (i) to (iii) above.

(I) MEAN PARTICLE SIZE (MPS) by Volume

The micronized particles have a volume mean particle size (Vol. MPS) of from 5 to 100 microns (defined and measured as described herein).

In the present context the term "mean particle size" is preferably used interchangeable with the term "average particle size" The mean particle size described herein is given as a linear dimension in units of microns (1 μm=1× $10^{-6}$ m) unless clearly indicated otherwise. These values are calculated from mean volume of the particles in a sample (volume mean), where the linear dimension would be the diameter of a theoretical spherical particle of same volume as the volume mean. Using this method does not require that the particles adopt any particular shape in practise (so may be used where particles that have substantially non spherical or irregular shapes). The volume mean may be measured by any suitable method known to those skilled in the art such as laser diffraction.

For example the volume mean particle size may be measured by the following method which obtains a mean volume diameter of the particles by laser diffraction using a Malvern optical instrument (Mastersizer 2000, Malvern, Herrenberg, Germany). The Malvern instrument is equipped with a Scirocco 2000 Unit for dry powder dispersion. Distributions are made in duplicate for each sample. Size distribution is quantified as the relative volume of particles in size bands is presented as size distribution curves (Malvern MasterSizer Micro software v 5.40). Particle size distribution parameters that may be recorded by this method include the Vol. MPS, (optionally labelled as D[4, 3] in this method); and parameters labelled D[90,3] and D[50,3] and optionally D[10,3] that are used to characterize the Vol. PSD as defined herein.

The micronized particles (conveniently micronized bran, more conveniently bran fibre particles) have a volume mean particle size of less than or equal to 100 microns, preferably less than or equal to 80 microns, more preferably less than or equal to 70 microns, even more preferably less than or equal to 60 microns most preferably less than or equal to 50 microns for example less than or equal to 45 microns.

The micronized particles (conveniently micronized bran, more conveniently bran fibre particles) have a volume mean particle size of greater than or equal to 5 micron, usefully greater than or equal to 10 microns, more usefully greater than or equal to 12 microns, even more usefully greater than or equal to 15 microns most usefully greater than or equal to 25 microns for example greater than or equal to 20 microns.

The micronized particles (conveniently micronized bran, more conveniently bran fibre particles) may has a mean particle size of from 5 to 100 micron, conveniently from 10 to 80 microns, more conveniently from 12 to 70 microns, most conveniently from 15 to 60 microns; for example conveniently from 20 to 50 microns.

(II) Particle Size Distribution by Volume (Vol PSD)

The parameter denoted by the symbol in the format $D_{P,3}$ is measured in units of length (e.g. microns) and denotes that particle diameter for which P % of the total volume taken by the particle in the sample have a diameter smaller or equal to the length given for this parameter. Thus for example if $D_{90,3}=1$ micron, this means 90% of the total volume of particle in the sample is provided by those particles having a diameter 1 micron or less.

Parameter $D_{90,3}$ is used herein to indicate volume weighted diameter together with analogous parameter $D_{50,3}$ and optionally also parameter $D_{10,3}$ (the diameters at which respectively 50% and 10% of the volume occupied by all particles lie) to define a particular distribution of particle sizes.

In some preferred embodiments of the invention the micronized bran particles of and/or used in the present invention may also have a Vol. PSD which is bi or monomodal.

The Vol. PSD can be determined by sieving the material into components with given sizes and Vol. PSD may be characterized by the volume fraction of the total particles of a given size as indicated below.

$D_{90,3}$ PSD Volume ≤90%

The micronized particles (conveniently micronized bran, more conveniently bran fibre particles) have a Volume PSD characterised by a $D_{90,3}$ value less than or equal to 300 μm; where in one embodiment the $D_{90,3}$ may be less than or equal to 300 μm, preferably less than or equal to 250 microns, more preferably less than or equal to 200 microns, even more preferably less than or equal to 150 microns, most preferably less than or equal to 120 microns for example less than or equal to 100 microns.

In another embodiment the micronized particles (conveniently micronized bran, more conveniently bran fibre particles) may have a Volume PSD characterised by a $D_{90,3}$ value greater than or equal to 10 micron, usefully greater than or equal to 20 microns, more usefully greater than or equal to 30 microns, even more usefully greater than or equal to 40 microns, most usefully greater than or equal to 45 microns, for example greater than or equal to 50 microns.

In a still other embodiment the micronized particles (conveniently micronized bran, more conveniently bran fibre particles) may have a Volume PSD characterised by a $D_{90,3}$ value from 10 to 350 micron, conveniently from 20 to 250 microns, more conveniently from 30 to 200 microns, even more conveniently from 40 to 150 microns; most conveniently from 45 to 120 microns for example conveniently from 50 to 100 microns.

$D_{50,3}$ PSD Volume ≤50%

The micronized particles (conveniently micronized bran, more conveniently bran fibre particles) have a Volume PSD characterised by a $D_{50,3}$ value less than or equal to 50 μm, preferably less than or equal to 45 microns, more preferably less than or equal to 40 microns, even more preferably less than or equal to 30 microns, most preferably less than or equal to 25 microns, for example less than or equal to 20 microns.

In further embodiment the micronized particles (conveniently micronized bran, more conveniently bran fibre particles) may have a Volume PSD characterised by a $D_{50,3}$ value greater than or equal to 1 micron, usefully greater than or equal to 5 microns, more usefully greater than or equal to 8 microns, even more usefully greater than or equal to 10 microns, most usefully greater than or equal to 12 microns for example greater than or equal to 15 microns.

In still further embodiment the micronized particles (conveniently micronized bran, more conveniently bran fibre particles) may have a Volume PSD characterised by a $D_{50,3}$ value from 1 to 50 micron, conveniently from 5 to 45 microns, more conveniently from 8 to 40 microns, even more conveniently from 10 to 30 microns most conveniently from 12 to 25 microns; for example conveniently from 15 to 20 microns.

$D_{10,3}$ PSD Volume ≤10%

The micronized particles (conveniently micronized bran, more conveniently bran fibre particles) optionally have a Volume PSD characterised by a $D_{10,3}$ value less than or equal to 15 μm, preferably less than or equal to 12 microns, more preferably less than or equal to 10 microns, even more preferably less than or equal to 8 microns, most preferably less than or equal to 6 microns, for example less than or equal to 5 microns.

In yet other embodiment the micronized particles (conveniently micronized bran, more conveniently bran fibre particles) may have a Volume PSD characterised by a $D_{10,3}$ value greater than or equal to 0.1 micron, usefully greater than or equal to 0.5 microns, more usefully greater than or equal to 1 microns, even more usefully greater than or equal to 1.5 microns, most usefully greater than or equal to 2 microns for example greater than or equal to 3 microns.

In still yet other embodiment the micronized particles (conveniently micronized bran, more conveniently bran fibre particles) may have a Volume PSD characterised by a $D_{10,3}$ value from 0.1 to 15 micron, conveniently from 0.5 to 12 microns, more conveniently from 1 to 10 microns, even more conveniently from 1.5 to 8 microns, most conveniently from 2 to 6 microns; for example conveniently from 3 to 5 microns.

Span (Q3)

Particle size of the micronized particles (such as micronized bran) may also be characterised by another parameter, the dimensionless value SPAN (Q3) calculated for the volume weighted particle size distribution by determining the ratio of $(D_{90,3}-D_{10,3})/D_{50,3}$. This is a measure to evaluate the width of the volume weighted particle size distribution. A lower SPAN (Q3) value indicates a narrower particle size distribution.

Thus in some preferred embodiments of the invention the Vol. PSD of the micronized bran particles of and/or used in the present invention may also be characterised by a volume size distribution SPAN (Q3) of from 10 to 30.

The micronized particles (such as micronized bran) may comprise particles (preferably fibre particles) having a Volume PSD characterised by a SPAN (Q,3) of less than or equal to 30, preferably less than or equal to 28 more preferably less than or equal to 25, most preferably less than or equal to 22 for example less than or equal to 20

The micronized particles (such as micronized bran) may comprise particles (preferably fibre particles) having Volume PSD characterised by a SPAN (Q,3) of greater than or equal to 10, usefully greater than or equal to 12, more usefully greater than or equal to 14, most usefully greater than or equal to 16 for example greater than or equal to 18.

The micronized particles (such as micronized bran) may comprise particles (preferably fibre particles) having a Volume PSD characterised by a SPAN (Q,3) from 10 to 30, conveniently from 12 to 28, more conveniently from 14 to 26, most conveniently from 16 to 24; for example conveniently from 18 to 22.

Sphericity of a particle may be measured by a dimensionless parameter denoted S that lies between 0 and 1. S may be determined from a suitable 2D image (e.g. under magnification of 10 times) of a representative sample of particles, which shows their area at various planes of that pass through the particles (cross-section of the particles), which generally will be aligned randomly in the image plane. For a given particle, S is the ratio of the actual perimeter around the particle's cross-section compared to the circumference of a circle having the same area as that that cross-section ('equivalent circle'). S is determined so the largest number is always the denominator and S is a ratio which is never more than 1. If the perimeter of the particle is larger than the perimeter of the equivalent circle the particle perimeter is the denominator to calculate S for that particle. If the perimeter of the particle is smaller than the perimeter of the equivalent circle the particle perimeter is the nominator to calculate S for that particle. Thus an individual particle with a cross-section which is substantially circular (such as a cross-section from a sphere), are more likely to have an individual S value of close to 1 than particles of other shapes. For a population of particles the cross sectional area as seen in the image plane may be from a plane that passes through any part of the particle.

An average S value ($S_{mean}$) may be calculated from the individual S values from a population of particles viewed in the 2D image and $S_{mean}$ will provide information about the predominate shape of the particles that make up the image (and thus the overall sample).

For a population of particles which are randomly arranged and thus are disposed at any orientation with respect to the arbitrarily selected 2D image plane it is particles which are spherical which will consistently be viewed as having circular cross-sections as the orientation of the particle will not affect their cross-sectional shape. Thus when $S_{mean}$ is calculated for a population of particles the closer the $S_{mean}$ is to 1 the higher the proportion of the particles in a sample that will be spherical. At the limit a population of particles that consisted only of spheres would have 100% of particles ($S_p=S_{100}$) having an S value of 1.

As well as $S_{mean}$ as an alternative, a threshold parameter $S_p$ can also be used to signify the overall S value (i.e. degree of sphericity) for a given population of many particles of potentially various shapes. $S_p$ denotes that percentage number of particles 'p' which have a S value that satisfies a given criteria for the individual particles that will correspond to a tighter or looser definition of what spherical-like shape is required. When referring to multiple particles, if no subscript is denoted unless the context indicates otherwise then the S value can be considered to refer to $S_{100}$ where all particles have at least this minimum value and/or $S_{mean}$ the average S value for all the particles (so some particles may be above and some below this value).

For a given particle population the more the particles' shape is on average satisfying the stated definition for 'spherical-like' the greater the proportion of 'spherical-like' particles that exist within a given sample of particles and the nearer the value of either the parameter '$S_r$' or '$S_{mean}$' will be to 1

Thus when characterising the sphericity of a sample of particles, various alternatives can be envisaged all of which are in the scope of the present invention. In one embodiment a value can be fixed to define a desired sphericity and either $S_{mean}$ or the percentage of particles having that value ($S_p$) can be quoted. For example if it is desired to have n % of particles with an S of at least 'x' ('x' being ≤1), the sample can be characterised by $S_n \geq x$. These values can be determined empirically either by fixing 'n' and determining 'x' or vice versa. Thus for example one can assess the percentage having a minimum degree of sphericity (x) and then count the proportion of particles having at least that 'x' value or higher (the proportion of particles in a sample measured that have a pre-determined spherical character). Alternatively one can fix a desired threshold percentage 'n' and determine empirically the least value of 'x' exhibited by this many particles (the spherical character assessed for a fixed proportion of particles within the sample).

The populations of particles of or used in the invention may also be modified (e.g. by adding or removing particles of a given shape by methods such as classifying, mixing and/or sieving) such that the overall shape targets as defined by $S_{mean}$, and/or $S_p$ values herein satisfy any of those values given herein.

S values may be greater than or equal to given sphericity value or within a range (e.g. >0.8 for looser sphere-like shape or from 0.9 to 0.95 for a tighter definition of sphere-like where pure spheres are not needed). It will be understood that given the definition above, unless otherwise stated a value of S greater than 'x' implies the upper limit of S is 1.

The closer the value of S will be to 1 for an individual particle the close that shape is to an ideal sphere with values below 1 being less spherical-like in shape. The narrower the range of S indicates the more tight definition of spherical-like is required, broader ranges indicate looser definitions of spherical-like are acceptable for those populations of particles.

The parameter $S_{50}$ referred to herein denotes at least 50% or more of the particles measured have an S value satisfying a specific criteria which corresponds to a degree of spherical-like shape. The higher $S_{50}$ (or other $S_p$ value) the higher proportional of spherical-like particles (as defined by the specific criteria) that are present within the particle sample and the smaller the $S_{50}$ (or other $S_p$ value) indicating a greater proportion of the population of particles that have a less spherical-like, more irregular shape. Other S values may be used to define the sphericity of the particles of the invention, to ensure a greater proportion of particles with the spherical-like criteria specified and less irregular shaped particles overall. Thus particles of the invention may have $S_{mean}$, optionally $S_{50}$, $S_{60}$, more usefully $S_{70}$, even more usefully $S_{80}$, most usefully $S_{90}$, for example $S_{100}$ values having any of the optional values for spherical-like given herein in other embodiments for S.

For a given particle population the more spherical the particles' shape is on average and/or the greater the proportion of spherical particles that exist within a given sample of particles the closer the value of S will be to 1 for each particle and/or the higher the percentage 'p' in $S_p$ that may be measured that satisfy a given (higher) S value. So for example a particle sample consisting of just spheres would have an $S_{100}$ of 1. In another example a particle sample consisting of 100% of a looser sphere-like shape targets may have an $S_{100}$ greater than 0.5 (e.g. from 0.5 to 1.0). In a further illustrative example a particle sample with 50% of fairly spherical-like shapes might be characterised by a $S_{50}$ being from 0.9 to 0.95.

The micronized particles (conveniently micronized bran, more conveniently bran fibre particles) may have a particle shape characterized by a sphericity measured by a $S_{mean}$ value (optionally $S_{50}$, usefully $S_{60}$, more usefully $S_{70}$, even more usefully $S_{80}$, most usefully $S_{90}$, for example $S_{100}$) of greater than or equal to 0.75, preferably of greater than or equal to 0.8, more preferably of greater than or equal to 0.82, even more preferably of greater than or equal to 0.85, most preferably of greater than or equal to 0.9, for example of greater than or equal to 0.95.

The micronized particles (conveniently micronized bran, more conveniently bran fibre particles) may have a particle shape characterized by a sphericity measured by a $S_{mean}$ value (optionally $S_{50}$, usefully $S_{60}$, more usefully $S_{70}$, even more usefully $S_{80}$, most usefully $S_{90}$, for example $S_{100}$) of less than 1.00, advantageously of less than or equal to 0.95, more advantageously from 0.75 to 0.95, most advantageously from 0.8 to 0.95.

The micronized particles (conveniently micronized bran, more conveniently bran fibre particles) may have a particle shape characterized by a sphericity measured by a $S_{mean}$ value (optionally $S_{50}$, usefully $S_{60}$, more usefully $S_{70}$, even more usefully $S_{80}$, most usefully $S_{go}$, for example $S_{100}$) from 0.75 to 1.0, advisably from 1.2 to 1.0, more advisably from 0.82 to 1.00, even more advisably from 0.85 to 1.00, most advisably from 0.9 to 1.0, for example from 0.95 to 1.00, such as 1.0.

Further preferences for these parameters are given in the claims herein, the contents of which are hereby incorporated into the description.

Number Weighted Values for MPS and/or PSD

In an alternative and/or preferred embodiment of the invention the particles of and/or used in the present invention may be characterised numbered weighted values equivalent to the volume values described herein, with the same preferred values as given for the volume values herein.

Thus the micronized particles (such as micronized-bran) of and/or used in the present invention may have a number mean particle size (NBR. MPS) of from 5 to 100 microns (analogous to the Vol. MPS defined as described herein and measured by any suitable method known to those skilled in the art. Preferred values of NBR. MPS may be as those given for VOL. MBS The number weighted PSD (NBR. PSD) may be characterised by a symbol in the from $D_{P,0}$ measured in units of length (e.g. microns) denotes that particle diameter for which P % of the total number of particles counted in the sample have a diameter smaller or equal to the length given for this parameter. Thus $D_{90,0}$, $D_{95,0}$ and $D_{10,0}$ are the number weighted equivalents of the volume parameters denoted by $D_{90,0}$, $D_{95,0}$ and $D_{10,0}$. Similarly the value SPAN(Q0) is calculated for the numbered weighted particle size distribution $[(D_{90,0}-D_{10,0})/D_{50,0}]$ analogously to the SPAN(Q3) value.

Bran-Like Material

The term bran-like material' as used herein is understood to denote material including bran but also any other plant material with similar properties to bran that may be micronized and otherwise treated to have the properties as described herein. Such other plant material may comprise: outer shells, outer layers of other seeds, internal shells from drupe and/or internal shells from drupaceous fruits.

A non limiting list of suitable outer shells and/or outer seed layers which may be suitable as a source to generate the micronised bran-like material for use in the present invention may comprise for example cocoa shells, and/or shells and/or outer layers from other common edible nuts and/or gymnosperm seeds: such as almond; brazil nut, candle nut, cashew, chestnut, hazelnut, macadamia, mongongo, peanut, pecan, pine nut, pistachio, and/or walnut.

Drupe are indehiscent fruit that do not split along a line of weakness, and have an outer part (exocarp or skin; and/or mesocarp or flesh) surrounding a shell which has a hard endocarp with a seed kernel inside. Such internal shells from drupe may include pit, stone or pyrene. A non limiting list of drupes which may be suitable as a source of internal shells to generate the micronised bran-like material for use in the present invention may comprise: almond, apricot, avocado, cherry, coffee, damson, jujube, mango, nectarine, palms (for example: coconut, date, oil and/or sabal palm), olive, peach, pistachio, plum and/or white sapote.

It will be appreciated that some types of other plant material may fall into one or more of the above categories which may overlap and/or the materials may be different derived from different parts of the same plant.

Such other plant material—for example the shells (outer or interior) described above—may or may not also be roasted before being treated to have the other properties of the bran-like material of the invention described herein.

Usefully other plant material that may be used to prepare bran-like material for use in the present invention are cocoa shells and/or date pits (which may optionally be roasted). Preferred bran-like material is bran, more preferably bran from whole grain cereals, however unless the context herein clearly indicate otherwise the terms 'bran', 'bran-like' and/or 'bran-like material' are used herein interchangeably.

Bran originates from the whole grains of cereal plants. The entire grain seed comprises the germ, the endosperm and the bran. The term 'bran' when used specifically to refer to cereals herein denotes that part of the whole grain that remains after the germ and endosperm components have been completely or substantially removed and comprises the hard outer layers of the grain such as the combined aleurone and pericarp. As such bran is very high in fibre which in its unprocessed state is insoluble and difficult to process. Bran will also be understood to denote any material comprising or consisting of the bran prior to treatment as described herein thus bran may include unprocessed bran but also some brans that have been treated in other ways, for example heat treated to prevent microbiological contamination (as described later).

Whole-grain flour denotes flour milled from the entire grain seed meaning that it contains endosperm, germ and bran, all preferably from the same cereal, in the same weight proportions as naturally found in that cereal. Whole grain are a recognised source of dietary fibres, phytonutrients, antioxidants, vitamins and minerals. Refined flour contains mainly endosperm.

Bran-like material used in the present invention is preferably bran obtained and/or obtainable from whole grain cereals, some non-limiting examples of which include barley, buckwheat, bulgur, canary grass, common oat (*Avena sativa*, also referred to herein as oats), corn, millet, rice (e.g. black rice, brown rice and/or wild rice), rye, sorghum, spelt, teff, triticale, wheat and, wheat berries. More preferred whole grain cereals are those from the monocotyledonous plants of the Poaceae family (grass family) cultivated for their edible, starchy grains. Plant species that do not belong to the grass family also produce starchy seeds or fruits that may be used in the same way as cereal grains, are called pseudo-cereals. Examples of pseudo-cereals include amaranth, buckwheat, tartar buckwheat and quinoa. Unless the context herein clearly indicates otherwise the term 'cereal' as used herein includes both cereal and pseudo-cereals; and the brans used herein may be from either type. In general the source of grain that is used depends on the product to which it is to be added, since each grain has its own taste profile.

Further non-wheat sources of grain to obtain bran material for use in the present up invention (which may overlap with the previous lists) may comprise legumes such as beans and/or soybeans; warm season cereals (such as maize kernels; finger millet; fonio, foxtail millet; Kodo millet; Japanese millet. Job's Tears; maize (corn); pearl millet; proso millet; and/or sorghum); cool season non wheat cereals (such as barley, oats, rice, rye, teff, triticale and/or, wild rice); pseudocereal grains; (such as starchy grains from broadleaf plant families: amaranth buckwheat, smartweed and/or quinoa); grain legumes and/or pulses (such as lentil, pea, chickpeas, common beans, fava beans, garden peas, lentils, lima beans, lupins, mung beans, peas, peanuts, pigeon peas, runner beans and/or, soybeans), cassava (*Maihot esculenta*) and/or any suitable combinations and/or mixtures thereof.

Usefully the bran like material for use in the present invention are brans obtained and/or obtainable from the whole grains of a plant selected from the group consisting of: barley, rice, brown rice, wild rice, black rice, buckwheat, bulgur, corn, millet, oat, sorghum, spelt, triticale, rye, wheat, wheat berries, teff, canary grass, Job's tears, fonio, amaranth, buckwheat, tartar buckwheat, quinoa and mixtures thereof. More usefully the brans are those from whole grains of corn, rice, barley and/or wheat. Even more usefully the brans are those from whole grains of wheat (including low grade, hard and/or soft wheats), most usefully brans from wheat which has been graded as hard or soft wheat, for example brans from soft wheat.

Wheat

Wheat can be classified in many different ways by different national and international bodies. For example the trade body Wheat Quality Australia in their latest (as of the filing dated of the present application) Wheat Classification Guidelines dated October 2013 (the contents of which are hereby incorporated by reference) classifies wheat into the following categories: Australian Prime Hard (APH), Australian Hard (AH), Australian Premium White (APW), Australian Standard White (ASW), Australian Premium Durum (APDR), Australian Soft (ASFT), Australian Standard Noodle (ASWN), Australian Premium Noodle (APWN) and Australian Feed (FEED).

The United States classifies wheats into five grades from 1 (hardest) to 5 (softest) and also into the following different wheat categories:

Durum (D) wheat is a very hard, translucent, light-coloured grain used to make semolina flour for pasta and bulghur and has a high gluten content.

Hard Red Spring (HRS) wheat is a hard, brownish, high-protein wheat used for bread and hard baked goods commonly used to make bread flour and high-gluten flours.

Hard Red Winter (HRW) wheat is a hard, brownish, mellow high-protein wheat used for prepare bread, hard baked goods and as an adjunct in other flours to increase protein in pastry flour for pie crusts. HRW is often used as the sole component of unbleached all-purpose flours.

Hard White (HW) wheat is a hard, light-coloured, opaque, chalky, medium-protein wheat planted in dry, temperate areas and is used for bread and brewing.

Soft Red Winter (SRW) wheat is a soft, low-protein wheat used for cakes, pie crusts, biscuits, and muffins and typically used to make cake flour, pastry flour, and some self-rising flours with added baking powder and salt.

Soft White (SW) wheat is a soft, light-coloured, very low protein wheat grown in temperate moist areas, commonly used for pie crusts and pastry.

Other US wheat categories are Soft Red Spring (SRS), Unclassed (U), and Mixed (M).

France characterises wheat in the categories of: BAF (corrective/strong wheat), BPS (superior bread making), BPC (standard bread making), BAU (Other uses, biscuits or up feed). Germany characterises wheat in the categories of: E (elite), A (quality bread), B (standard bread), K (biscuit). Since 2004 the United Kingdom has characterises wheat for export from the UK as ukp (bread wheat) and uks (soft wheat) based on the following criteria.

|  | ukp | uks |
| --- | --- | --- |
| Specific Weight | 76 kg/hl (min) | 75 kg/hl (min) |
| Moisture content | 15% (max) | 15% (max) |
| Ad mix | 2% (max) | 2% (max) |
| Hagberg Falling Number (HFN) | 250 (min) | 220 (min) |
| Protein | 11-13% | 10.5-11.5% |

Similar and comparable standards to define wheat grades exist in other territories.

Soft Wheat

Soft wheats are milled to produce soft flour which as used herein denotes flour that has a low protein content, preferably having a protein content of less than 11%, more preferably less than 10%, most preferably less than 9%, by weight of total weight of flour. Usefully the protein content of soft flour is at least 5%, more usefully at least 6%, most usefully at least 7% by weight of total weight of flour. Conveniently soft flour has a protein content from 5% up to 11%, more conveniently from 6% to 10%, most conveniently from 7% to 9% by weight of total weight of flour.

As used herein the term soft wheat preferably denotes wheat that falls into the definitions referred to above by Wheat Quality Australia dated October 2013 classified as ASFT and/or that falls into the US definitions for SRW, SSW and/or SW wheat, and/or falls into (the softest) Grade 5 as defined under USA wheat standards and/or K wheat in Germany and/or uks wheat for export from the United Kingdom and/or satisfies the definitions for any equivalent, comparable and/or similar types of wheat to these standards as defined in other territories.

Hard Wheat

Hard wheat as used herein denotes wheat that forms after milled hard flour that has a high protein content, preferably having a protein content of more than 11%, more preferably at least 12%, most preferably at least 13%, for example at least 14% by total weight of flour. Usefully the protein content of hard flour is no more than 20%, usefully no more than 17%, more usefully no more than 15% by total weight of flour. Conveniently hard flour has a protein content from 11% to 20%, more conveniently from 12% to 17%, most conveniently from 13% to 15% by total weight of flour.

As used herein the term hard wheat preferably denotes wheat that falls into the definitions referred to above by Wheat Quality Australia dated October 2013 classified as APH, AH, ASW and/or APDR and/or that falls into the US definitions for D, HRS, HRW and/or HW wheat, and/or falls into (the hardest) Grades 1, 2, 3 and/or 4 as defined under USA wheat standards and/or BAF, BPS and/or BPC wheat in France and/or E, A and/or B wheat in Germany and/or ukp wheat for export from the United Kingdom and/or satisfies the definitions for any equivalent, comparable and/or similar types of wheat to these standards as defined in other territories. Therefore in one embodiment of the invention the term hard flour conveniently denotes a flour obtained and/or obtainable from (more conveniently milled directly from) one or more hard wheat(s) as defined herein.

Low Grade Wheat

In one embodiment of the invention conveniently the bran is obtained and/or obtainable from a low grade wheat and/or one or more of the following sources of wheat cereal; brown flour (comprising germ and/or bran) wholegrain flour (also known as whole-meal flour, comprising the entire grain, including the bran, endosperm, and germ); germ flour (comprising the endosperm and germ, excluding the bran); and/or any suitable mixtures thereof.

As used herein the term low grade wheat preferably denotes wheat that falls into the definitions for wheat classified by Wheat Quality Australia in October 2013 as ASWN, APWN and/or FEED and/or that falls into the US definitions for U and/or M wheat and/or does not meet the requirements to satisfy any of Grades 1, 2, 3, 4 and/or 5 as defined under US wheat standards and/or BAU wheat in France and/or K wheat in Germany and/or satisfies the definitions for any equivalent, comparable and/or similar types of wheat to these standards as defined in other territories.

It will be understood as used herein that for convenience in one embodiment of the invention if there is an inconsistency between the amounts in wt % of protein specified herein for hard, soft or low grade wheat and any of the territorial definitions also referred to herein for grade wheat classes, then the wt % values specified herein prevail and/or usefully that fraction of a given wheat class that lie outside the wt % specified herein are excluded from the definition of soft, hard and/or low grade wheat as used herein.

Bran Composition

The bran material used in present invention comprises, among other components, fibres, starch (carbohydrate), proteins and fat. The amount of the individual components in a bran varies according to the source of the whole grain from which the bran originates, as well the refining process of the bran.

In one embodiment of the invention where the bran originates from whole grains from wheat, the bran may usefully comprise components in the following amounts: fibres 30-70% (w/w), starch 20-50% (w/w), proteins 5-20% (w/w), fat 0.5-10% (w/w).

In another embodiment of the invention, the bran may conveniently comprise components in the amounts: fibres 20-50% (w/w), starch 30-40% (w/w), proteins 10-15% (w/w), fat 1-5% (w/w).

As used herein the terms "%" and "% (w/w)" relate to weight percentage on a dry matter basis, unless the context clearly indicates otherwise.

The bran obtained from whole grains may comprise from about 40-50% to 80-90% by weight of the dietary fibres present in the whole grains.

Milling

Another aspect of the invention broadly provides a process for producing micronized bran of the invention and/or as described and defined herein, the process comprising the steps of:

optionally heat treating the bran and then milling the bran in mill to reduce its particle size and achieve the particle properties defined herein as (i), (ii) and (iii). Optionally the milling step by be achieved by milling the bran at a speed of at least 3000, usefully at least 4000 rpm.

Preferred milling methods used to produce bran particles of the invention are selected from milling an optionally heat treated bran using a cell mill and/or a jet mill, the use of a cell mill being more preferred.

A cell mill is a highly efficient mechanical mill with multiple rotors mounted on a vertical shaft. Product quality is optimised by control of mill speed through a frequency inverter, which also limits the starting current. A cell mill results in two product streams, standard (or product) and oversize, the standard stream is the preferred output that may comprise micronized bran of the invention.

A jet mill (also known as a microniser) typically comprises a spiral jet which uses compressed gas to produce superfine materials by autogenous comminution. Feed material is inspirited by a small proportion of the compressed gas through a venturi into the grinding chamber where numerous angles nozzles accelerate the material into particle-particle impact. There are no moving parts in the mill and no mechanical forces are applied to the grinding process. Variation in gas pressure and residence time is possible.

As used herein, unless the context clearly indicates otherwise the term 'micronized bran' is an informal term used to denote bran particles of the invention and/or bran particles that may be used to prepare other aspects and embodiments of the invention described herein (i.e. bran particles that have at least the parameters: Vol. MPS 5 to 100 µm; Vol. PSD with $D_{90,3} \leq 350$ µm, $D_{50,3} \leq 50$ µm & optionally $D_{10,3} \leq 15$ µm; and $S_{50} \geq 0.75$). Thus 'micronized bran' may be made by any suitable method and is not limited to solely to bran milled by a jet mill/'microniser' described herein.

The applicant has found that for some conventional milling techniques such as a ball mill there is a correlation between milling time, reduced particle size and increased particle sphericity, in other words the long the particles are milled the smaller they become and the rounder and more regular their shape, which makes such milling techniques less flexible. For particles obtained from a cell mill the applicant has discovered that there is no such correlation which allows particles to be produced with a wider possibility of parameters (such as those described herein).

In one preferred embodiment of this aspect of the invention provides a production process, optionally including a milling and a heating step, for the production of a food grade bran powder that can be used as described herein for example by having a minimal impact on the rheology of the fluid composition to which it is added.

Fluid Compositions (Fillings, Binders and/or Coatings)

A further aspect of the invention broadly provides an edible fluid composition comprising (a) from 0.1% to 99.9%, preferably from 0.1% to 35% by weight of micronized particles (preferably micronized bran) of and/or as used in the invention as defined herein; and (b) from 0.1% to 99.9% preferably from 65% to 99.9% of a carrier medium;

based on the amount of (a) and (b) totaling 100%.

In one embodiment of the invention usefully the edible fluid composition consists of (a) and (b), and more usefully the fluid is a liquid, most usefully a fat based or water based liquid, for example a fat based liquid.

The carrier medium may comprise any fluid suitable for use in the foodstuffs described herein (such as confectionery) for example fat based and/or water based liquids as described herein (e.g. fillings and/or coatings) and which may also contain other components such as flavourings and the like that are typically present in such compositions.

The particles are present in the fluids of the invention in an amount of greater than or equal to 0.1%, preferably greater than or equal to 1%, more preferably greater than or equal to 5%, even more preferably greater than or equal to 10%, most preferably greater than or equal to 15% by weight of the composition.

The particles are present in the fluids of the invention in an amount of less than or equal to 35%, usefully less than or equal to 30%, more usefully less than or equal to 25%, even more usefully less than or equal to 23%, most usefully less than or equal to 20% by weight of the composition.

The particles are conveniently present in the fluids of the invention in an amount of from 1 to 30%, conveniently from 5 to 25%, more conveniently from 10 to 25%, even more conveniently from 15 to 23%, most conveniently from 15 to 20% by weight of the composition.

The preferred amount of carrier medium may be calculated from the above amounts for particles based on (a) and (b) being 100%.

Preferably the compositions of the invention comprises added sugar in added in an amount of 100 parts and the amount of micronized bran particles present in the composition are from 0.1 parts to 50 parts, more preferably from 1 to 30 parts, most preferably from 5 to 25 parts by weight of the amount of added sugar being 100 parts.

Thus fluid compositions of the present invention that contain micronized bran may usefully achieve a reduction in added sugar of up to 50% (compared to a composition in which the micronized bran is substituted by the same weight of sugar) whilst still being capable of being processed industrially (i.e. the amount of micronized bran does not adversely effect the viscosity of the fluid so it cannot be pumped).

Suitable fluid compositions are described herein. In one embodiment of the invention the fluid compositions of the invention that comprise micronized bran are compositions selected from: fillings, batters, binders and/or coatings preferably suitable for use in confectionery products.

Such compositions may comprise water-based compositions, such as aqueous solutions, aqueous dispersions, oil in water (o-w) emulsions and/or water-in-oil-in-water (w-o-w) emulsions, examples of these comprise jams or caramels.

Such compositions may also comprise fat-based compositions; for example choco-material (e.g. chocolate or compound) and/or creams (e.g. fatty creams, water-in-oil emulsions and/or oil-in water-in-oil (o-w-o) emulsions.

Such compositions may also comprise fluid batters for baked foodstuffs such as wafer batters.

The terms 'filling', 'batter', 'binder' and 'coating' as used herein are terms of art the meanings of which are well understood by a person skilled in the art of food manufacturing (for example by a confectioner).

In preferred embodiments of the invention the term filling as used herein denotes an edible substance that in the final product is located between the layers of foodstuff (for example a multi-layered biscuit, wafer, cake, or other laminated foodstuff), more preferred fillings being (under standard conditions) substantially fluid (e.g. flowable powder or liquid), most preferably being liquid and most preferably being largely hidden within the foodstuff, i.e. not substantially visible at the exterior surface(s) of the foodstuff.

In preferred embodiments of the invention the term 'coating' as used herein denotes an edible substance that in the final product is located at one or more of the exterior surface(s) of a foodstuff or part thereof (for example an enrobed confectionery product). More preferred coatings comprise (under standard conditions after application) a solid or highly viscous fluid, though during manufacture the coating may also be applied as a solid or fluid (e.g. flowable powder or liquid), most preferably as a liquid to the partial product). Even more preferred coatings are substantially visible at the exterior surfaces of the foodstuffs optionally to provide the foodstuff with aesthetic and/or sensory properties (e.g. organoleptic properties) that are appealing to the consumer. A food coating also optionally provides functional properties such barrier properties (e.g. to heat, cold, oil and/or moisture) and/or mechanical properties to protect the interior of the product, lengthen its shelf-life and/or improve its appearance. Unlike the vast majority of packaging the food coating is an integral part of the foodstuff and is designed to be edible. Generally coatings imply food products (or components thereof) that have a minimum size of 1 mm or above. Coated particulate foodstuffs with a size of less than 1000 microns (typically from 300 to 1000 μm) are referred to encapsulated rather than coated foodstuffs.

In preferred embodiments of the invention the term binder as used herein denotes an edible substance that in the final product is used to trap components of the foodstuff with a matrix for the purpose of forming a cohesive product and/or for thickening the product (e.g. flour forming a roux). More preferred binders of the invention are those that contribute to a smoother product texture, add body to a product, help retain moisture and/or assist in maintaining cohesive product shape; for example by aiding particles to agglomerate; holding inclusions in a confectionery product more strongly in place; adhering nuts and/or grains within a ready to eat cereal bar; and/or improving delamination resistance of a multi-layered foodstuff. Even more preferred binders are (under standard conditions) those which comprise a solid or highly viscous fluid, though during manufacture the binder may be applied as a solid, fluid (e.g. a powder) or as a liquid. A binder may also perform the function of a filling and/or a coating. Thus as used herein a binder composition performs the function of a food stabiliser by allowing incompatible and/or otherwise immiscible food ingredients, which do not mix well, to remain in a homogenous state after blending. The main difference between a binder composition and a stabiliser being that a binder comprises more than one component (often added for other reasons) and is used in larger quantities that a stabilizer (e.g. in the amounts as described herein).

Thus for example ready-to-eat cereal bars typically comprise expanded cereals coated with 20 to 50% by weight of sugar syrup (which can act both as a coating and as a binder).

Dragees are typically a nut, chocolate, or sweet centre that is coated (e.g. by panning) with from 10% to 100% by weight of sugar.

In preferred embodiments of the invention the term batter as used herein denotes an edible substance that in the final product is used to prepare a baked foodstuff (which term also includes a fried foodstuff). A more preferred batter is readily capable of fluid flow (optionally under standard conditions) during manufacture, for example having a low enough viscosity to be pumped or poured at room temperature (whilst not being so low that obtaining a wafer from baking the batter on a substantially flat plate is impractical). A typical batter mixture comprises flour, and a liquid such as water or milk and optionally other ingredients such as egg.

Product

A yet further aspect of the invention broadly provides a product, preferably a confectionery product, baked product or biscuit comprising a fluid composition and/or micronized bran as described herein. These products are defined later in this document.

Layer

One embodiment of the invention broadly provides a multi-layer product of the invention, preferably a confectionery product comprising a fluid composition and/or micronized bran as described herein' in which at least one layer comprises a:

(a) from 0.1 to 99.9% of micronized bran of the invention as defined herein (b) from 0.1 to 99.9% by weight of a carrier medium where the layer also has (A) a coat weight of less than or equal to 2 g/cm² and (B) a visual rating assessed as at least 4 or 5 as described herein.

Preferred layers of the invention have a coat weight of greater than or equal to 0.01 g/cm², more preferably greater than or equal to 0.05 g/cm², most preferably greater than or equal to 0.08 g/cm².

Useful layers of the invention have a coat weight of less than or equal to 1 g/cm², more usefully less than or equal to 0.5 g/cm², most usefully less than or equal to 0.2 g/cm².

Conveniently layers of the invention have a coat weight of from 0.01 g to 2 g/cm², more conveniently from 0.05 to 1 g/cm², even more conveniently from 0.08 to 0.5 g/cm², most conveniently from 0.08 to 0.2 g/cm².

The visual rating of the layers of the invention relates to the quality of the layer as the more holes that exist in a filling the more of the other layer (such as cream) have to be deposited on top to fill up the holes. This can be both expensive and add more high fat ingredients which can be undesirable for if a low fat product (with bran) is to be produced. Alternatively where the layer is on the exterior of a product (i.e. a coating) a layer with a poor visual rating (i.e. a large number of holes) may be aesthetically unacceptable.

Preferably the micronized bran (as described herein) allows a reduction in added sugar and/or an increased amount of fibre in the fluid compositions and/or products of the invention (in the amounts described herein) compared to the comparative product without the micronized bran and/or fluid compositions of the invention. Usefully the organoleptic and/or other properties of the product and/or fluid composition of and/or used in the invention are substantively unchanged compared to the comparative product.

Method of Preparing Uniform Layers

A still another aspect of the invention broadly provides a method of preparing a multi-layer product (as described herein) which comprises the step of applying a fluid composition of the invention as defined herein to an edible substrate to form at least one layer thereon, the layer having the properties of (a) from 0.1 to 99.9% of micronized bran of the invention as defined herein (b) from 0.1 to 99.9% by weight of a carrier medium;

(A) a coat weight of less than or equal to 2 g/cm² and (B) a visual rating assessed as at least 4 or 5 as described herein.

to obtain a multilayered product.

Preferred amounts for the parameters described above are as given herein.

Use of Micronised Bran to Form Uniform Layers

A still other aspect of the invention broadly provides use of micronized bran to prepare a multi-layer product (as described herein) in which at least one layer comprises:

(a) from 0.1 to 99.9% of micronized bran of the invention as defined herein (b) from 0.1 to 99.9% by weight of a carrier medium (A) a coat weight of less than or equal to 2 g/cm² and (B) a visual rating assessed as at least 4 or 5 as described herein.

Preferred amounts for the parameters described above are as given herein.

Use of Micronised Bran as Sugar Replacer

A still other aspect of the invention broadly provides use of micronized bran as a sugar replacer for example for the purpose of replacing some or all of the sugar that would be added to a fluid composition and/or product of the invention.

When referring to use of micronized bran as a sugar replacer herein, this denotes that the micronized bran is used to prepare a product and/or composition of the invention where the bran replaces some or all of the sugar that would otherwise be added to a real or theoretical comparative product and/or fluid composition otherwise identical to the product and/or fluid composition of the invention and thus more added sugar was or would be present in this comparative, known product and/or fluid composition compared to the product and/or fluid composition of the invention. Optionally the micronized bran in the product and/or fluid composition of the invention may replace the added sugar in the comparative product and/or fluid composition on a one to one weight basis.

Preferably use of micronized bran as a sugar replacer allows a reduction in added sugar of less than or equal to 80%, more preferably less than or equal to 70%, even more preferably less than or equal to 60%, most preferably less than or equal to 50% by weight of added sugar as used in the fluid composition of and/or used in the invention compared to the sugar added to the comparative fluid composition (i.e. without the bran).

Conveniently use of micronized bran as a sugar replacer allows a reduction in added sugar of greater than or equal to 0.1%, more conveniently greater than or equal to 0.2%, even more conveniently greater than or equal to 0.5%, most conveniently greater than or equal to 1% by weight of added sugar as used in the fluid composition of and/or used in the invention compared to the sugar added to the comparative fluid composition.

Usefully use of micronized bran as a sugar replacer allows a reduction in added sugar of from 0.1% to 80%, more usefully from 0.2% to 70%, even more usefully from 0.5% to 60%, most usefully from 1% to 50% by weight of added sugar as used in the fluid composition of and/or used in the invention compared to the sugar added to the comparative fluid composition.

Preferably use of micronized bran as a sugar replacer allows a reduction in added sugar of less than or equal to 50%, more preferably less than or equal to 35%, even more preferably less than or equal to 30%, most preferably less than or equal to 25% by weight of added sugar as used in the product of and/or used in the invention compared to the sugar added to the comparative product.

Conveniently use of micronized bran as a sugar replacer allows a reduction in added sugar of greater than or equal to 0.5%, more conveniently greater than or equal to 1%, even more conveniently greater than or equal to 2%, most conveniently greater than or equal to 5% by weight of added sugar as used in the product of and/or used in the invention compared to the sugar added to the comparative product.

Usefully use of micronized bran as a sugar replacer allows a reduction in added sugar of from 0.5% to 50%, more usefully from 1% to 35%, even more usefully from 2% to 30%, most usefully from 5% to 25% by weight of added sugar as used in the product of and/or used in the invention compared to the sugar added to the comparative product.

Preferred embodiments of the present invention are those in which the sugar reduction achieved by use of the micronized bran as a sugar replacer is calculated with respect to the properties of the comparative product as a whole rather than the fluid composition of which the bran forms a part.

Use of Micronised Bran to Increase Fibre Content

A still other aspect of the invention broadly provides use of micronized bran to increase the total amount of fibre content in a fluid composition and/or product of the invention, for example for the purpose of increasing some or all of the fibre that would be added to a fluid composition and/or product of the invention.

When referring to use of micronized bran as a source of increased fibre herein, this denotes that the micronized bran is used to prepare a product and/or composition of the invention where the bran is used to increase some or all of the fibre that would otherwise be added or present to a real or theoretical comparative product and/or fluid composition otherwise identical to the product and/or fluid composition of the invention and thus the fibre was or would be present in this comparative, known product in less amounts compared to the product and/or fluid composition of the invention. Optionally the micronized bran in the product of the invention may comprise (for example consist of) the fibre in the comparative product and/or fluid composition on a one to one weight basis.

Preferably use of micronized bran as a source of fibre allows an increase in fibre of less than or equal to 80%, more preferably less than or equal to 70%, even more preferably less than or equal to 60%, most preferably less than or equal to 50% by weight of fibre as used in the fluid composition of and/or used in the invention compared to the fibre in the comparative fluid composition (i.e. without the bran).

Conveniently use of micronized bran as a source of fibre allows an increase in fibre of greater than or equal to 0.1%, more conveniently greater than or equal to 0.2%, even more conveniently greater than or equal to 0.5%, most conveniently greater than or up equal to 1% by weight of fibre as used in the fluid composition of and/or used in the invention compared to the fibre in the comparative fluid composition.

Usefully use of micronized bran as a source of fibre allows an increase in the amount of fibre of from 0.1% to 80%, more usefully from 0.2% to 70%, even more usefully from 0.5% to 60%, most usefully from 1% to 50% by weight of fibre as used in the fluid composition of and/or used in the invention compared to the fibre in the comparative fluid composition.

Preferably use of micronized bran as a source of fibre allows an increase in the amount fibre of less than or equal to 50%, more preferably less than or equal to 35%, even more preferably less than or equal to 30%, most preferably less than or equal to 25% by weight of fibre as used in the product of and/or used in the invention compared to the amount of fibre in to the comparative product.

Conveniently use of micronized bran as a source of fibre allows an increase in the amount fibre of greater than or equal to 0.5%, more conveniently greater than or equal to 1%, even more conveniently greater than or equal to 2%, most conveniently greater than or equal to 5% by weight of fibre as used in the product of and/or used in the invention compared to the amount of fibre in the comparative product.

Usefully use of micronized bran as a source of fibre allows an increase in the amount fibre of from 0.5% to 50%, more usefully from 1% to 35%, even more usefully from 2% to 30%, most usefully from 5% to 25% by weight of fibre as used in the product of and/or used in the invention compared to the amount of fibre in the comparative product.

Preferred embodiments of the present invention are those in which the amount of fibre increase by use of the micronized bran as a source of fibre is calculated with respect to the properties of the comparative product as a whole rather than the fluid composition of which the bran forms a part.

Health Claims/Uses

A still other aspect of the invention broadly provides for use of the bran of the invention and/or as described herein for the purpose of indicating to the consumer (for example on product packaging of the product, in advertising and/or other communications e.g. at the point of sale) that a food product of the invention (comprising the bran of the present invention and/or as described herein) has benefits (such as health claims), preferably said benefits being (or arising from) reduced amounts of added sugar and/or an increased amount of fibre, more preferably from reduced amounts of added sugar.

The term 'benefits' as used herein denotes that the food product properties are beneficial based on a comparison between the product of the invention and a real or theoretical comparative product otherwise identical where the same weight of added sugar and/or fibre was or would be present in the product instead of the bran of the present invention and/or as described herein and/or be used in the product of the invention.

Preferably in one embodiment of the invention the food product benefits described herein relate indirectly or directly to the reduction of the amount of added sugar in the product of the invention compared to the amount of sugar that would be used in the comparison product.

Usefully in another embodiment of the invention the food product benefits described herein relate indirectly or directly to the increase of the amount of added fibre in the product of the invention compared to the amount of fibre that would be used in the comparison product.

It will be understood that any food product claims on the packaging and/or elsewhere will be consistent with and/or in the format specified by the relevant local laws and regulations in force where the product of the invention is to be sold.

A yet further aspect of the invention provides use of the bran of the invention and/or as described herein in a method of manufacture of product with benefits (such as health claims), preferably said benefits being (or arising from) reduced amounts of added sugar and/or an increased amount of fibre, more preferably from reduced amounts of added sugar.

A still yet further other aspect of the invention provides a product of the invention which is contained in a pack, where the pack comprises an indication thereon, visible to the consumer, that the product of the invention contained therein benefits (such as health claims), preferably said benefits being (or arising from) reduced amounts of added sugar and/or an increased amount of fibre, more preferably from reduced amounts of added sugar.

Other Aspects of the Invention

Another aspect of the invention broadly provides a process for preparing composition of the present invention and/or as described herein, the process comprising the step of mixing micronized bran (as described herein) with a fluid composition (as described herein). In one embodiment the micronized bran may be added to the fluid composition, in another embodiment the fluid composition may be added to the micronized bran.

A further aspect of the invention provides a fluid composition and/or product obtained and/or obtainable from a process of the present invention.

A yet another aspect of the invention broadly provides a foodstuff and/or confectionery product comprising a fluid composition of the present invention and/or micronized bran (as described herein) as component(s) thereof.

A yet further aspect of the invention broadly provides use of a micronized bran (as described herein) and/or a fluid composition of present invention (and/or as described herein) for the manufacture of a foodstuff and/or confectionery product.

A still further aspect of the invention broadly provides a method for preparing a foodstuff and/or confectionery product comprising providing one or more micronized bran component(s) and/or fluid composition(s) of present invention (and/or as described herein).

Many other variations embodiments of the invention will be apparent to those skilled in the art and such variations are contemplated within the broad scope of the present invention. Thus it will be appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

Further aspects of the invention and preferred features thereof are given in the claims herein, which form an integral part of the disclosure of the present invention whether or not such claims correspond directly to parts of the description herein.

Certain terms as used herein are defined and explained below unless from the context their meaning clearly indicates otherwise.

Suitable food products that may be prepared as described herein may be selected from the following non limiting list of: baked foodstuffs, biscuits, cakes, candies, cereals, choco-condiments, confectionery products, frozen food, gummies, ice cream, pizza, pasta, pellets, pet food, solid sauces, sweets, treats; wafers, combinations thereof and/or mixtures thereof; preferably from biscuits, cakes, candies, cereals, choco-material (e.g. chocolate and/or compound), confectionery, gummies, ice cream and/or sweets, more preferably from biscuits, candies, chocolate, confectionery products, gummies, ice cream and/or sweets, most preferably from candies, chocolate, gummies and/or sweets; for example from gummies and/or chocolate.

As used herein the term 'confectionery products' is well understand to those skilled in the art and includes but is not limited to products such as fat based confectionery, chocolate, compound, tablets, gummies and/or, wafer.

The following terms as used herein when capitalised BAKED PRODUCTS, BISCUITS AND CONFECTIONERY PRODUCTS have the following specific definitions as used herein which would be understood to be deemed mutually exclusive.

BAKED PRODUCTS denotes foodstuffs which are or, which comprise components which are, predominately baked and may be sweet or savoury and may comprise baked grain foodstuffs, including but not limited to foodstuffs either raised with yeast and/or baking powder, foodstuffs that comprise baked cereals and/or pulses such as baked wheat foodstuffs such as, bread, rolls, cakes, pastries, crumpets, potato cakes, scones, pancakes and/or pies, further non-limiting examples of baked products comprising any of the following (some of which may also overlap): apple strudel, baklava banana bread, berliner, bichon au citro, croissantfruit pie (e.g. apple pie, cherry pie, pecan pie), garibaldi, gingerbread, kurabiye, lebkuchen, leckerli, lemon drizzle cake macroon, koulourakia, kourabiedes, Linzer torte, muffin, polvoròn, pizzelle, pretzel (soft or hard), Welsh cakes and/or similar products Biscuits denotes foodstuffs which are a dry and crisp or hard bread in thin, flat cakes, made without yeast or other raising agent including but not limited to ANZAC biscuit, biscotti, bourbon biscuit, butter cookie, custard cream, cookie, digestive biscuit, flapjack, florentine, garibaldi, high fat biscuits, oreo, Nice biscuit, peanut butter cookie, shortbread and/or similar products.

CONFECTIONERY PRODUCTS denotes (i) foodstuffs which are predominately sweet in flavour and are not predominately baked and may comprise fat based confectionery (such as chocolate, compound and other related materials) and/or sugar confections, further non limiting examples of confectionery comprise any of the following (some of which may also overlap): bakers' confections, candies, choco-material (such as chocolate, compound and other related materials that comprise cocoa butter (CB), cocoa butter equivalents (CBE), cocoa butter replacers (CBR) and/or cocoa butter substitutes (CBS) however defined by local laws), fat based confectionery, gummies, ice cream, multi-layer products with filling and wafer, sugar confections, sweets, tablets, treats; wafers, combinations thereof and/or mixtures thereof and (ii) foodstuffs which are cereal bars, extruded cereal based products or co-extruded filled cereal based products.

Any suitable manufacture process may be used to prepare products described herein such as moulding, extension and deposition.

Gummy sweets or gummy candies (hereinafter referred to as "gummies", or "gummy" or "gummi" in the singular) may be prepared by moulding. Preferred 'gummies' are confectionery products that exhibit at least in part a deformable, non rigid, plastic, rubber, chewable and/or gelatinous consistency. Gummies may be prepared from a composition that comprises gelling agent(s) (such as gelatine), sugar(s), flavouring(s) and/or colorant(s).

Fat Based Composition or Edible Product

The term 'identifies edible products which are based on a fat continuous matrix. Non-limiting examples of such fat based edible products may be represented by fat based confectionery products as below defined, margarine, butter or spreads. In some embodiments, such fat continuous matrix may be represented by a substantially pure fat matrix.

Within the context of the present invention, terms such as "fat based" and/or "fat based edible product' denotes composition, preferably a confectionery filling and/or chocolate, and/or products that comprises a matrix of edible hydrophobic material (e.g. fat) as the continuous phase and a dispersed phase comprising solid particles dispersed within the edible hydrophobic continuous phase.

Within the context of the present invention the term "fat" as used herein denotes hydrophobic material which is also edible. Thus fats are edible material (preferably of food grade) that are substantially immiscible with water and which may comprise one or more solid fat(s), liquid oil(s) and/or any suitable mixture(s) thereof. The term "solid fat" denotes edible fats that are solid under standard conditions and the term "oil" or "liquid oil" (unless the context indicates otherwise) both denote edible oils that are liquid under standard conditions.

Preferred fats are selected from one or more of the following: coconut oil, palm kernel oil, palm oil, cocoa butter, butter oil, lard, tallow, oil/fat fractions such as lauric or stearic fractions, hydrogenated oils, and blends thereof as well as fats which are typically liquid at room temperature such as any vegetable or animal oil.

The liquid oil may comprise mineral oils and/or organic oils (oils produced by plants or animals), in particular food grade oils. Examples of oils include: sunflower oil, rapeseed oil, olive oil, soybean oil, fish oil, linseed oil, safflower oil, corn oil, algae oil, cottonseed oil, grape seed oil, nut oils such as hazelnut oil, walnut oil, rice bran oil, sesame oil, peanut oil, palm oil, palm kernel oil, coconut oil, and emerging seed oil crops such as 25 high oleic sunflower oil, high oleic rapeseed, high oleic palm, high oleic soybean oils & high stearin sunflower or combinations thereof.

The fat content in the product of the present invention may be provided by fats of any origin. The fat content is intended to indicate the total fat content in the composition, comprising either the content coming from solid fats and/or the content of liquid oils and thus the oil content will also contribute to the total amount of fat content as described herein for fat based confectionery compositions of the invention.

The term 'fat based composition and/or mass' respectively identifies a fat-based composition and/or mass (including its recipe and ingredients) which is used for the preparation of fat base edible products of the invention.

As it will be apparent to a person skilled in the art, in some instances the fat based edible product of the invention will have the same recipe and ingredients as the corresponding fat based composition and/or mass while in other instances, particularly where inclusions are added or for more complex products, the final recipe of the fat based edible product may differ from that of the fat based composition and/or mass used to prepare it.

In a preferred embodiment(s) of the present invention the fat-based edible product, fat-based composition and/or fat-based mass comprises respectively a fat-based confectionery product, composition and/or mass.

The term 'fat based confectionery composition and/or mass' identifies a confectionery composition and/or mass (including its recipe and ingredients) which is used for the preparation of fat based confectionery products of the invention. The fat based confectionery composition and/or mass may be used to mould a tablet and/or bar, to coat confectionery items and/or to prepare more complex confectionery products. Optionally, prior to its use in the preparation of a fat based confectionery product of the invention, inclusions according to the desired recipe may be added to the fat based confectionery product composition.

Chocolate

In a more preferred embodiment(s) of the present invention the fat-based confectionery product, composition and/or mass encompasses such products, compositions and/or masses that comprise choco-material (preferably chocolate and/or compound, more preferably chocolate) as defined herein as well as optionally other confectionery products and/or components thereof.

The term 'chocolate' as used herein denotes any product (and/or component thereof if it would be a product) that meets a legal definition of chocolate in any jurisdiction and also include product (and/or component thereof) in which all or part of the cocoa butter (CB) is replaced by cocoa butter equivalents (CBE) and/or cocoa butter replacers (CBR).

The term 'chocolate compound' or 'compound' as used herein (unless the context clearly indicates otherwise) denote chocolate-like analogues characterized by presence of cocoa solids (which include cocoa liquor/mass, cocoa butter and cocoa powder) in any amount, notwithstanding that in some jurisdictions compound may be legally defined by the presence of a minimum amount of cocoa solids.

The term 'choco-material' as used herein denotes chocolate, compound and other related materials that comprise cocoa butter (CB), cocoa butter equivalents (CBE), cocoa butter replacers (CBR) and/or cocoa butter substitutes (CBS). Thus choco-material includes products that are based on chocolate and/or chocolate analogues, and thus for example may be based on dark, milk or white chocolate and/or compound.

Unless the context clearly indicates otherwise it will also be appreciated that in the present invention any one choco-material may be used to replace any other choco-material and neither the term chocolate nor compound should be considered as limiting the scope of the invention to a specific type of choco-material. Preferred choco-material comprises chocolate and/or compound, more preferred choco-material comprises chocolate, most preferred choco-material comprises chocolate as legally defined in a major jurisdiction (such as Brazil, EU and/or US).

The term 'choco-coating' as used herein (also refers to a 'choco-shell') denotes coatings made from any choco-material. The terms 'chocolate coating' and 'compound coating' may be defined similarly by analogy. Similarly the terms 'choco-composition (or mass)', 'chocolate composition (or mass)' and 'compound composition (or mass)' denote compositions (or masses) that respectively comprise choco-material, chocolate and compound as component(s) thereof in whole or part. Depending on their component parts the definitions of such compositions and/or masses may of course overlap.

The term 'choco-confectionery' as used herein denotes any foodstuff which comprises choco-material and optionally also other ingredients and thus may refer to foodstuffs such confections, wafers, whether the choco-material comprises a choco-coating and/or the bulk of the product. Choco-confectionery may comprise choco-material in any suitable form for example as inclusions, layers, nuggets, pieces and/or drops. The confectionery product may further contain any other suitable inclusions such as crispy inclusions for example cereals (e.g. expanded and/or toasted rice) and/or dried fruit pieces.

Unless the context herein clearly indicates otherwise it will also be well understood by a skilled person that the term choco-confectionery as used herein can readily be replaced by and is equivalent to the term chocolate confectionery as used throughout this application and in practice these two terms when used informally herein are interchangeable. However where there is a difference in the meaning of these terms in the context given herein, then chocolate confectionery and/or compound confectionery are preferred embodiments of the choco-confectionery of the present invention, a more preferred embodiment being chocolate confectionery.

Preferred choco-confectionery may comprise one or more product(s) selected from the group consisting of: chocolate product(s) (such as bar(s) and/or tablet(s), compound product(s) (such as bar(s) and/or tablet(s), chocolate coated product(s), compound coated product(s), chocolate coating(s) (e.g. for wafers and/or other confectionery products) and/or compound coating(s) (e.g. for wafers and/or other confectionery products) and/or other confectionery items, chocolate coating(s) for ice-creams, compound coating(s) for ice-creams, chocolate filling(s) and/or compound filling(s); more preferably and/or alternatively any of the aforementioned may comprise one or more cocoa butter replacer(s) (CBR), cocoa-butter equivalent(s) (CBE), cocoa-butter substitute(s) (CBS) and/or any suitable mixture(s) thereof.

In choco-confectionery the cocoa butter (CB) may be replaced by fats from other sources. Such products may generally comprise one or more fat(s) selected from the group consisting of: lauric fat(s) (e.g. cocoa butter substitute (CBS) obtained from the kernel of the fruit of palm trees); non-lauric vegetable fat(s) (e.g. those based on palm or other specialty fats); cocoa butter replacer(s) (CBR); cocoa butter equivalent(s) (CBE) and/or any suitable mixture(s) thereof. Some CBE, CBR and especially CBS may contain primarily saturated fats and very low levels of unsaturated omega three and omega six fatty acids (with health benefits). Thus in one embodiment in choco-confectionery of the invention such types of fat are less preferred than CB.

Multi Layer Foodstuff

One embodiment of the invention provides a multi-layer food product optionally comprising a plurality of layers of baked foodstuff, wafer or biscuit and at least one filling layer located between the layers of baked foodstuff, wafer or biscuit the filling layer comprising a fat based confectionery composition of or prepared according to the invention. Such multi-layer food products encompass CONFECTIONERY PRODUCTS (such as multi-layer wafers), BAKED PRODUCTS and/or BISCUITS as these terms when capitalised are more specifically defined herein.

Examples of multi-layer foodstuffs that are deemed CONFECTIONERY PRODUCTS as defined herein include those products that comprise wafer, confectionery filling, inclusions and/or an outer coating of choco-material, non-limiting examples being those products available commercially from the applicant under the trade marks Lion®, KitKat®, Blue Riband® and Shark®.

Examples of multi-layer foodstuffs that are deemed BAKED PRODUCTS as defined herein include those products such as cakes having a plurality of baked interior layers of a risen baked product (such as a sponge) sandwiching at least one filling layer (e.g. jam and/or cream) the layers optionally being coated (e.g. with an icing or fondant).

Examples of multi-layer foodstuffs that are deemed BISCUITS as defined herein include those products such as having a plurality of baked interior layers of a continuous biscuit layer sandwiching at least one filling layer (e.g. jam) (sandwich biscuits).

A further embodiment of the invention provides foodstuff, such as a confectionery product, further coated with chocolate (or equivalents thereof, such as compound) for example a praline, chocolate shell product and/or chocolate coated wafer any of which may or may not be layered. The chocolate coating can be applied or created by any suitable means, such as enrobing or moulding. The filling and/or coating may comprising a confectionery composition of or prepared according to the invention.

Another embodiment of the invention provides a foodstuff, such as a confectionery product of and/or used in the present invention, that comprises a filling surrounded by an outer layer for example a praline, chocolate shell product.

In another preferred embodiment of the invention the foodstuff may comprises a multi-layer food product comprising a plurality of layers of wafer, chocolate, biscuit or baked foodstuff with filling (of the invention) sandwiched between them. The multi-layer product may comprises a confectionery product (e.g. as described herein) or be selected from sandwich biscuit(s), cookie(s), wafer(s), muffin(s), extruded snack(s), praline(s) or chocolate shelled product(s). An example of a multilayer laminate has baked product, wafer or biscuit layers sandwiched with filling(s) of the invention.

Baked Foodstuff

Baked foodstuffs used in or of the invention may be sweet or savoury. Preferred baked foodstuffs may comprise baked grain foodstuffs which term includes foodstuffs that comprise cereals and/or pulses. Baked cereal foodstuffs are more preferred, most preferably baked wheat foodstuffs.

BAKED PRODUCTS denotes: foodstuffs which are or, which comprise components which are, predominately baked and may be sweet or savoury and may comprise baked grain foodstuffs, including but not limited to foodstuffs either raised with yeast and/or baking powder, foodstuffs that comprise baked cereals and/or pulses such as baked wheat foodstuffs such as, bread, rolls, cakes, pastries, crumpets, potato cakes, scones, pancakes and/or pies, further non-limiting examples of baked products comprising any of the following (some of which may also overlap): apple strudel, baklava banana bread, berliner, bichon au citro, croissantfruit pie (e.g. apple pie, cherry pie, pecan pie), garibaldi, gingerbread, kurabiye, lebkuchen, leckerli, lemon drizzle cake macroon, koulourakia, kourabiedes, Linzer torte, muffin, polvoròn, pizzelle, pretzel (soft or hard), Welsh cakes and/or similar products Biscuits may be flat or shaped and may have many different shapes, though preferred biscuit(s) are flat so they can be usefully be laminated together with filling of the invention (optionally a fruit based filling). More preferred biscuits are non-savoury, for example having a sweet or plain flavour.

BISCUITS denotes foodstuffs which are a dry and crisp or hard bread in thin, flat cakes, made without yeast or other raising agent including but not limited to ANZAC biscuit, biscotti, bourbon biscuit, butter cookie, custard cream, cookie, digestive biscuit, flapjack, florentine, garibaldi, high fat biscuits, oreo, Nice biscuit, peanut butter cookie, shortbread and/or similar products.

Wafer

Wafers are foodstuffs which are made from wafer batter and have crisp, brittle and fragile consistency and are considered herein to confectionery for example be encompassed by CONFECTIONERY PRODUCTS (and are not therefore considered to be BAKED PRODUCTS especially when the wafer comprises part of a multilayer laminate wafer product). Wafers are thin, with an overall thickness usually from 1 to 4 mm and typical product densities range from 0.1 to 0.4 g/cm$^3$. Unless otherwise indicated herein the terms of art used herein have the meanings ascribed to them in WO2009/149948 or where not defined in this reference have the meanings ascribed to them that would be well known to those skilled in the art of wafer baking on an industrial scale.

Wafers may be flat or shaped (for example into a cone or basket for ice-cream) and may have many different shapes, though preferred wafer(s) are flat so they can be usefully be laminated together with a confectionery filling of the invention (and optionally a fruit based filling). More preferred wafers are non-savoury wafers, for example having a sweet or plain flavour.

A wafer of the present invention may be prepared by any method known to the skilled person. For example as described in the applicant's patent application WO2009/149948 as described on page 1 line 8 to page 4 line 30, this section incorporated herein by reference. Thus for example wafers can be prepared from baking a flowable liquid batter which is a suspension containing mainly flour and water up to which other minor ingredients may be added (such as described in any of the references described herein).

Wafers may also be produced by extrusion, as described in to the applicant's patent applications WO 2008/031796 and WO 2008/031798. Enzymes may also be used in wafer manufacture as described generally in WO2009/149948 page 3 lines 6 to 16.

A wafer of the invention may be a flat wafer either having geometric shapes or cartoons character shapes, as well as alphabet letters or numbers, for example. It can also be a three dimensional shaped wafer such as, for example, a cone, a glass, a dish. Wafer texture results from the generation of gas cells in a gel structure mainly composed of gelatinised starch. The high temperature of the baking plates induces a rapid gelatinisation of starch granules present in the flour and production and expansion of the gas bubbles inside the gelatinous matrix. These gas cells are, in the common practice, mainly generated from gassing agents such as added bicarbonates or carbon dioxide produced by gas-generating microorganisms such as yeast during batter fermentation and from steam produced by heating. Therefore the wafer can be seen as a solid foam of gelatinised and dried starch/flour with dispersed gas cells (which can form an almost continuous phase in certain cases).

A wafer batter typically comprises around 30-60% flour, for example wheat flour. In some batters, starch may be added in addition to the flour. The batter may also comprise at least one of the following ingredients: fat and/or oil, lecithin and/or emulsifiers, sugar, whole egg, salt, sodium bicarbonate, ammonium bicarbonate, skim milk powder, soy flour and/or enzymes such as xylanases or proteases, for example. Any standard wafer batter may be used in accordance with the invention by adding glucose syrup liquid or dried in powder form. Optionally if the batter and/or wafer comprises an enzyme capable of transforming sugars, the batter or wafer is allowed to mature to develop the sugars therein to corresponding to those and in the amounts described herein.

Coating, Binder and/or Filling Compositions

Preferably the compositions of or prepared according to the invention comprise a filling, binder and/or coating composition suitable for use as one or more coatings, binders and/or fillings in the products described herein.

In one embodiment of the present invention there is provided a multi-layer laminated product such as confectionery product comprising a plurality of layers of wafer (a sandwich wafer) or a product comprising a plurality of layers of baked foodstuff or biscuit layers, such as a filling layer in a sandwich biscuit.

The coating, binder and/or filling may comprise a plurality of phases for example one or more solid and/or fluid phases such as fat and/or water liquid phases and/or gaseous phases such as emulsions, dispersions, creams and/or foams.

In one embodiment of the invention optionally such filling, binder, coating and/or or other compositions may comprise fat based compositions for example emulsions where the continuous phase is hydrophobic (i.e. oil and/or fat based) and the dispersed phase is either hydrophilic (aqueous based)—i.e. a water in oil (denoted 'w/o') emulsion or the dispersed phase itself an emulsion—i.e. an oil in water in oil (denoted 'o/w/o') emulsion. Examples of such compositions comprise:

In another embodiment of the invention optionally such filling, binder, coating and/or or other compositions may comprise aqueous based compositions for example emulsions where the continuous phase is hydrophilic (i.e. water based) and the dispersed phase is either hydrophobic (oil and/or fat based)—i.e. an oil in water (denoted 'o/w') emulsion or the dispersed phase itself an emulsion—i.e. a water in oil in water (denoted 'w/o/w') emulsion.

It will be well understand that an emulsion is characterised as fat or water based depending on the nature of the continuous phase not on the proportion of water or fat.

Which phase is dispersed and which forms the continuous phase may be governed by the emulsifier(s) (and/or suitable detergent(s), dispersant(s), stabiliser(s) and/or surfactant(s)) that may be optionally present.

Multiphase confectionery products may optionally comprise (as the product or a component thereof) one or more of the following moieties:

bonbon; butter; candy-floss; caramel; cream, foam (if dispersed phase is gaseous), fondant; fruit juice; fruit purée; fudge; gianduja; ganache; janduja; jam; jelly; liquorice; liqueur; lotion, mallow; margarine; marmalade; marshmallow; marzipan; milk; mousse (if dispersed phase is gaseous); nut; nougat; paste; peanut; praline; puddle; purée; rework; toffee and/or truffle A filling, binder and/or coating composition as described herein may be prepared using any suitable processes for making such compositions (whether aerated and non-aerated) and/or modifying the physiochemical properties of the compositions themselves and/or components thereof.

The filling, binder and/or coating compositions described herein may be or use any of the following processes, equipment and/or ingredients:

aerated; aerated fat; aeration; ball cutter; ball mill; bubble; dairy protein; disperse; emulsify; extrusion; extruder; fat; filling; foam; foaming; gas injection; gas insertion; glucose syrup; high shear; homogenise; homogeniser; humectant; hydro-colloid; layering; Macintyre mixer; macro-aerated; macro-aeration; micro-aerated; micro-aeration; mixer; mixing; oil; moisture activity, pectin; plant protein; particle network; particle stabiliser; preservative; pressure; pressurise; protein; protein network; reduced water activity; roll refiner; screw extrusion; stabilise; water activity, whipping.

Therefore broadly a further aspect of the invention comprises a foodstuff comprising a filling, binder and/or coating composition as described herein.

It will be apparent to the skilled person that a filling, binder and/or coating of the invention may be incorporated in the products mentioned herein using well known procedures in the art.

A (optionally fat based) filling, binder and/or coating of and/or used in the present invention may be used in a variety of applications including but not limited to fillings, binders and/or coatings for one or more of: sandwich biscuits, cookies, wafers, muffins, extruded snacks, pralines, chocolate shelled products and/or any other suitable foodstuff as described herein.

A yet further aspect of the invention broadly comprises use of (optionally fat based) compositions of or prepared according to the invention as a filling, binder and/or coating for a foodstuff of the invention (such as a baked foodstuff, confectionery or biscuit) also as described herein.

Low Saturated Fat

Compositions of the invention may have low saturated oils and/or solid fats compared to similar known compositions with similar amounts of total fat. By preparing compositions as described herein the proportion of solid fat and/or saturated oils may be adjusted compared to the amount of other fats and/or oils to improve the final texture and/or nutritional properties of the composition and/or retain those characteristics required for good processability of the composition during manufacture.

Particularly preferred products of the invention have a low total content of fat and saturated fatty acids (SFA), more preferably no more than 30% total fat by weight of the product.

It will be appreciated that one aspect of the present invention may provides for a low fat foodstuff having a fat based confectionery filling therein, preferably which has a lower total fat content (at least 5 parts or 5% by weight) than previously obtainable from prior art fat based confectionery compositions.

In one embodiment of the invention, the oil comprises (preferably consists of) oil having an inherently low SFA content such as high oleic sunflower oil or high oleic rapeseed oil.

Powder

Within the context of the present invention, the term "solid particle ingredient" or "powder ingredients" is to be understood as identifying a food ingredient or a mixture of two or more ingredients which are added to provide bulk to the product. The solid particle ingredient may be in the form of a powder but could also be provided by a solid particle suspension in a liquid such as for example cocoa liquor. The solid particle ingredient may be selected in the group consisting of: sugar, mono, di- and poly saccharide, cocoa powder, dairy ingredients, cereals fibres and gums, fruit and/or vegetable powders, bulking agents, other solid particle ingredients and/or mixtures thereof.

Preferred mono saccharides comprise fructose, glucose (dextrose monohydrate or anhydrous) and/or galactose.

Preferred disaccharides comprise crystalline sugar (sucrose) any particle size (powder, caster or granulated), lactose and/or maltose.

Usefully the polysaccharide(s) comprise of: starches from any suitable origin (such as corn, wheat, potato or similar well known sources); high amylose starches; hydrolyzed starches (such as dextrins and/or maltodextrins), pre-gelatanised starches; natural or modified starches; isomaltose, maltulose, mannose, ribose galactose, trehalose; starch derivatives including glucose syrup with a DE above 20, maltodextrins with a DE below 20; polydextrose; and mixtures thereof.

The solid particle diary ingredient may be selected in the group consisting of: Milk powders of any description (whole milk powder, whey powder, skimmed milk powder, demineralized whey powder, milk proteins, whey protein isolate, demineralized whey powder permeate, etc); Caramelized and Condensed Milk powder dried Dulce de Leche; Cheese of any kind in powder; Yoghurt powders and mixtures thereof.

The cereal and gum solid particle ingredients may comprise: cereal flours (wheat, corn, barley, rye, celery and/or, rice); semola, semolina or grits; roasted flours, pregelatinised flours; natural fibres and gums (such as for example pectins, xanthan gum, carrageen, arabic gum, agar-agar, alginate locust bean gum etc) or mixtures thereof; fibers from any suitable origin, for example cellulose, hemicelluloses such as pectins, xylans, xyloglucans, galactomannans and beta-glucans, gums and mucilages, inulin or its hydrolysate; and mixtures thereof.

Conveniently the fruit and vegetable solid particle ingredient comprise: cocoa powder; dried fruits powder (for example: strawberry, banana); dried vegetables powder; dried vegetable juices and leaves; tapioca flour and potato flour; toasted fruit seeds flour; coconut powder; plant proteins of any kind; and mixtures thereof. Preferred vegetable solid particles comprise cocoa powder.

Advantageously the other solid particle ingredient may comprise rework material (which itself may comprise wafer rework, biscuit rework, chocolate rework, compound rework, filling rework or combinations thereof); suitable powdered colours and/or flavours; suitable acids (such as citric, lactic and/or malic acids); suitable minerals (such as calcium carbonate, zinc sulfate and/or magnesium carbonate); fat encapsulated powder; antioxidants, silica; lecithin powder; nut paste; cocoa liquor; and/or suitable mixtures thereof.

The solid particle ingredient may be at least in part in crystalline form. Preferred solid particles have a particle size lower than 350 microns ($D_{90}$). Useful solid particles may comprise: cocoa powder, maltodextrin, sucrose and/or mixtures thereof. Solid particle(s) may comprise ingredient(s) traditionally used in recipes for fillings.

Low Added Sugar

Compositions of the invention have low added sugar compared to known fillings with similar amounts of total sugar including inherent sugars or natural sugars. By preparing compositions as described herein using the method of the invention the proportion of added sugar can be adjusted both to improve the final texture and/or nutritional properties of the compositions and/or keep the characteristics required for good processability of the composition during manufacture.

Particularly preferred products of the invention have a low total content of added sugar, more preferably no more than 30% total sugar by weight of the product.

It will be appreciated that one aspect of the present invention provides for a low sugar foodstuff having a low sugar content therein, preferably which has a lower total sugar content (at least 5 parts or 5% by weight lower) than previously obtainable from comparable prior art sugar containing compositions.

Mixer

In one embodiment of the present invention, the process may be performed in any type of equipment which is able to perform a mixing action at modulated speed. Non limiting examples of this type of equipment are: vertical and horizontal mixers, turbo mixers, planetary and double planetary mixers, continuous mixers, inline mixers, extruders, screw mixers, high shear and ultra-high shear mixers, cone and double cone mixers, static and dynamic mixers, rotary and static drum mixers, rotopin mixer, ribbon blenders, paddle blenders, tumble blenders, solids/liquid injection manifold, dual-shaft and triple shaft mixers, high viscosity mixers, V blenders, vacuum mixers, jet mixers, dispersion mixers, mobile mixers and banbury mixers.

General Definitions

Unless defined otherwise, all technical and scientific terms used herein have and should be given the same meaning as commonly understood by one of ordinary skill in the art to which this invention belongs.

Unless the context clearly indicates otherwise, as used herein plural forms of the terms herein are to be construed as including the singular form and vice versa.

The terms 'effective', 'acceptable' 'active' and/or 'suitable' (for example with reference to one or more of any process, use, method, application, preparation, product, material, formulation, composition, recipe, component, ingredient, compound, monomer, oligomer, polymer precursor, and/or polymer described herein of and/or used in the present invention as appropriate) will be understood to refer to those features of the invention which if used in the correct manner provide the required properties to that which they are added and/or incorporated to be of utility as described herein. Such utility may be direct for example where a moiety has the required properties for the aforementioned uses and/or indirect for example where a moiety has use as a synthetic intermediate and/or diagnostic and/or other tool in preparing other moeity of direct utility. As used herein these terms also denote that sub-entity of a whole (such as a component and/or ingredient) is compatible with producing effective, acceptable, active and/or suitable end products and/or compositions.

Preferred utility of the present invention comprises use as a food stuff, preferably as a confectionery product and/or intermediate in the manufacture thereof.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Unless noted otherwise, all percentages herein refer to weight percent, where applicable.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole. Preferably where appropriate (for example in amounts of ingredient) such percentages are by weight.

Compositions of and/or used in the present invention may also exhibit improved properties with respect to known compositions that are used in a similar manner. Such improved properties may be (preferably as defined below) in at least one, preferably a plurality, more preferably three of more of those propert(ies) labeled 1 to 3 below. Preferred compositions of and/or used in the present invention, may exhibit comparable properties (compared to known compositions and/or components thereof) in two or more, preferably three or more, most preferably in the rest of those properties labeled 1 to 3 below.

Composition and/or product related properties:
1 Reduced sugar
2 Higher hiding power of a layer per coat weight
3 Improved processability of fluid composition as measured by pumping speed of fluid composition The weight percentages in parameters above are calculated with respect to initial weight of the component.

Improved properties as used herein means the value of the component and/or the composition of and/or used in the present invention is >+8% of the value of the known reference component and/or composition described herein, more preferably >+10%, even more preferably >+12%, most preferably >+15%.

Comparable properties as used herein means the value of the component and/or up composition of and/or used in the present invention is within +/−6% of the value of the known reference component and/or composition described herein, more preferably +/−5%, most preferably +/−4%.

The percentage differences for improved and comparable properties herein refer to fractional differences between the component and/or composition of and/or used in the invention and the known reference component and/or composition described herein where the property is measured in the same units in the same way (i.e. if the value to be compared is also measured as a percentage it does not denote an absolute difference).

Test Methods

Unless otherwise indicated all the tests herein are carried out under standard conditions as also defined herein.

Assessment of Layers Visually

Where indicated in some of the above tests, the performance of a coating and/or filling layer can be assessed by visually assessing the damage to the layer compared to a control sample (with micronized bran replaced by same weight of umilled bran). Damage is preferably assessed either by measuring the weight percentage of the layer left on the substrate after the test compared to the control or the layer can also be evaluated visually using the rating scale below where 5 is the best and 1 is the worse:

5=very good: no visible damage or degradation/discoloration;
4=only slight visible damage, blemishes, less than 1% of layer's surface area pin holes;
3=clear damage or blemishes, pin holes less than 5% of layer surface area;
2=layer partially discontinuous/damaged, dissolved; holes comprise more than 10% of layer surface area 1=very poor; layer is completely dissolved/damaged, holes 20% or more of layer surface area Holding Capacity (Oil and Water)

Oil holding capacity (OHC) and water holding capacity (WHC) are defined as the amount respectively oil or water retained by a known amount of a sample of material (for example the particles of and/or used in the present invention). The test for OHC and WHC is similar and may be measured using the following method; where 0.5 (±0.001) g of the sample is added to 20 ml of respectively sunflower oil (to measure OHC) or deionised and distilled water (to measure WHC) in a 50 ml centrifuge tube. The samples are stirred and allowed to set for 24 hours. Subsequently the tubes are placed in a centrifuge tube for ten minutes and spun at 2000 rpm, after which the supernatant is removed using a pipette. Then the tubes are held upside down and drained for five minutes. The material that remains is weighed and recorded. The OHC or WHC is expressed in units of grams of respectively oil and water per gram dry sample so holding capacity is a dimensionless number. The OHC (or WHC) values are measured twice using duplicate samples of a given material and an average of these measurements is taken to determine the OHC (or the WHC) of that material.

Particle Size Analysis

The average particle size [D4, 3] represents the mean volume diameter of the particles obtained by laser diffraction method using a Malvern optical instrument (Mastersizer 2000, Malvern, Herrenberg, Germany) equipped with MS 15 Sample Presentation Unit (Refractive Index 1.590) and water as dispersing agent for the particles. Distributions up were made in duplicate for each sample, using 1 g in an aqueous suspension. Size distribution was quantified as the relative volume of particles in size bands presented as size distribution curves (Malvern MasterSizer Micro software v 5.40). Particle size distribution parameters recorded included largest particle size D[v,90], mean particle volume D[v,50] and mean particle diameter (D[4, 3]). D[v,90] represents the volume value below which 90% of the volume distribution lies. D[v,50] represents the volume value below which 50% of the volume distribution lies.

Standard Conditions

As used herein, unless the context indicates otherwise, standard conditions (e.g. for defining a solid fat or liquid oil) means, atmospheric pressure, a relative humidity of 50%±5%, ambient temperature (22° C.).±2° and an air flow of less than or equal to 0.1 m/s. Unless otherwise indicated all the tests herein are carried out under standard conditions as defined herein.

Texture and Viscosity

Texture of foodstuffs is perceived as a composite of many different characteristics comprising various combinations of physical properties (such as mechanical and/or geometrical properties) and/or chemical properties (such as fat and/or moisture content). As used herein in relation to the compositions of the invention for a given fat and moisture content the composition texture can be related to the viscosity of the composition as a fluid when subjected to shear stress. Provided that the measuring technique is carefully controlled and the same shear rates are used apparent viscosity can be used herein as a guide to indicate texture. The term "viscosity" as used herein refers to the apparent viscosity of a fluid as measured by conventional methods known to those skilled in the art but in particular the method described herein is preferred. Some fluids display non-Newtonian rheology and cannot be totally characterized by a single rheological measurement point. Despite this apparent viscosity is a simple measure of viscosity useful for the evaluation of such fluids.

Viscosity

The viscosity of the compositions according to the invention and/or prepared by a method of the invention, as well as comparative examples, (for example fat based confectionery composition such as chocolate) can be characterized by two measurements, one at about 5 $s^{-1}$ for low flow situations to approximate to the yield value and a second one at 20 $s^{-1}$ for higher flow rates. (See Beckett 4th edition, chapter 10.3). As used herein for the purpose of measuring the viscosity of the fillings of the present invention the yield value of viscosity is used to determine texture measured at a low flow rate of 5 $s^{-1}$.

The preferred method for measuring the yield value for viscosity uses an instrument denoted by the trade designation RVA 4500 (available commercially from Rapid Viscosity Analyzer, Newport Scientific, Australia) measured under standard conditions (unless otherwise indicated) and at a flow rate of 5 $s^{-1}$. In this test method 10 grams of the sample composition are added to the canister supplied with the RVA instrument and then measurement is performed using the following profile: a constant temperature of 35° C., mixing vigorously at 950 rpm for 10 seconds then at 160 rpm for the duration of the test which is 30 minutes. The test is done in duplicates or triplicates to ensure repeatability. The final viscosity is used for comparison as well as the quality of the RVA viscosity curve. A viscosity above 20 Pa·s and below 60 Pa·s in this test indicates that the composition has a firm texture and yet would be processable on a production line. A viscosity less than 20 Pa·s in this test indicates that the composition is too thin to have a desired texture and would be difficult to process.

Weight Percent

All percentages are given in percent by weight, if not otherwise indicated.

Particle and/or Bubble Size

The particle size values given herein are measured by laser diffractometry (for example as described in Industrial Chocolate Manufacture and Use, editor Steve Beckett, fourth edition, 2009, Section 22.3.4. 'Particle size measurement', pages 522 to 524, the contents of which are incorporated herein by reference.). A suitable instrument to measure particle size from laser diffraction is a 'Coulter LS230 Particle Size Analyser'. Particle size is determined by measuring the volume distribution of the sample by plotting volume (%) versus size (microns) (e.g. see FIG. 22.24 of Beckett). Particle size is then quoted as the linear dimension which corresponds to the diameter of an approximate spherical particle having the same volume as the mean volume calculated from the measured volume distribution. A normal particle size distribution (PSD) with single maximum peak (mono modal) is assumed in most cases for the particles used in the present invention. However other PSDs (e.g. multimodal such as bimodal) are not excluded from this invention. As an alternative measure of particle size, d90 may also be used (also expressed in linear dimensions) which denotes the size of particle below which 90% (by number) of the particles in a given particle sample lie.

Sensory and Flavour Attributes

Products prepared as describe herein are assessed for their sensory attributes by a trained panel of assessors. The attributes that may be assessed and how they are rated by the panel are described below. When reported herein the ratings are averaged across the whole panel.

| Evaluation | Attributes | Definition/Rated on scale |
| --- | --- | --- |
| Appearance | Colour intensity | Intensity of the brown colour on the surface of the product /Not-Very |
| | Glossy | Reflection of the light on the product surface/ Not-Very |
| Smell | Overall smell intensity | Overall intensity of the aromas perceived by smelling (break or bite the sample under your nose)/ Not-Very + choice between attributes + comments on other smells perceived/ Not-Very |
| Texture | First bite | Hard Force required to break the wafer when biting with the front teeth/ Soft-Hard Bite: noise intensity Intensity of the noise generated when biting the product with the front teeth./ Not-Very Bite: pitch Pitch of the sound generated when biting the product with the front teeth. e.g. for low pitch (crunch): carrot, croutons. e.g. for high pitch (crispy): rice crispies, crisps./ Low (crunch)-High (crispy) |
| | First 3 chews | Chew: noise intensity Intensity of the noise generated when chewing the product with the molar teeth./ Not-Very Chew: pitch Pitch of the sound generated when chewing the product with the molar teeth. e.g. for low pitch (crunch): carrot, croutons. e.g. for high pitch (crispy): rice crispies, crisps./ Low (crunch)-High (crispy) Crumbly When the product breaks into pieces when chewing./ Not-Very |
| | While chewing | Dry Product that breaks into bits when chewed (dry) as opposed to a product that forms a paste (moist)/ Not-Very Gritty Initial perception of the particle size as evaluated between the tongue and palate or between the tongue and teeth, from smooth/low, to powdery/middle of scale, to gritty/high/ Not-Very Amalgamation The ease with which the chocolate coating & wafer centre amalgamate/ Not-Very Sticky Force required to remove the product that adheres to the palate not-very Texture balance Degree to which both the chocolate coating and wafer/praline parts are in adequate relative quantity chocolate-wafer |
| | Just before swallowing | Noise duration Time during which you hear a noise when chewing the wafer./ Short-Long Chewing time Time necessary to chew the wafer to make it ready for swallowing./ Short-Long |
| | After swallowing | Residues Amount of residues left in the mouth./ None-Many Mouth coating Fatty film coating the tongue, palate and teeth./ Not-Very |
| Flavour | Overall flavour | Intensity of the overall flavour/ Not-Very |
| | Cocoa | Intensity of cocoa flavour/ Not-Very |
| | Milky | Intensity of the milk flavour (Ref: fresh milk)/ Not-Very |
| | Baked wheat | Intensity of the typical flavour of wheat flour mixed with water that has been baked/ Not-Very |
| | Caramel | Intensity of the caramel flavour (sugar that has been heated to a brown colour)/ Not-Very |
| Basic tastes | Sweet | Intensity of the sweet taste (Ref: Sucrose)/ Not-Very |
| | Salty | Intensity of the salty taste (Ref: Sodium chloride)/ Not-Very |
| | Bitter | Intensity of the bitter taste (Ref: Quinine sulphate)/ Not-Very |

-continued

| Evaluation | Attributes | Definition/Rated on scale |
|---|---|---|
| Aftertaste | Aftertaste intensity | Intensity of the overall flavours after swallowing/ Not-Very + choice between attributes + comments on other smells perceived/ Not-Very |

FIGURES

The present invention is further illustrated by the following non limiting figures FIGS. 1 to 3 as follows:

FIG. 1 is a photograph of a reference filling (Comp B) without any bran, showing continuous flow from a spoon.

FIG. 2 is a photograph of a reference filling (Comp C) comprising 20.88% by weight of the filling of un-milled (i.e. 'virgin') bran and 29% by weight fat, showing that the flow from a spoon is discontinuous, appearing lumpy and dropping from the ladle instead.

FIG. 3 is a photograph of a filling of the invention (Example 1) comprising 20% by weight of the filling of micro-bran (i.e. fine bran milled with a cell mill) and 29% by weight fat, showing continuous flow from a spoon.

FIG. 4 is of a reference filling Comp B (a filling without any bran).

FIG. 5 is of the reference filling Comp C (with 20.88% by weight of virgin unmilled bran), FIG. 6 is of the filling of the invention (Example 4) which comprises 23.49% by weight of micronized bran milled by a jet mill.

Comp B is reference composition without bran as above.
Comp D is cream with 15% virgin bran by weight
Comp E is a cream with 20% virgin bran by weight
Example 8 is a cream with 5% by weight of fine bran milled by cell mill at 15%
Example 9 is a cream 20% by weight of fine bran milled by cell mill at 15%

Figure 8:
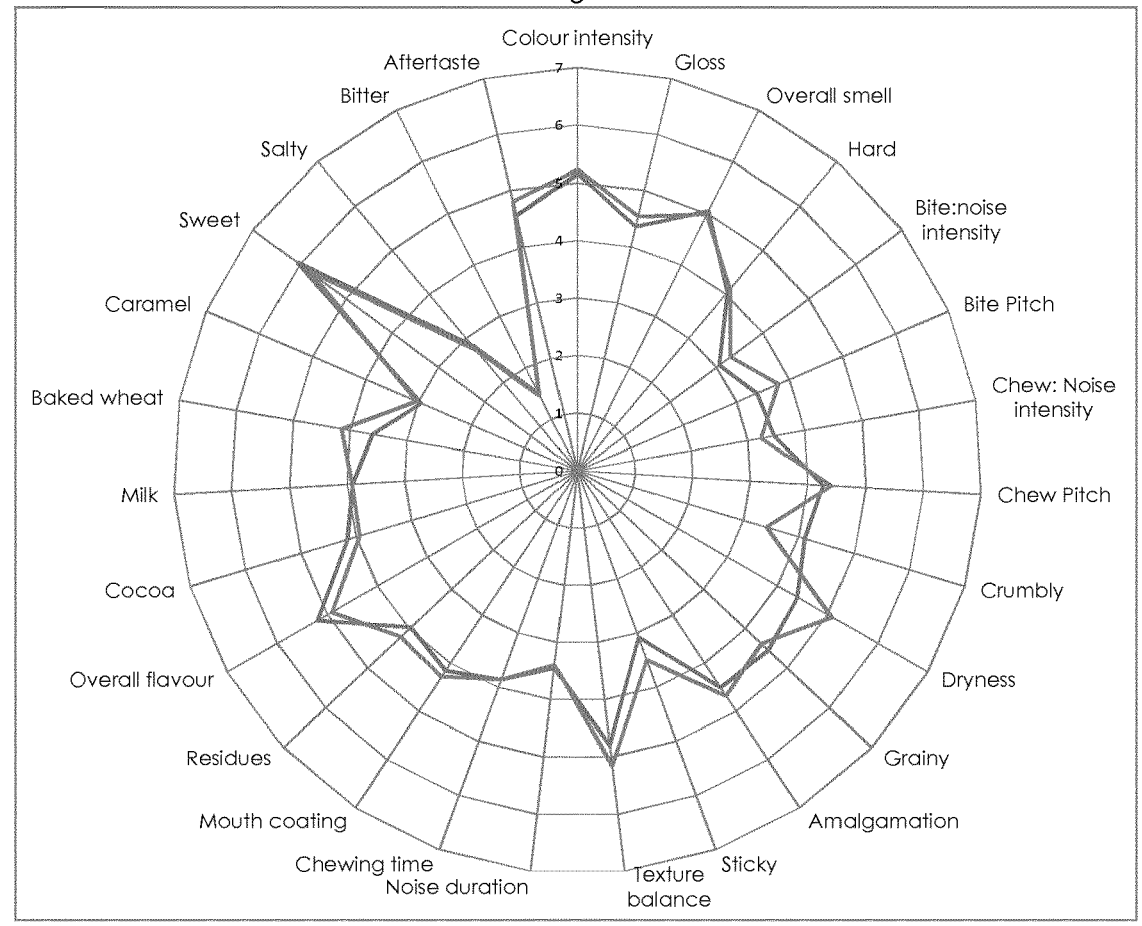

FIG. 8 is a sensory profile of a reference conventional laminated wafer confectionery coated with chocolate (Comp I) compared to the similar laminated wafer confectionery product (Example 10) as Comp I where the filling between the wafer layers were replaced by the same coat weight of a filling of the invention comprising 5% by weight of the micronized bran of the invention (Example 10).

Figure 9:
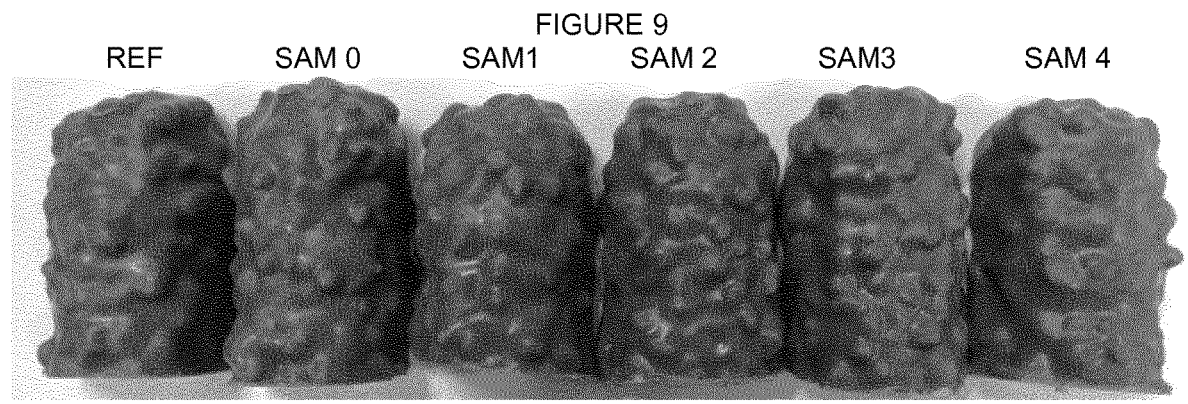
Figure 10:
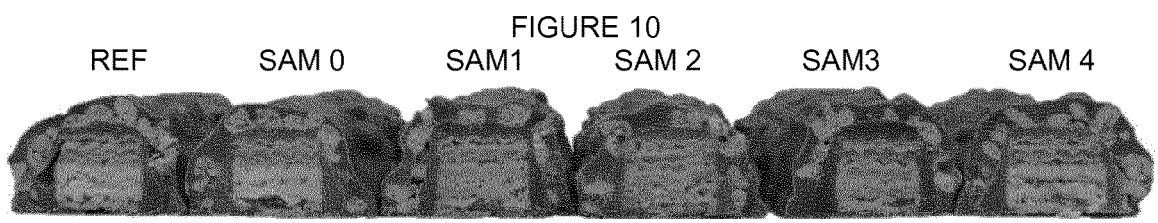
Figure 11:
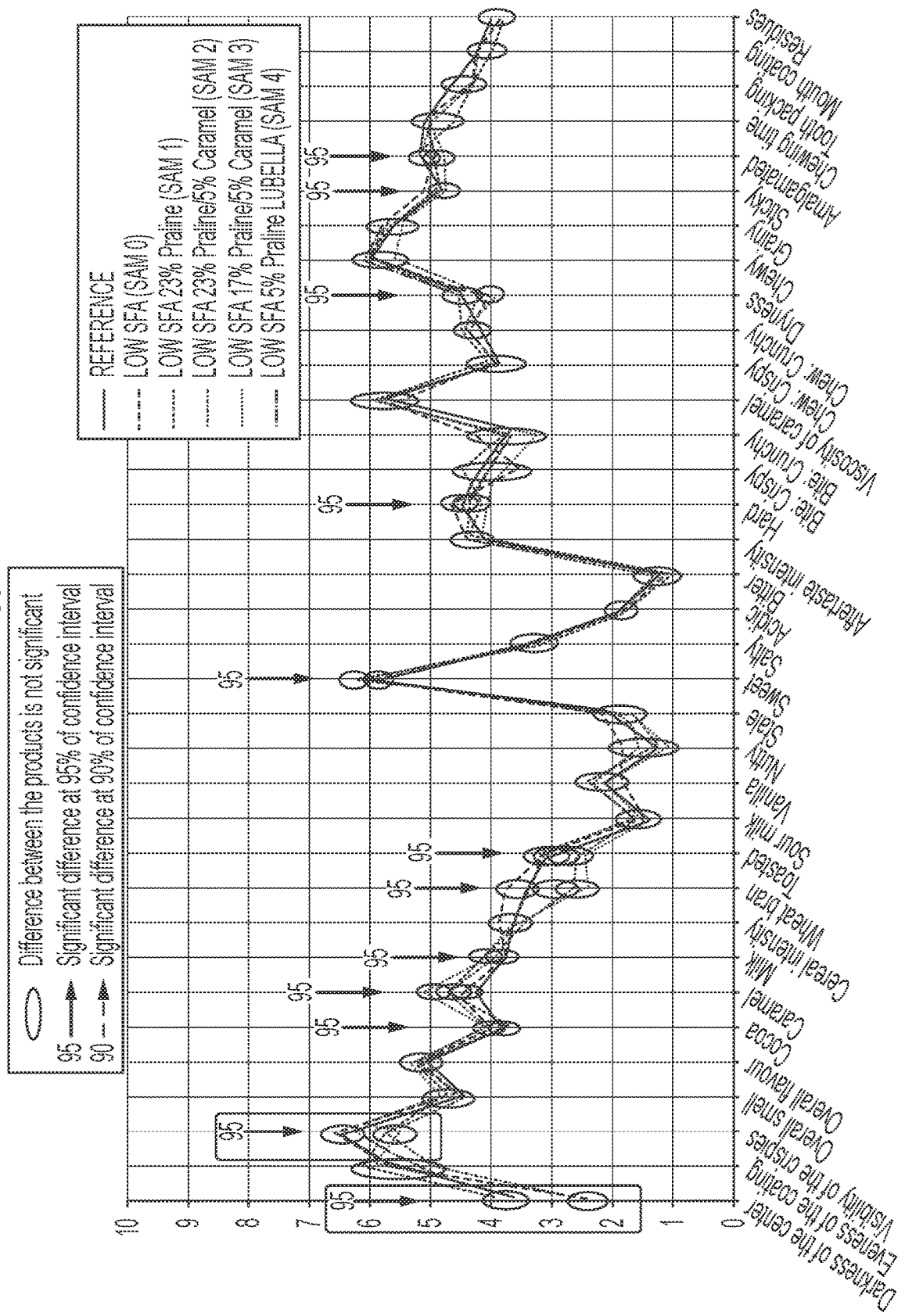

FIGS. 9 to 11 relate to variations of a standard Lion® bar (REF, SAM 0 to SAM 4) prepared as described herein.

FIG. 9 is a photograph taken from above of samples REF, SAM 0, SAM 1, SAM 2, SAM 3 and SAM 4 shown from above FIG. 10 is a photograph taken of a cross section of samples REF, SAM 0, SAM 1, SAM 2, SAM 3 and SAM 4

FIG. 11 shows a plot of the respective sensory attributes of samples REF, SAM 0 to SAM 4 as reported by a trained sensory panel. Reference character 95 represents a significant difference at a 95% of confidence interval. Reference character 90 represents a significant difference at a 90% of confidence interval.

Figure 12:
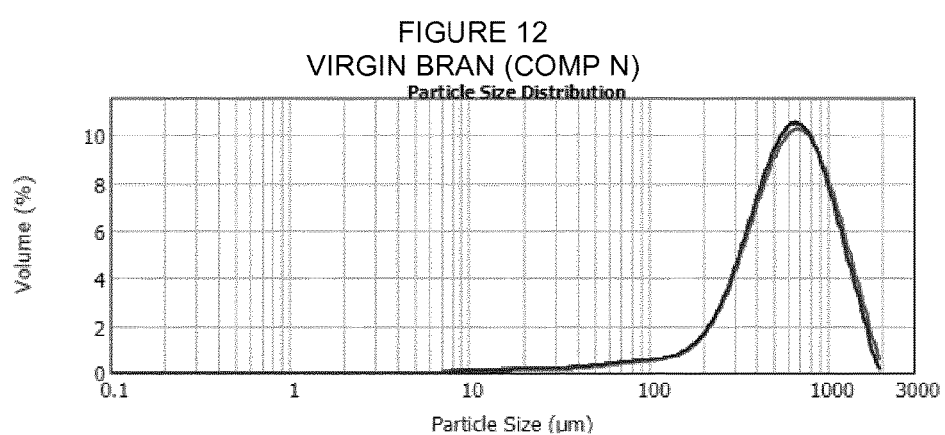
Figure 13:
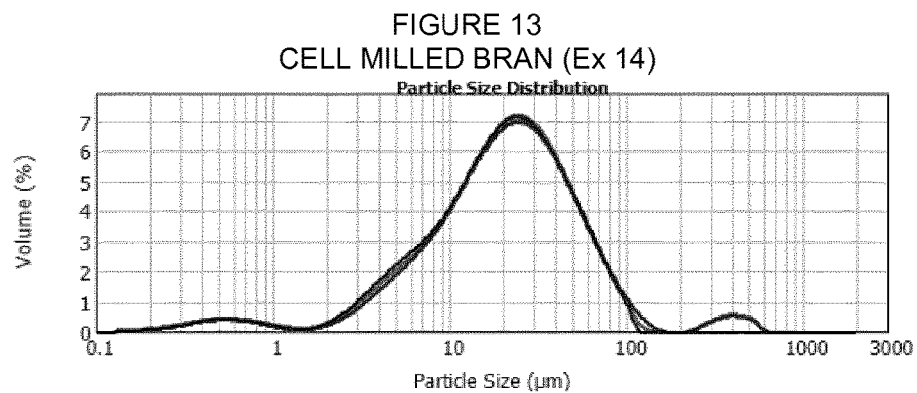

FIGS. 12 and 13 show particle size distribution (PSD) of multiple samples of two different brans measured using a Malvern Mastersizer 2000.

FIG. 12 is the PSD of three samples of the virgin (unmilled) bran (Comp N).

FIG. 13 is the PSD of four samples of the same bran of the invention (Example 15) milled by a cell mill.

Figure 14:
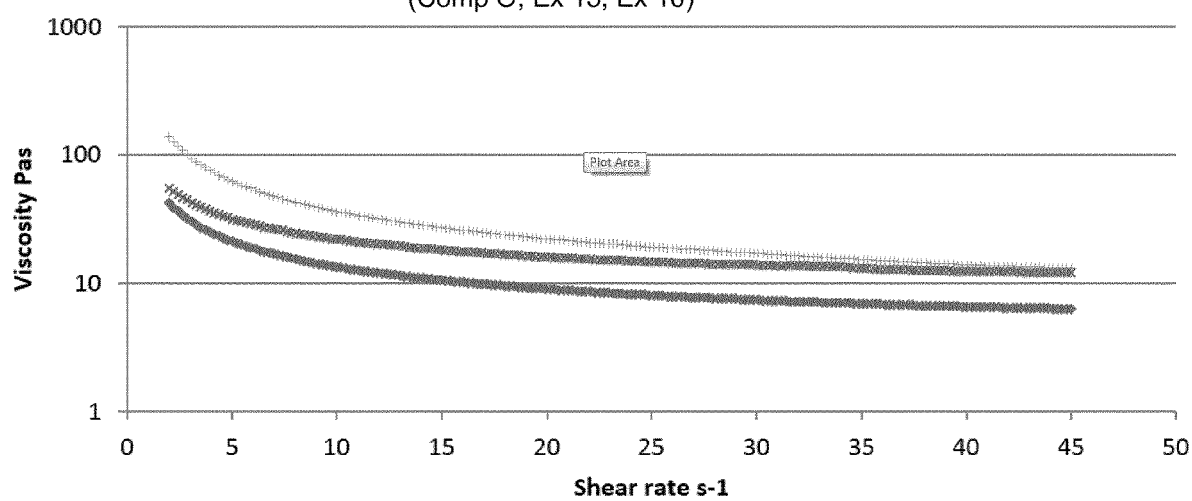

FIG. 14 shows the flow curves (viscosity versus shear rate) of fillings comprising non heated treated virgin bran (Comp O) and heat treated brans (steam treated bran in Example 14 and microwaved bran in Example 16).

Figure 15:
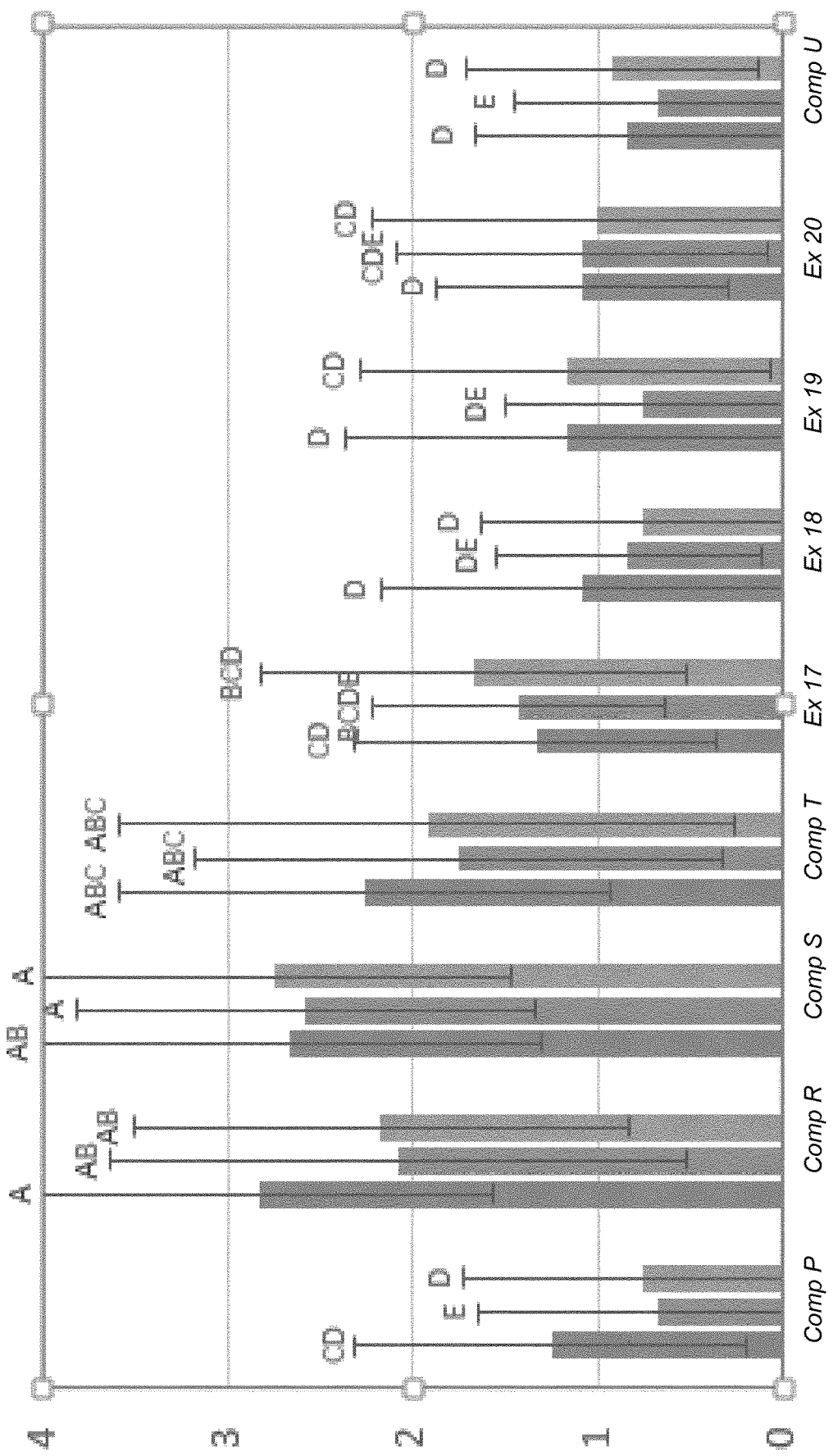

FIG. 15 shows off-flavour (rancid, sour milk and cheesy) perception measured after 20 hours as a result of esterase activity by a sensorial sniffing test. (Comps P, R, S, T and Exs 17 to 21).

Figure 16:
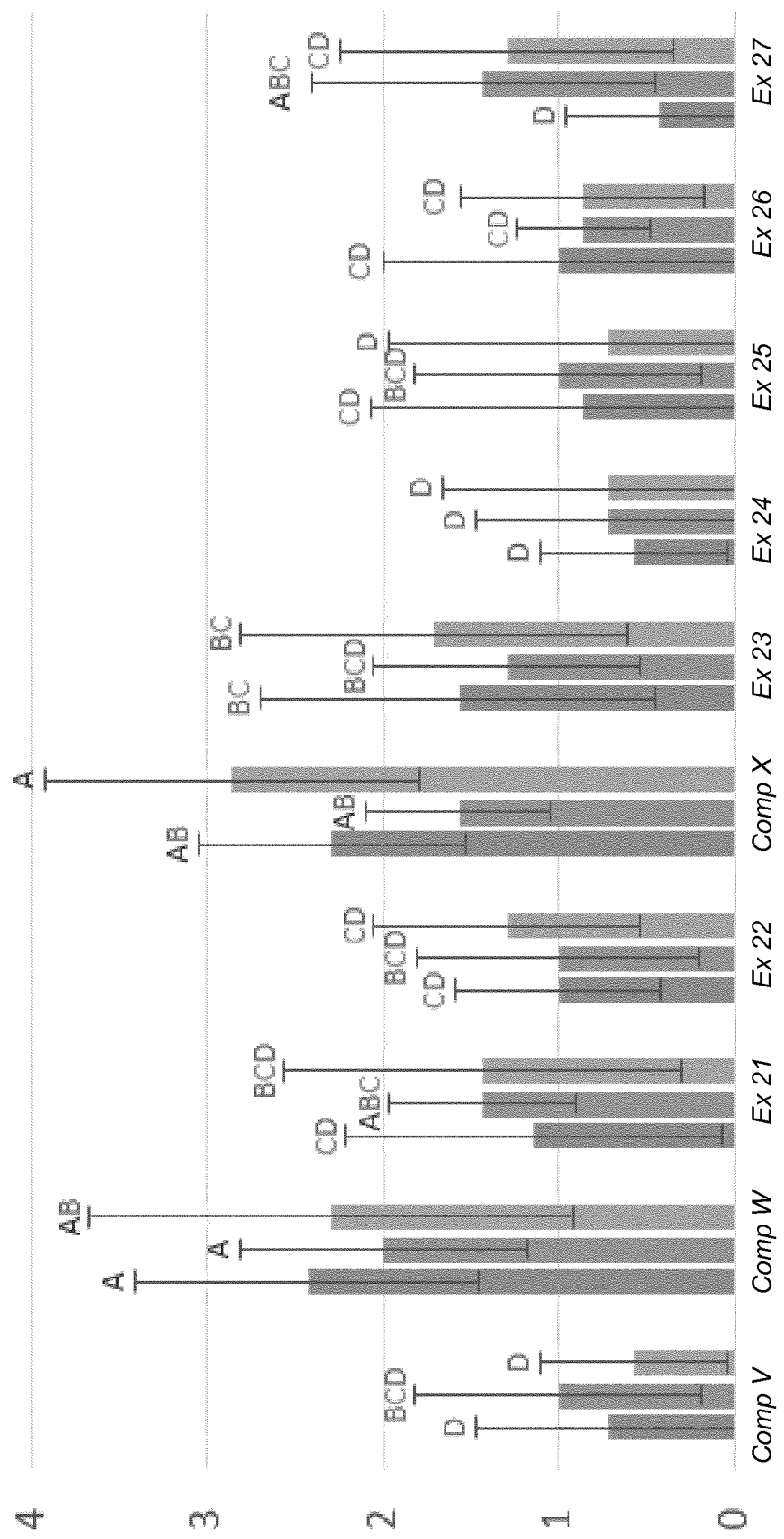

FIG. 16 shows off-flavour (rancid, sour milk and cheesy) perception measured after 20 hours as a result of lipase activity by a sensorial sniffing test for different samples that were steam treated and not steam treated. (Comps V and W, Ex 22 to 23, Comp X and Ex 24 to 28)

Figure 17:
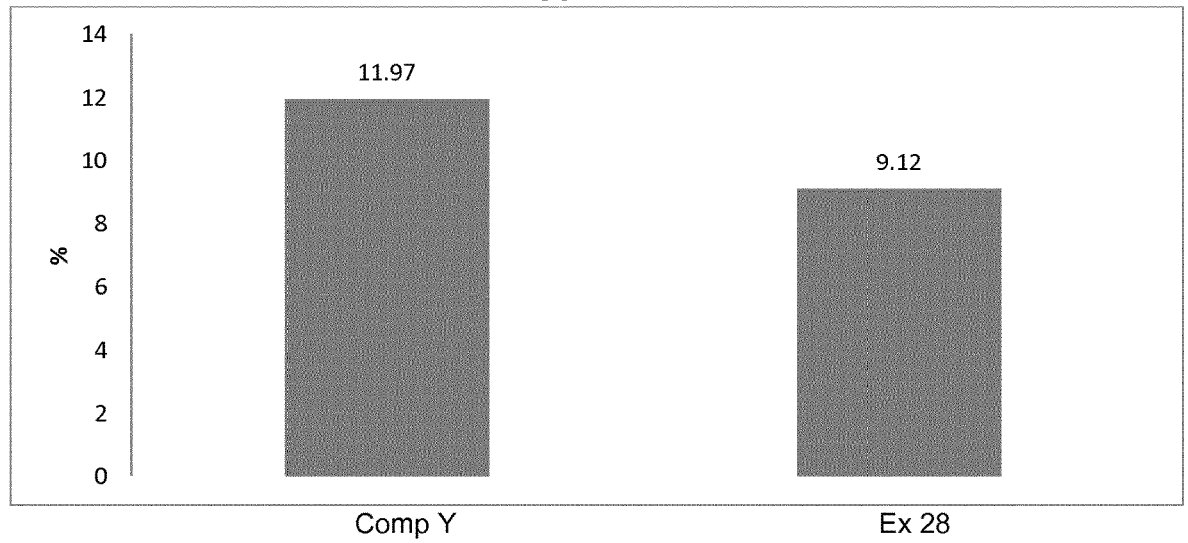

FIG. 17 shows the moisture content of microwaved bran (Ex 29) versus non-treated bran (Comp Y)

Figure 18:
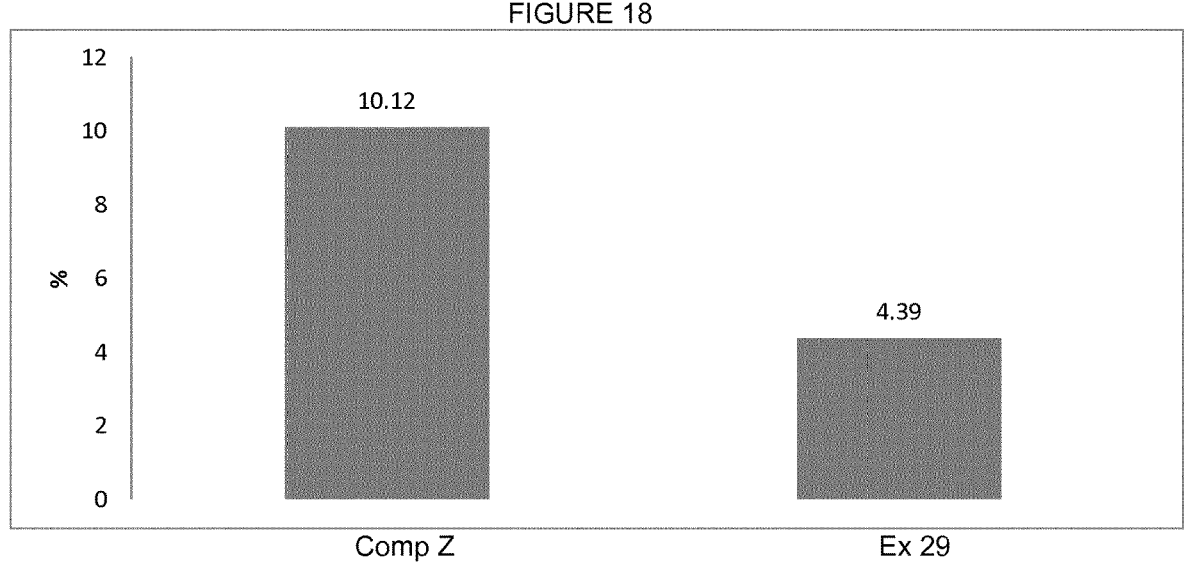

FIG. 18 shows the moisture content of steam treated bran (Ex 30) vs non-treated bran (Comp Z)

It should be noted that embodiments and features described in the context of one of the aspects or embodiments of the present invention also apply to the other aspects of the invention. Although embodiments have been disclosed in the description with reference to specific examples, it will be recognized that the invention is not limited to those embodiments. Various modifications may become apparent to those of ordinary skill in the art and may be acquired from practice of the invention and such variations are contemplated within the broad scope of the present invention. It will be understood that the materials used and the chemical details may be slightly different or modified from the descriptions without departing from the methods and compositions disclosed and taught by the present invention.

Further aspects of the invention and preferred features thereof are given in the claims herein.

EXAMPLES

The present invention will now be described in detail with reference to the following non limiting examples which are by way of illustration only.

Bran (Examples 1, 2 and Comp A)

Cell mill powders—Examples 1 and 2 Particle size and through put of powders from a cell mill now described which obtain brans having the properties as claimed herein. Table 1 shows the properties of the particles of brans of the invention compared with unmilled virgin bran (Comp A)

Example 1 is a bran obtained from a soft wheat bran which has not been heat treated and mill by a cell mill under the conditions given in Table 2

Example 2 is a soft wheat bran (the same as used in Example 1) which was heat up treated at 102° C. by microwaving for full powder at 100 W for 7 mins before being milled by cell mill under the conditions given in Table 2.

Comp A is a soft wheat bran as used in Example 1 which has not been heat treated or milled and is also referred to herein as Virgin Bran.

TABLE 1

Particle parameters

|       |         | Ex 1   | Ex 2   | Comp A |
|-------|---------|--------|--------|--------|
| (I)   | D(4.3)  | 40.901 | 23.725 | NM     |
| (I)   | D(3.2)  | 77.801 | 6.845  | NM     |
| (II)  | D(90.3) | 94.025 | 49.585 | 286    |
| (II)  | D(50.3) | 22.671 | 15.906 | 509    |
| (II)  | D(10.3) | 5.457  | 5.323  | NM     |
| (III) | S(50)   | 0.830  | 0.830  | 0.730  |

NM denotes not measured

TABLE 2

(Mill properties)

|                       | Ex 1 | Ex2  |
|-----------------------|------|------|
| Mill speed (rpm)      | 4144 | 4144 |
| Classifier speed (rpm)| 1308 | 1440 |
| Throughput (kg/h)     | 84   | 128  |

Cream Fillings (Examples 3 and 4 and Comp B and C)

Cream fillings reference examples Comp B, Comp C and Examples 3 and 4 (prepared from bran of the invention) were prepared analogous to as described herein.

Comp B is a reference filling without any bran.

Comp C is a reference filling with 20.88% by weight of virgin bran, Comp C having 40% by weight less sugar compared to the cream of Comp B.

Example 3 is filling comprising a bran of the invention having 45% by weight less sugar than Comp B.

Example 4 is filling comprising bran of the invention with 23.49% by weight of a micronized bran prepared by a jet mill.

Figure 1:
FIGS. 1 to 3 are photographs that allow one to make a visual assessment of the rheological behavior of various cream fillings, one without bran and two low fat cream fillings in which different bran types are used as a partial fat replacers one of which uses a micro-bran of the present invention.
Figure 2:
Figure 3:
Figure 4:
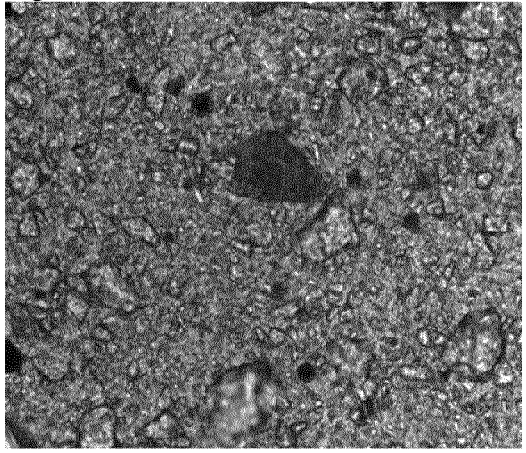
FIGS. 4 to 6 are photographs taken under the microscope at ten times magnification of various fillings.
Figure 5:
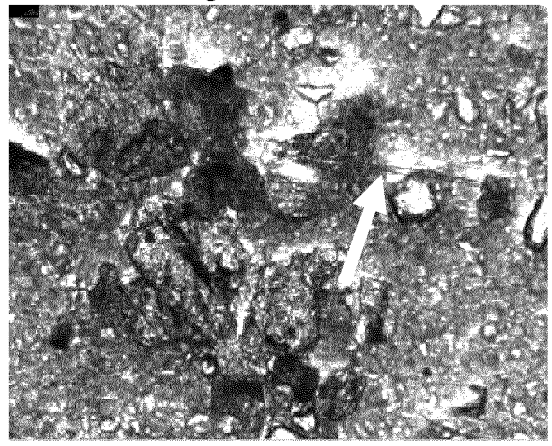
Figure 6:
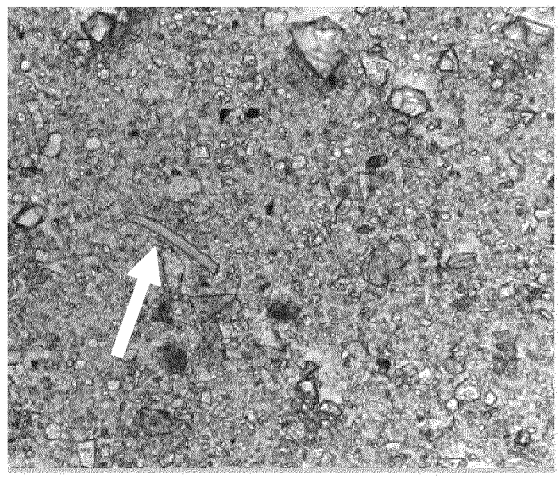

Microscopy photos at 10× magnification were taken of Comp B, Comp C and Example 4 as shown in respective FIGS. 4, 5 and 6 herein.

Results

As can been seen from FIG. 4 reference filling Comp B shows a well dispersed suspension with equally sized particles.

FIG. 5 shows the reference filling Comp C made from virgin, unmilled, bran forms a suspension of bran particles with a wide range of sizes and large highly irregular shapes. The particles tend to lump together in agglomerates as seen by the lengthy, fibrous structure indicated by the white arrow in FIG. 5.

Creams (Comp D and Comp E and Examples 5 to 7)

TABLE 3

Reference cream recipe Comp D

|                                       | %     | Amount (kg) |
|---------------------------------------|-------|-------------|
| Sugar White 0.45-0.65 mm Coarse       | 52.2  | 1.04        |
| Cocoa Powder Alkalized 10-12% Fat     | 6.0   | 0.12        |
| Lecithin Sunflower Fluid              | 0.25  | 0.01        |
| Oil Palm Olein                        | 31.1  | 0.62        |
| Milk Skimmed Powder Medium Heat       | 1.0   | 0.02        |
| Wafer Sheets                          | 9.40  | 0.19        |
|                                       |       |             |
| Total                                 | 100.0 | 2.00        |
| Particle Size in μm                   | 120.0 |             |
| Total Fat Content %                   | 32.2  |             |
| Total Cereal Equivalent %             | 9.4   |             |
| Total Lecithin %                      | 0.253 |             |

Heat treated virgin bran, heat treated fine cell mill powder were applied at different concentration of sugar replacement according to Table below. The reference recipe Comp D is given above.

TABLE 3

| Example | Description          | Sugar reduction versus Comp D | Amount of bran in cream by weight of cream |
|---------|----------------------|-------------------------------|--------------------------------------------|
| Comp D  | Reference cream      | 0% (reference)                | 0%                                         |
| Ex 5    | Fine cell milled bran| 30%                           | 15.66%                                     |
| Ex 6    | Fine cell milled bran| 45%                           | 23.49%                                     |
| Ex 7    | Fine cell milled bran| 60%                           | 31.32%                                     |
| Comp E  | Virgin bran          | 45%                           | 23.49%                                     |

Layering of Cream

Table 3 shows the layer weight that is required to obtain a complete layer with the different bran fillings. Compared to the reference cream Comp D without bran, when virgin bran is added to the cream (Comp E) significantly more cream (11%) is required to obtain a complete layer. This is obviously not favourable in a manufacturing environment as it would make it more challenging to achieve the target layer weight without impact on the layer integrity. The fillings (Examples 3 to 5) which used the fine cell milled bran of the invention (such as Example 1 and 2) behave similar to the reference cream Comp D.

Hiding Powder

Examples 8 and 9 compared to Comp F, G and H

Figure 7:
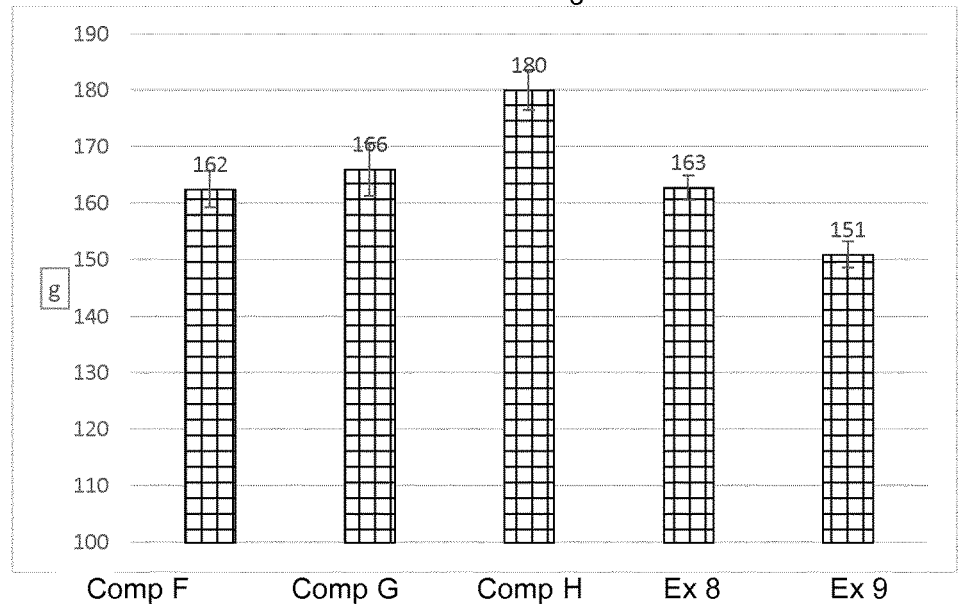
FIG. 7 is a plot of different filling compositions where the ordinate is the layer weight required of each filling (in grams) to obtain a homogenous layer (i.e. layer without any visual blemishes, discontinuities or holes over the same flat area to which each the filling was applied.

FIG. 7 shows that compositions of the invention (Examples 8 and 9) have an improved hiding power compared to the prior art compositions (Comps F, G and H).

FIG. 7 is a plot of different filling compositions where the ordinate is the layer weight required of each filling (in grams) to obtain a homogenous layer (i.e. layer without any visual blemishes, discontinuities or holes over the same flat area to which each the filling was applied.

Comp F is reference composition without bran as above.

Comp G is cream with 15% virgin bran by weight

Comp H is a cream with 20% virgin bran by weight

Example 8 is a cream with 5% by weight of fine bran milled by cell mill at 15%

Example 9 is a cream 20% by weight of fine bran milled by cell mill at 15%

Sensory Data

Example 10 and Comp I

FIG. 8 shows the sensory data of a laminated wafer product of the invention (Example 10) prepared using a cream with micronized bran of the invention compared to a reference laminated wafer product prepared from a cream without such a bran. The sensory properties of both wafer products (Example 10 and Comp I) were rated by up a trained sensory panel based on the sensory attributes as describe herein the results plotted on FIG. 8. It can be seen that the trained sensory panel found no discernible difference between the two confectionery products.

Products

Lion® bar products REF and SAM 0 to SAM 4

Component creams and caramels used to prepare the following products are given below in Tables 4 and 5.

TABLE 4

COMP J = Low saturated fat coating (reduced fat chocolate compound)

| Ingredient | % by weight |
|---|---|
| Akopol NH53* (Low SFA fat) | 29.69 |
| Sugar White Standard Refined Bulk | 44.37 |
| Cocoa Cake Nat 10-12% Fat GerkensNA55Bulk | 6.37 |
| Whey Powder Demin 50% Low Prot Small BB | 19.27 |
| Lecithin | 0.25 |
| Milk flavour | 0.05 |
| Total | 100 |

AKOPOL™ NH 53 is a trade mark that denotes the vegetable fat that comprises non-hydrogenated, mixture of saturated fatty acids (SFA) available commercially from AAK under the aforementioned trade mark. AKOPOL™ NH 53 is a low SFA fat stated (in March 2013) by AAK to comprise the following components (in g per 100 g of AKOPOL™ NH 53): 64 g saturated fatty acids; 26 g cis-mono unsaturated fatty acids; 5 g cis-poly unsaturated fatty acids and <1 g trans fatty acids.

Recipes of Praline Creams Used to Prepare the Products REF and SAM 0 to SAM 4

Referring to Table 5 below:

Comp K is a standard praline cream without any bran used to make standard Lion® (REF).

Example 11 is a praline cream of the invention comprising 17% by weight of micronized wheat bran of the invention prepared analogously to the Examples described herein.

Example 12 is a praline cream of the invention comprising 23% by weight of micronized wheat bran of the invention prepared analogously to the Examples described herein.

Comp L is a reference praline cream comprising 5% w/w conventional unmilled wheat bran (the bran available commercially from Lubela mills in Poland)

TABLE 5

| Ingredient | Comp K | Ex 11 | Ex 12 | Comp L |
|---|---|---|---|---|
| Sugar | 25.82% | 11.82% | 5.82% | 23.82% |
| Oil Palm Filling 25 kg | 36% | 36% | 36% | 36% |
| Milk skimmed powder | 4% | 4% | 4% | 4% |
| Whey Sweet Powder 10% Protein | 14% | 14% | 14% | 14% |

TABLE 5-continued

| Ingredient | Comp K | Ex 11 | Ex 12 | Comp L |
|---|---|---|---|---|
| Lecithin sunflower fluid | 1% | 1% | 1% | 1% |
| Maltodextrin potato starch low DE | 3% | 0% | 0% | 0% |
| Rework filling from LION ® | 17% | 17% | 17% | 17% |
| Micronised wheat bran | 17% | 23% | — | — |
| Conventional wheat bran | — | — | — | 5% |
| Flavour (vanilla) | 0.18% | 0.18% | 0.18% | 0.18% |
| Total | 100% | 100% | 100% | 100% |

Caramel Compositions (Ex 13 and Comp M)

Example 13 and Comp M are caramel compositions used to enrobe the bars REF and SAM 0 to SAM 4

Example 13 comprises 5% by weight of micronized wheat bran of the invention prepared analogously to the Examples described herein. Example 13 is a caramel slurry recipe used to enrobe the laminated wafer centre in an amount such that only 5% of bran is present in final caramel. The recipe is shown in Table 6.

TABLE 6

(Ex 13)

| Ingredient name | Weight in kg per 1000 kg |
|---|---|
| Glucose fructose syrup DE 81 | 590.0 |
| Vacuum evaporated salt | 12.3 |
| Rework LION ® | 108.3 |
| Rework filling LION ® | 108.3 |
| Water | 50.0 |
| Wheat bran | 131.3 |
| Batch | 1000 |

Comp M is the recipe of the standard caramel recipe used to enrobe a standard Lion® bar.

TABLE 7

(Comp M)

| Ingredient name | Weight in kg per 1000 kg |
|---|---|
| Glucose fructose syrup DE 81 | 342 |
| Sweetened condensed milk | 342 |
| Filling fats | 74 |
| Sample solution | 479 |
| Batch | 1237 |
| Yield | 1000 |

Table 8 indicates the physical outputs of the process that produce the stated creams, in which:

Column W is the fat quantity added at 1st mixing (kg)
Column X is the mixing speed (Hz)
Column Y is the mixing time (minutes)
Column Z is the temperature of cream after mixing (° C.)

TABLE 8

| Praline | W | X | Y | Z |
|---|---|---|---|---|
| Comp K-Std LION ® cream | 65 | 100 | 3 | NA |
| Ex 11 cream 17% micronized bran | 70 | 100 | 3 | 42.4 |
| Ex 12 cream 23% micronized bran (batch1) | 80 | 100 | 7 | 42.5 |

TABLE 8-continued

| Praline | W | X | Y | Z |
|---|---|---|---|---|
| Ex 12 cream 23% micronixed bran (½ batch) | 35 | 100 | 3 | 40.5 |
| Comp L cream 5% virgin (unmilled) bran | 70 | 100 | 3 | 44 |

The conventional unmilled virgin bran used to prepare Comp L was a standard unmilled soft wheat bran such as that available commercially from Lubela mills in Poland.

Products

Reference product (REF) is a conventional enrobed laminated wafer sandwich count line sold by the applicant under the registered trade mark 'Lion'® (size 42 g) (referred to herein as Lion® bar). The Lion® bar comprises wafer layers sandwiched between layers of standard filling cream (praline—Comp K) and standard caramel (Comp M) up which together form the laminated product centre which is then enrobed with an outer coating of chocolate compound. The products below are identical to the recipes used in a conventional Lion® bar and were prepared identically except as indicated and the components normally used therein are referred to as 'standard' components. The modified LION® bars were as follows:

SAM 0 Coating=Coated with Low SFA Coat (Comp J—see above)
  Centre=Conventional (bran free) centre as for standard Lion® (standard praline Comp K and standard caramel Comp M)
SAM 1 Coating=Low SFA Coat (Comp J)
  Praline=Ex 11 comprising 17% w/w of micronized bran of the invention
  Caramel=Ex 13 comprising 5% w/w of micronized bran of the invention
SAM 2 Coating=Low SFA Coat (Comp J)
  Praline=Ex 11 comprising 23% w/w of micronized bran of the invention
  Caramel=Standard caramel (Comp M)
SAM 3 Coating=Low SFA Coat (Comp J)
  Praline=Ex 11-23% w/w of micronized bran of the invention
  Caramel=Ex 10-5% w/w of micronized bran of the invention
SAM 4 Coating=Low SFA Coat (Comp J)
  Praline=Comp L with 5% w/w of conventional unmilled (virgin) bran
  Caramel=Standard caramel (Comp M)

Products SAM 0 and SAM 4 are not of the present invention and were prepared as comparison products which together with Lion® itself were used to compare sensory properties with Products SAM 1, SAM 2 and SAM 3 of the invention.

SAM 0 is a low fat version of Lion® (with a low fat coating than conventional compound) and SAM 4 is a reduced sugar version of Lion® with conventional bran used as sugar replacer.

Products SAM 1, SAM 2 and SAM 3 were made according to the invention and show sugar reduction compared to Lion® but also better sensory properties compared to the comparison products (SAM 0 and SAM 4). Thus very surprisingly the taste and other properties of the (reduced sugar) products containing micronized bran were comparable to those for standard Lion®.

Results

Photographs of the respective product samples REF, SAM 0 to SAM 4 were taken and are shown from above in FIG. 9 and as a cross-section in FIG. 10.

The samples REF, SAM 0 to SAM 4 were tasted by a trained sensory panel and the attributes assessed as described previously. These results are plotted in FIG. 11.

The samples with wheat bran in the praline or praline and caramel (SAM 1 to 3) have a darker centre than the Reference (REF) and SAM 4 with Comp L (unmilled bran in the praline). Also, the crispiness of SAM 1 and 3 are more apparent than the in the other samples with Low SFA coat (SAM 0, SAM 2 and SAM 4).

Further Particle Size Information

Particle Size Comparisons of Brans (Comp N and Ex 14 and FIGS. 12 and 13)

Various particle properties of the cell mill bran of the invention (Example 14) and virgin (unmilled) bran (Comp N) were determined by a Malvern Mastersize 2000 (operated conventionally) and the data are given in the following table, Table 9

| Properties | Comp N (Virgin bran) | Ex 14 (Cell milled bran) |
|---|---|---|
| Specific surface area (m²/g) | 0.0183 | 0.887 |
| Surface weighted mean D(3,2) (μm) | 358.049 | 6.761 |
| Volume weighted mean D(4,3) (μm) | 655.399 | 25.622 |
| Particle size [d (0,1)] (μm) | 237.454 | 4.853 |
| Particle size [d (0,5)] (μm) | 599.307 | 20.239 |
| Particle size [d (0,9)] (μm) | 1166.649 | 54.640 |

These data was taken as the average of the measurement of multiple samples (four for the cell milled bran and three for the virgin bran). The particle size distribution (PSD) of the tested samples Comp N and Example 14 is shown as overlaying plots in respective FIG. 12 (virgin bran) and FIG. 13 (cell milled bran)

Viscosity of Bran (Comp O and Example 15, 16 and FIG. 14)

The applicant has found that though heat treated bran may impact the handling properties of fillings to which they are added they do not do so to a great extent and can still be used on an industrial scale.

This can be seen from flow curves of viscosity of fillings containing these brans at given shear rates as shown in FIG. 14. Otherwise conventional and identical (apart from the bran) fillings were prepared on a kitchen scale (Comp O, Ex 15 and Ex 16), each filling comprising 23.5% of wheat bran where:

Comp O is a reference filling where the bran is not heated, the flow data for which is plotted by filled diamonds (bottom data series in FIG. 14);

Example 15 is the same filling where the bran is heat treated with steam, the flow data for which is plotted by crosses formed from two diagonal lines (middle data series in FIG. 14); and Example 16 is the same filling where the bran is heat treated by microwaving, the flow data for which is plotted by crosses formed from a horizontal and vertical line (top data series in FIG. 14).

As can be seen the filling with microwaved bran (Ex 16) had a little more of an impact on the viscosity compared to the filling with steam treated bran (Ex 15) and a filling with non heat treated bran (Comp O). Without wishing to be bound by any theory higher viscosities at lower shear rates could be explained by an increase in the formation of particle agglomerates perhaps due to different moisture content of the brans inducing different rates of agglomeration of sugar particles. Fillings with large viscosities would be difficult to process on a production line, causing issues with pumping, handling or layering and it might have been expected the heat treating the bran would cause more issues.

The data in FIG. 14 surprisingly shows that fillings with heat treated brans have at least comparable flow curves to fillings with non heated brans. Thus the applicant has found that contrary to what might have been expected that heat treated brans can conveniently be added to fillings to improve shelf life and microbial stability without significant adverse effects on how the filling can be processed on an industrial scale. This also opens up the possibility to add heat treated bran to industrial scale compositions in much larger amounts than known before.

Examples 17 to 20 and Comparisons Comp P to U

To determine the significant difference between the enzymatic lipid esterase activity (LA) and the peroxidase activity (PA) in the wheat brans, an ANOVA test was done (where letters A to E for example in FIGS. 15 and 16 herein show the error bars in the data and indicate significant difference between groups). In FIGS. 15 and 16 the data labels for the three data sets for the off-flavours assessed were labelled as follows: Rancid=blue (left); Sour milk=orange (middle); Cheesy=green (right).

FIG. 15

The abscissa of FIG. 15 shows the samples tested for each of the three off flavour, the samples being from left to right:
Comp P=Fresh wheat bran (WB) as a reference
Comp R=Fine WB no heat treatment (NHT)
Comp S=Virgin WB NHT
Comp T=Fine WB Oven
Ex 17=Fine WB microwave
Ex 18=Coarse WB Extruded
Ex 19=Fine WB Steam
Ex 20=Coarse WB Steam
Comp U=Virgin WB Steam In FIG. 15

WB denotes wheat bran, NHT not heat treated

'Fresh' denotes wheat bran that was not heat treated and tested immediately after preparation and was not kept and thus has not had time to develop off flavours due to the action of enzymes.

'Virgin' denotes wheat bran that was not milled and has a very different much larger particle size (70% of the particles having a size above 425 microns). Virgin bran has a size distribution that does not overlap with the milled particles of the invention as shown for example by comparing FIGS. 12 and 13.

'Fine' denotes bran fine milled to have substantially spherical particles of a particle size characterised by a $D_{90}$=180 microns.

'Coarse' denotes bran coarse milled to have substantially spherical particles of a particle size characterised by a $D_{90}$=360 microns.

'Oven' denotes bran that had been heated in an oven at 100° C. for 3 minutes

'Extruded' denotes bran that had been extruded in a conventional screw extruder at 100° C. at a rate such that the residence time of the material in the extruder was 5 minutes.

'Steam' denotes bran that has been heated using 15% by volume of steam at a temperature of 95° C. for 3 minutes.

Other than the fresh sample (Comp P) the other bran samples were kept for 3 months before testing to allow time for off flavours to develop should any active enzymes (e.g. LA or PA) be present.

As seen in FIG. 15, for the non-heat treated milled samples (Comp R and Comp S) and the oven heated sample (Comp T) strong off-flavours were perceived compared to the fresh reference of virgin bran (Comp P). This shows that oven treatment alone is not sufficient to deactive the enzyme and prevent the generation of off flavours.

Weakest off-flavours (not significantly different from the virgin bran (Comp P) were perceived in the extruded (Ex 18) and steam heat-treated wheat brans (Ex 19, and 20). Comp U is a virgin bran which whilst being heat treated does not have the other particulate properties of brans of the invention as described herein.

The results after 20 hours matches the peroxidase results and the sniffing test was used to validate PA and LA to show that enzymatic activity can be used as an indicator of the presence of off-flavours.

The abscissa of FIG. 16 shows the samples tested from left to right:
Comp V=Fresh wheat bran as a reference not heat treated;
Comp W=Wheat bran treated with 5% by volume of steam at 120° C. for 4 minutes;
Ex 21=Wheat bran treated with 10% by volume of steam at 120° C. for 4 minutes;
Ex 22=Wheat bran treated with 15% by volume of steam at 120° C. for 4 minutes;
Comp X=Wheat bran treated with 5% by volume of steam at 140° C. for 4 minutes;
Ex 23=Wheat bran treated with 10% by volume of steam at 140° C. for 4 minutes;
Ex 24=Wheat bran treated with 15% by volume of steam at 140° C. for 4 minutes;
Ex 25=Wheat bran treated with 5% by volume of steam at 160° C. for 4 minutes;
Ex 26=Wheat bran treated with 10% by volume of steam at 160° C. for 4 minutes;
Ex 27=Wheat bran treated with 15% by volume of steam at 160° C. for 4 minutes;

Off flavour is caused by the action of the enzyme lipid esterase and peroxidase, the more active this enzyme the more off flavour that is generated.

To denature and inactivate the enzymes, sufficient heat is required and the use of higher temperatures (140 and 160° C.) and higher steam quantities (15%), increasing the heat transfer, results in more enzyme denaturation. Therefore, the wheat brans heated to higher temperatures and higher steam quantities result in no significant stronger off-flavour perception, compared to reference materials. With regards to the microbial deactivation any of the conditions tested in the experimental design could be selected for the official heat treatment validation. However it was noticed that the formation of undesirable roasted flavour was increased with the increase of the temperature after too much heat treatment the level was unacceptable. Therefore, a temperature as low as possible is preferred for example so the roasting notes were rated 2 or less in a sniff test as described herein and/or have pyrazine compounds within the ranges described herein.

Examples 28 and 29 and Comp Y and Z

Moisture Content of Bran

Moisture content was evaluated for the untreated brans (Comp Y and Comp Z) versus the bran after respective microwave (Ex 29) and steam (Ex 30) treatments. The results can be found in FIGS. 18 and 19 where FIG. 18 shows Moisture content of microwaved bran versus non treated bran and FIG. 19 shows Moisture content of steam treated bran versus non treated bran In FIG. 18

Ordinate is moisture content in weight percent by weight of total bran

Abscissa is sample tested where

Comp Y is a non heat treated wheat bran milled to have the particulate properties of the bran described herein as features (i) to (iii);

Ex 28 is the sample wheat bran of Comp Y after microwaving at 100 W for 7 minutes to reach a temperature of 102° C.

In FIG. 19

Ordinate is moisture content in weight percent by weight of total bran

Abscissa is sample tested where

Comp Z is a non heat treated wheat bran milled to have the particulate properties of the bran described herein as features (i) to (iii);

Ex 29 is the sample wheat bran of Comp Z after steam treatment at 160° C. at 15% by volume of steam for 15 minutes.

The results showed that the moisture content of steam treated wheat bran is 4.39 moisture compared to 10.12% moisture in the same bran before treatment (which is a 56% reduction in amount of moisture in the bran due to this treatment). This compares with a moisture content of 9.12% after microwaving bran versus 11.97% moisture in the bran before microwaving (which is a 24% reduction in amount of moisture in the bran due to this treatment).

The invention claimed is:

1. A confectionery composition comprising from 0.5% to 30% by weight based on the total weight of the confectionery composition of a bran-like material that is edible, processable, microbially released, and flavor acceptable, wherein
    (i) the bran-like material has a mean particle size by volume (Vol. MPS) of from 5 to 100 microns;
    (ii) the bran-like material has a volume particle size distribution (Vol. PSD) having the parameters:
        $D_{90,3}$ less than or equal to 350 microns, and
        $D_{50,3}$ less than or equal to 50 microns, and
    (iii) the bran-like material has a mean particle sphericity as measured by a $S_{mean}$ of greater than or equal to 0.75;
    (iv) being processable denotes the bran-like material has an oil holding capacity (OHC) of from 0.7 to 1.5;
    (v) being microbially released denotes that the bran-like material satisfies the criteria that Samonella is not detected in a 25 g sample of the bran-like material; and
    (vi) being flavor acceptable denotes that the bran-like material has:
    a lipase activity (LA) of less than or equal to 2 U/g; and
    a peroxidase activity (PA) of less than or equal to 2 U/g, and wherein the confectionery composition is suitable for preparing a confectionery product and/or a sugar confection.

2. The confectionery composition of claim 1, wherein the confectionery composition is fat based.

3. The confectionery composition of claim 1, wherein the bran-like material is selected from the group consisting of bran from whole grain cereals, a material from outer shells or layers of edible nuts and/or gymnosperm seeds, a material from internal shells from drupe and internal shells from drupaceous fruits, and mixtures thereof.

4. The confectionery composition of claim 1, wherein particles of the bran-like material have:
    a Vol. MPS of from 10 to 80 microns.

5. The confectionery composition of claim 1, wherein particles of the bran-like material have:
    a Vol. PSD characterized by:
        $D_{90,3}$ less than or equal to 250 microns, and
        $D_{50,3}$ less than or equal to 30 microns, and
        $D_{10,3}$ less than or equal to 10 microns.

6. The confectionery composition of claim 1, wherein particles of the bran-like material have:
    a particle sphericity characterized by a $S_{mean}$ of from 0.8 to 1.

7. The confectionery composition of claim 1, wherein the bran-like material has an OHC of from 0.8 to 1.4.

8. The A confectionery composition of claim 1, wherein the bran-like material has a complete absence of Samonella.

9. The confectionery composition of claim 1, wherein the bran-like material has an LA and/or PA≤1.5 U/g.

10. The confectionery composition of claim 1, wherein the bran-like material has a moisture content of less than 5 parts by weight of moisture based on 100 parts by weight of the bran-like material.

11. The confectionery composition of claim 1 comprising from 2% to 25% by weight of the bran-like material based on the total weight of the confectionery composition.

12. The confectionery composition of claim 1, wherein particles of the bran-like material have a Vol. PSD characterized by:
    $D_{90,3}$ less than or equal to 200 microns,
    $D_{50,3}$ less than or equal to 25 microns, and
    $D_{10,3}$ less than or equal to 8 microns.

13. The confectionery composition of claim 1, wherein the bran-like material has an OHC of from 1.0 to 1.2.

14. The confectionery composition of claim 1, wherein the bran-like material has an LA and/or PA≤0.5 U/g.

15. The confectionery composition of claim 1, wherein particles of the bran-like material have a Vol. MPS of from 20 to 50 microns.

16. The confectionery composition of claim 1, wherein particles of the bran-like material have a Vol. PSD characterized by:
    $D_{90,3}$ from 50 to 100 microns,
    $D_{50,3}$ from 15 to 20 microns, and
    $D_{10,3}$ from 3 to 5 microns.

* * * * *